United States Patent
Min et al.

(10) Patent No.: US 11,178,408 B2
(45) Date of Patent: Nov. 16, 2021

(54) METHOD AND APPARATUS FOR ENCODING/DECODING IMAGE

(71) Applicant: SAMSUNG ELECTRONICS CO., LTD., Suwon-si (KR)

(72) Inventors: Jung-hye Min, Yongin-si (KR); Min-woo Park, Yongin-si (KR); Bo-ra Jin, Yongin-si (KR); Chan-yul Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/115,423

(22) Filed: Dec. 8, 2020

(65) Prior Publication Data

US 2021/0092410 A1    Mar. 25, 2021

Related U.S. Application Data

(63) Continuation of application No. 16/339,574, filed as application No. PCT/KR2016/011299 on Oct. 10, 2016, now Pat. No. 10,904,537.

(51) Int. Cl.
*H04N 19/176* (2014.01)
*H04N 19/119* (2014.01)
(Continued)

(52) U.S. Cl.
CPC ......... *H04N 19/176* (2014.11); *H04N 19/119* (2014.11); *H04N 19/122* (2014.11); *H04N 19/44* (2014.11); *H04N 19/463* (2014.11)

(58) Field of Classification Search
CPC ...... H04N 19/176; H04N 19/70; H04N 19/61; H04N 19/119; H04N 19/593;
(Continued)

(56) References Cited

U.S. PATENT DOCUMENTS 9,277,239 B2   3/2016   Min et al.
9,912,944 B2   3/2018   Guo et al.
(Continued)

FOREIGN PATENT DOCUMENTS

KR   10-2014-0139562 A   12/2014
KR   10-2015-0003324 A   1/2015
(Continued)

OTHER PUBLICATIONS

International Search Report (PCT/ISA/210), issued by International Searching Authority in corresponding International Application No. PCT/KR2016/011299, dated Jul. 3, 2017.
(Continued)

*Primary Examiner* — Farhan Mahmud
(74) *Attorney, Agent, or Firm* — Sughrue Mion, PLLC

(57) ABSTRACT

Provided is a method of decoding an image, the method including: determining at least one coding unit for splitting an image, based on block shape information of a current coding unit; determining at least one transformation unit, based on a shape of the current coding unit included in the at least one coding unit; and decoding the image by performing inverse transformation based on the at least one transformation unit, wherein the block shape information indicates whether the current coding unit is a square shape or a non-square shape. Also, provided is an encoding method corresponding to the decoding method. In addition, provided is an encoding apparatus or decoding apparatus capable of performing the encoding or decoding method.

2 Claims, 29 Drawing Sheets

(51) Int. Cl.
*H04N 19/122* (2014.01)
*H04N 19/44* (2014.01)
*H04N 19/463* (2014.01)

(58) Field of Classification Search
CPC .. H04N 19/105; H04N 19/122; H04N 19/463; H04N 19/14
See application file for complete search history.

(56) References Cited

U.S. PATENT DOCUMENTS

| | | | |
|---|---|---|---|
| 10,009,612 B2 | 6/2018 | Liu et al. | |
| 10,116,942 B2 | 10/2018 | Lim et al. | |
| 2013/0003824 A1 | 1/2013 | Guo et al. | |
| 2017/0214931 A1* | 7/2017 | Sasai | H04N 19/61 |
| 2018/0213264 A1* | 7/2018 | Zhang | H04N 19/96 |

FOREIGN PATENT DOCUMENTS

| | | |
|---|---|---|
| KR | 10-2016-0077027 A | 7/2016 |
| KR | 10-2016-0078318 A | 7/2016 |
| WO | 2013158650 | 10/2013 |
| WO | 2015194922 A1 | 12/2015 |

OTHER PUBLICATIONS

Written Opinion (PCT/ISA/237) issued by the International Searching Authority in corresponding International Application No. PCT/KR2016/011299, dated Jul. 3, 2017.
Communication dated Jul. 4, 2019, issued by the European Patent Office in counterpart European Application No. 16918754.9.
Parka K et al., "EE2.2: Non square TU Partitioning", 3. JVET Meeting; May 20, 2016; Geneva; (The Joint Video Exploration Team of ISO/IEC JTC1/SC29/WG11 and ITU-T SG.16; Retrieved from: http://phenix.int-evry.fr/jvet/.
Communication dated Apr. 24, 2020, from the Intellectual Property Office of Canadian in counterpart application No. 3,039,663.
Communication dated Dec. 8, 2020, issued by the Korean Intellectual Property Office in Korean Patent Application No. 2019-7007991.
Chen et al., "Algorithm Description of Joint Exploration Test Model 3," Joint Video Exploration Team (JVET) of ITU-T SG 16 WP 3 and ISO/IEC JTC 1/SC 29/WG 11, 3rd Meeting: Geneva, CH, May 26-Jun. 1, 2016, Total 37 pages, JVET-C1001_v3.

* cited by examiner

FIG. 19

| BLOCK SHAPE / DEPTH | 0: SQUARE | 1: NS_VER | 2: NS_HOR |
|---|---|---|---|
| DEPTH D | 1900 | 1910 | 1920 |
| DEPTH D+1 | 1902 | 1912 | 1922 |
| DEPTH D+2 | 1904 | 1914 | 1924 |
| ... | ... | ... | ... |

FIG. 24

| SQUARE BLOCK | |
|---|---|
| (00)b | □ |
| (01)b | ⊞ |
| (10)b | ⊟ |
| (11)b | ⊡ |

| NON-SQUARE BLOCK | | |
|---|---|---|
| (0)b | ▭ | ▯ |
| (10)b | ▭▭ | ▯▯ |
| (11)b | ▭▭▭ | ▯▯▯ |

FIG. 25

| SQUARE BLOCK | |
|---|---|
| (00)b | □ |
| (10)b | ⊟ |
| (11)b | ⊡ |

| NON-SQUARE BLOCK | | |
|---|---|---|
| (0)b | ▭ | ▯ |
| (10)b | ▭▭ | ▯▯ |
| (11)b | ▭▭▭ | ▯▯▯ |

⟷ : MERGE
━ ━ ━ : SPLIT

METHOD AND APPARATUS FOR ENCODING/DECODING IMAGE

CROSS-REFERENCE TO RELATED APPLICATION

This application is a continuation of U.S. application Ser. No. 16/339,574, filed on Apr. 4, 2019, which is a National Stage Application of International Application No. PCT/KR2016/011299, filed on Oct. 10, 2016, the disclosures of which are herein incorporated by reference in their entireties.

TECHNICAL FIELD

A method and apparatus according to an embodiment may encode or decode an image by using various data units included in the image.

BACKGROUND ART

Image data is stored in a recording medium or transmitted through a communication channel in the form of a bitstream after being encoded via a codec according to a certain data compression standard, for example, the Moving Picture Experts Group (MPEG) standard.

As hardware for reproducing and storing high-resolution or high-quality image content is being developed and distributed, the need for a codec for effectively encoding or decoding high-resolution or high-quality image content has increased. Encoded image content may be reproduced by being decoded. Recently, methods for effectively compressing such high-resolution or high-quality image content have been performed. For example, an efficient image compression method is being performed through a process in which an image to be encoded is processed in an arbitrary manner.

Various data units may be used to compress an image, and an inclusion relationship may exist between such data units. The data unit may be split via various methods to determine the size of the data unit used in such image compression, and an image may be encoded or decoded by determining a data unit optimized according to characteristics of the image.

DESCRIPTION OF EMBODIMENTS

Technical Problem

In a general compression method, it is determined whether to split a coding unit included in a picture while determining the size of the coding unit, and then square coding units are determined via a recursive split process of uniformly splitting the coding unit into four coding units having the same size.

However, in recent years, with the rapid increase in demand for a high-resolution image and a large data amount required for image reproduction, efficient image encoding and decoding processes are required, and at the same time, image quality deterioration of a reconstructed image caused by using coding units or transformation units having uniform shapes of squares has become a problem.

Solution to Problem

According to an aspect of the present disclosure, a method of decoding an image, the method includes: determining at least one coding unit for splitting an image, based on block shape information of a current coding unit; determining at least one transformation unit, based on a shape of the current coding unit included in the at least one coding unit; and decoding the image by performing inverse transformation based on the at least one transformation unit, wherein the block shape information indicates whether the current coding unit is a square shape or a non-square shape.

According to another aspect of the present disclosure, an apparatus for decoding an image, the apparatus includes: a bitstream obtainer configured to obtain block split information of a current coding unit; and a decoder configured to determine at least one coding unit for splitting an image, based on the block shape information, determine at least one transformation unit, based on a shape of the current coding unit included in the at least one coding unit, and decode the image by performing inverse transformation based on the at least one transformation unit, wherein the block shape information indicates whether the current coding unit is a square shape or a non-square shape.

According to another aspect of the present disclosure, a method of encoding an image, the image encoding method includes: determining at least one coding unit for splitting an image; determining at least one transformation unit, based on a shape of a current coding unit included in the at least one coding unit; encoding the image by performing transformation, based on the at least one transformation unit; and generating a bitstream including the encoded image and block shape information indicating whether the current coding unit is a square shape or a non-square shape.

According to another aspect of the present disclosure, an apparatus for encoding an image, the image encoding apparatus includes: an encoder configured to determine at least one coding unit for splitting an image, determine at least one transformation unit, based on a shape of a current coding unit included in the at least one coding unit, and encode the image by performing transformation, based on the at least one transformation unit; and a bitstream generator configured to generate a bitstream including the encoded image and block shape information indicating whether the current coding unit is a square shape or a non-square shape.

Advantageous Effects of Disclosure

In response to using transformation units of various shapes determined based on a shape of a coding unit during encoding and decoding processes, it is possible to use a transformation unit adaptive to characteristics of an image, and accordingly, efficient image encoding and decoding are enabled and image quality of a reconstructed image can be improved.

BRIEF DESCRIPTION OF DRAWINGS

FIG. 19 illustrates processes of determining a depth of a coding unit as a shape and size of the coding unit are changed, when a plurality of coding units are determined when the coding unit is recursively split, according to an embodiment.

FIG. 24 illustrates various shapes of coding units that may be determined based on split shape information represented in a binary code, according to an embodiment.

FIG. 25 illustrates other shapes of coding units that may be determined based on split shape information represented in a binary code, according to an embodiment.

BEST MODE

Figure 1:
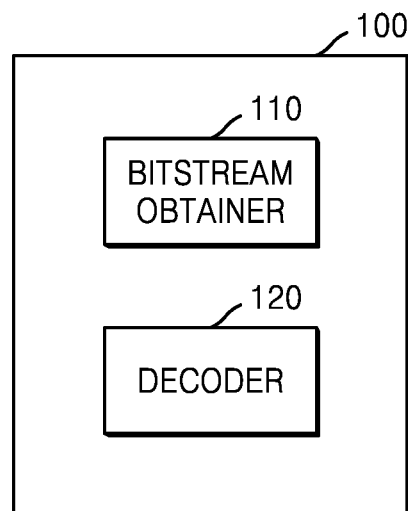
FIG. 1 is a block diagram of an image decoding apparatus for decoding an image, the decoding being based on a transformation unit included in a coding unit splitting an image, according to an embodiment.

According to an aspect of the present disclosure, a method of decoding an image, the method includes: determining at least one coding unit for splitting an image, based on block shape information of a current coding unit; determining at least one transformation unit, based on a shape of the current coding unit included in the at least one coding unit; and decoding the image by performing inverse transformation based on the at least one transformation unit, wherein the block shape information indicates whether the current coding unit is a square shape or a non-square shape.

The determining of the at least one transformation unit may include: obtaining, from a bitstream, split information of a transformation unit, which is information indicating whether to split a current transformation unit; and when the obtained split information of the transformation unit indicates that the current transformation unit is split into a plurality of transformation units, determining the plurality of transformation units included in the current coding unit, based on whether the current coding unit is a square shape or a non-square shape.

The determining of the plurality of transformation units may include: determining a plurality of transformation units of a square shape, when the current coding unit is a square shape; and determining a plurality of transformation units by splitting the current coding unit in a vertical direction or a horizontal direction, when the current coding unit is a non-square shape.

The determining of the at least one transformation unit may further include, when a size of the current coding unit is larger than a largest size of a transformation unit, determining a plurality of transformation units of the largest size included in the current coding unit.

The image decoding method may further include obtaining, from a bitstream, at least one of information about a largest size or information about a smallest size of a transformation unit.

The image decoding method may further include obtaining, from a bitstream, information about a block shape of the at least one transformation unit.

The determining of the at least one transformation unit may include, when a size of the current coding unit for decoding a chroma sample of the image is smaller than a smallest size of the at least one transformation unit, determining the at least one transformation unit of a size equal to or larger than the smallest size.

A depth of the at least one transformation unit may be determined based on a length of a long side of the at least one transformation unit.

The determining of the at least one transformation unit may further include obtaining, from a bitstream, information indicating whether a non-zero transformation coefficient is included in a transformation unit of a current depth determined during a split process of a transformation unit, and the decoding of the image may include decoding the image by using the information indicating whether the non-zero transformation coefficient is included.

The obtaining of the information indicating whether the non-zero transformation coefficient is included may include obtaining, from the bitstream, the information indicating whether the non-zero transformation coefficient is included, based on at least one of a shape of the current coding unit, whether a chroma component of the image is included in the current coding unit, whether intra prediction used in the current coding unit is performed, or a number of transformation units included in the current coding unit.

The obtaining of the information indicating whether the non-zero transformation coefficient is included may include, when a shape of the current coding unit is a non-square shape, obtaining, from the bitstream, the information indicating whether the non-zero transformation coefficient is included in the transformation unit of the current depth only when the transformation unit of the current depth is no longer split.

The decoding of the image may further include: determining a context index based on a shape of the at least one transformation unit; and decoding the image based on the determined context index.

According to another aspect of the present disclosure, an apparatus for decoding an image, the apparatus includes: a bitstream obtainer configured to obtain block split information of a current coding unit; and a decoder configured to determine at least one coding unit for splitting an image, based on the block shape information, determine at least one transformation unit, based on a shape of the current coding unit included in the at least one coding unit, and decode the image by performing inverse transformation based on the at least one transformation unit, wherein the block shape information indicates whether the current coding unit is a square shape or a non-square shape.

According to another aspect of the present disclosure, a method of encoding an image, the image encoding method includes: determining at least one coding unit for splitting an image; determining at least one transformation unit, based on a shape of a current coding unit included in the at least one coding unit; encoding the image by performing transformation, based on the at least one transformation unit; and generating a bitstream including the encoded image and block shape information indicating whether the current coding unit is a square shape or a non-square shape.

According to another aspect of the present disclosure, an apparatus for encoding an image, the image encoding apparatus includes: an encoder configured to determine at least one coding unit for splitting an image, determine at least one transformation unit, based on a shape of a current coding unit included in the at least one coding unit, and encode the image by performing transformation, based on the at least one transformation unit; and a bitstream generator configured to generate a bitstream including the encoded image and block shape information indicating whether the current coding unit is a square shape or a non-square shape.

Mode of Disclosure

Advantages and features of one or more embodiments of the present disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure of the present disclosure will be thorough and complete and will fully convey the concept of the present embodiments to one of ordinary skill in the art, and the present disclosure will only be defined by the appended claims.

Terms used herein will now be briefly described and then one or more embodiments of the present disclosure will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

As used herein, the singular forms "a," "an" and "the" are intended to include the plural forms as well, unless the context clearly indicates otherwise.

When a part "includes" or "comprises" an element, unless there is a particular description contrary thereto, the part can further include other elements, not excluding the other elements. Also, the term "unit" in the embodiments of the present disclosure means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Hereinafter, an "image" may denote a still image of a video, or a moving image, i.e., a video itself.

Hereinafter, a "sample" denotes data that is assigned to a sampling location of an image and is to be processed. For example, pixel values in an image of a spatial domain, transformation coefficients on a transformation domain may be samples. A unit including at least one sample may be defined as a block.

Reference will now be made in detail to embodiments of the present disclosure, examples of which are illustrated in the accompanying drawings, to be easily executed by one of ordinary skill in the art. In the following description, well-known functions or constructions are not described in detail so as not to obscure the present disclosure with unnecessary detail.

FIG. 1 is a block diagram of an image decoding apparatus for decoding an image, based on a transformation unit included in a coding unit splitting an image, according to an embodiment.

Referring to FIG. 1, an image decoding apparatus 100 may include a bitstream obtainer 110 for obtaining, from a bitstream, certain information or syntax, such as block shape information or the like, according to an embodiment, and a decoder 120 for decoding an image by using obtained information. When the bitstream obtainer 110 of the image decoding apparatus 100 obtains the block shape information from the bitstream, according to an embodiment, the decoder 120 of the image decoding apparatus 100 may determine at least one coding unit for splitting an image based on the block shape information. In addition, the decoder 120 of the image decoding apparatus 100 may determine at least one transformation unit included in a current coding unit, based on a shape of the current coding unit that is one of the at least one coding unit, according to an embodiment. According to an embodiment, the block shape information may be information or syntax indicating whether the current coding unit is a square shape or a non-square shape.

According to an embodiment, the bitstream obtainer 110 of the image decoding apparatus 100 may obtain split information of the transformation unit from the bitstream, and the decoder 120 may parse the split information of the transformation unit from the bitstream to determine the at least one transformation unit included in the current coding unit. According to an embodiment, when the split information of the transformation unit indicates that a current transformation unit is split into a plurality of transformation units, the decoder 120 of the image decoding apparatus 100 may determine a plurality of transformation units included in the current coding unit, based on whether the current coding unit is a square shape or a non-square shape. Here, the current transformation unit may denote a data block used during processes of recursively splitting a tree structure into transformation units that are no longer split. In other words, the current transformation unit may be a data block of various shapes and sizes that may be determined to be split into a plurality of transformation units of small sizes during recursive split processes.

According to an embodiment, when the split information of the transformation unit indicates that the current transformation unit is split into a plurality of transformation units and the current coding unit is a square shape, the decoder 120 may determine the plurality of transformation units of a square shape included in the current coding unit.

According to an embodiment, when the split information of the transformation unit indicates that the current transformation unit is split into a plurality of transformation units and the current coding unit is a non-square shape, the decoder 120 may determine the plurality of transformation units by splitting the current coding unit in a vertical direction or a horizontal direction.

Figure 3A:
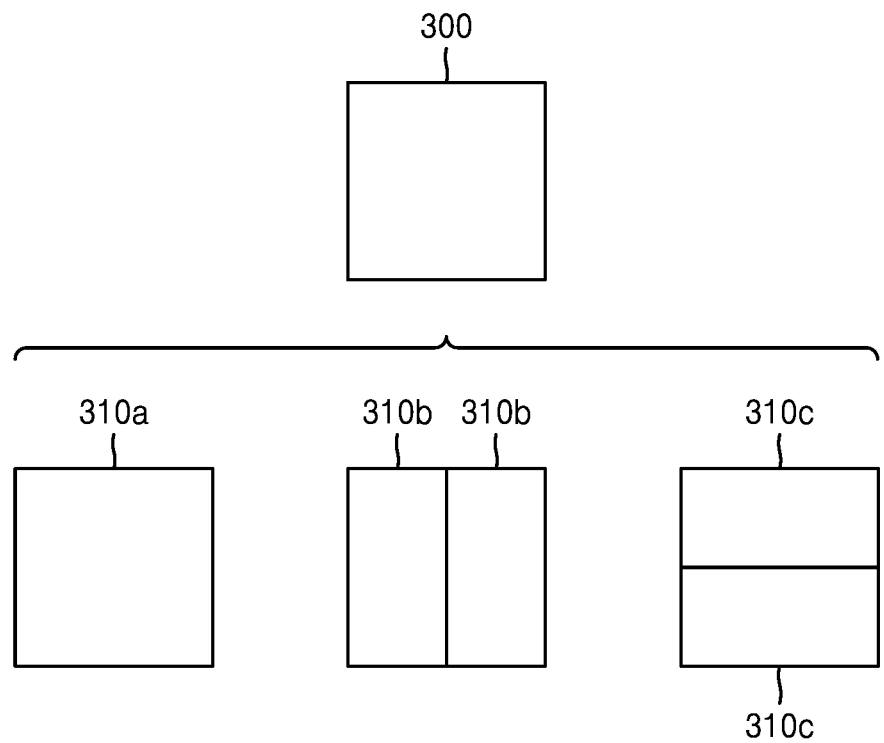
FIGS. 3A and 3B illustrate transformation units of various shapes that may be determined in a current coding unit of a square shape, according to an embodiment.
Figure 3B:
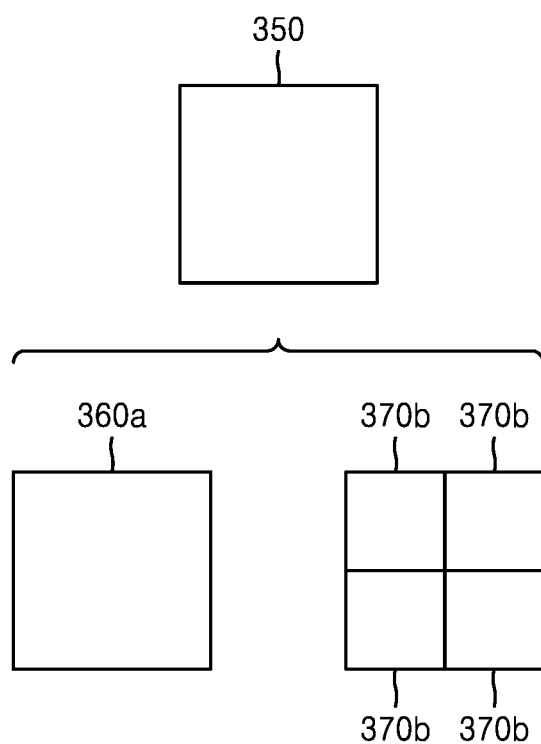

FIGS. 3A and 3B illustrate transformation units of various shapes that may be determined in a current coding unit of a square shape, according to an embodiment.

Referring to FIG. 3A, the decoder 120 of the image decoding apparatus 100 may determine at least one coding unit including a current coding unit 300, based on block shape information. Processes of determining a coding unit based on block shape information will be described below through various embodiments. A shape of the determined coding unit may be a square shape or a non-square shape. The decoder 120 may determine a shape of a transformation unit that may be included in the current coding unit 300, based on a shape of the current coding unit 300, according to an embodiment. For example, when the current coding unit 300 is a block of a square shape having a size of 2N×2N, the decoder 120 may determine a transformation unit 310a having a size of 2N×2N, a transformation unit 310b having a size of N×2N, or a transformation unit 310c having a size of 2N×N, as a shape of at least one transformation unit included in the current coding unit 300.

Referring to FIG. 3B, the decoder 120 of the image decoding apparatus 100 may determine at least one coding unit including a current coding unit 350, based on block shape information. The decoder 120 may determine a shape of a transformation unit that may be included in the current coding unit 350, based on a shape of the current coding unit 350 of a square shape, according to an embodiment. For example, when the current coding unit 350 is a block of a square shape having a size of 2N×2N, the decoder 120 may determine one transformation unit 360a having a size of 2N×2N or four transformation units 370b having a size of N×N, as a shape of at least one transformation unit included in the current coding unit 300.

According to an embodiment, various embodiments including FIGS. 3A and 3B may be used as a method by which the decoder 120 determines at least one transformation unit included in a coding unit of a square shape, and a shape of a determinable transformation unit may include various shapes in which embodiments are combined.

According to an embodiment, the bitstream obtainer 110 may obtain, from a bitstream, split information indicating whether to split a current transformation unit. The decoder 120 may determine at least one transformation unit included in a current coding unit, based on the split information of a transformation unit. For example, when the obtained split information of a transformation unit indicates that the current transformation unit is split into a plurality of transformation units, a plurality of transformation units included in the current coding unit may be determined based on whether the current coding unit is a square shape or a non-square shape. A shape of the current coding unit may be related to block shape information related to the current coding unit.

Figure 4A:
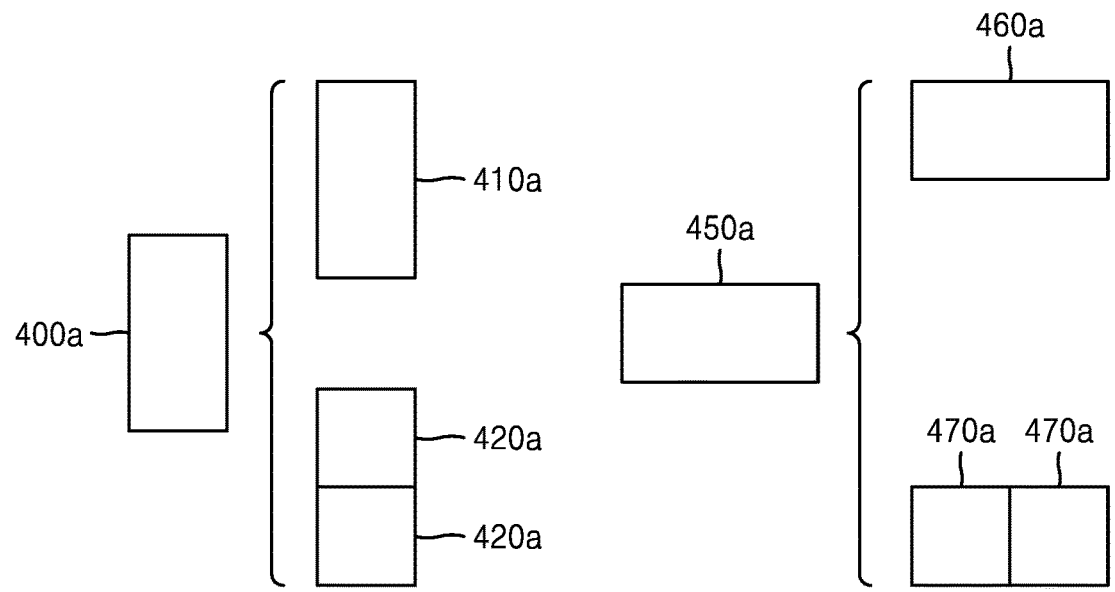
FIGS. 4A through 4C illustrate transformation units of various shapes that may be determined in a current coding unit of a non-square shape, according to an embodiment.
Figure 4B:
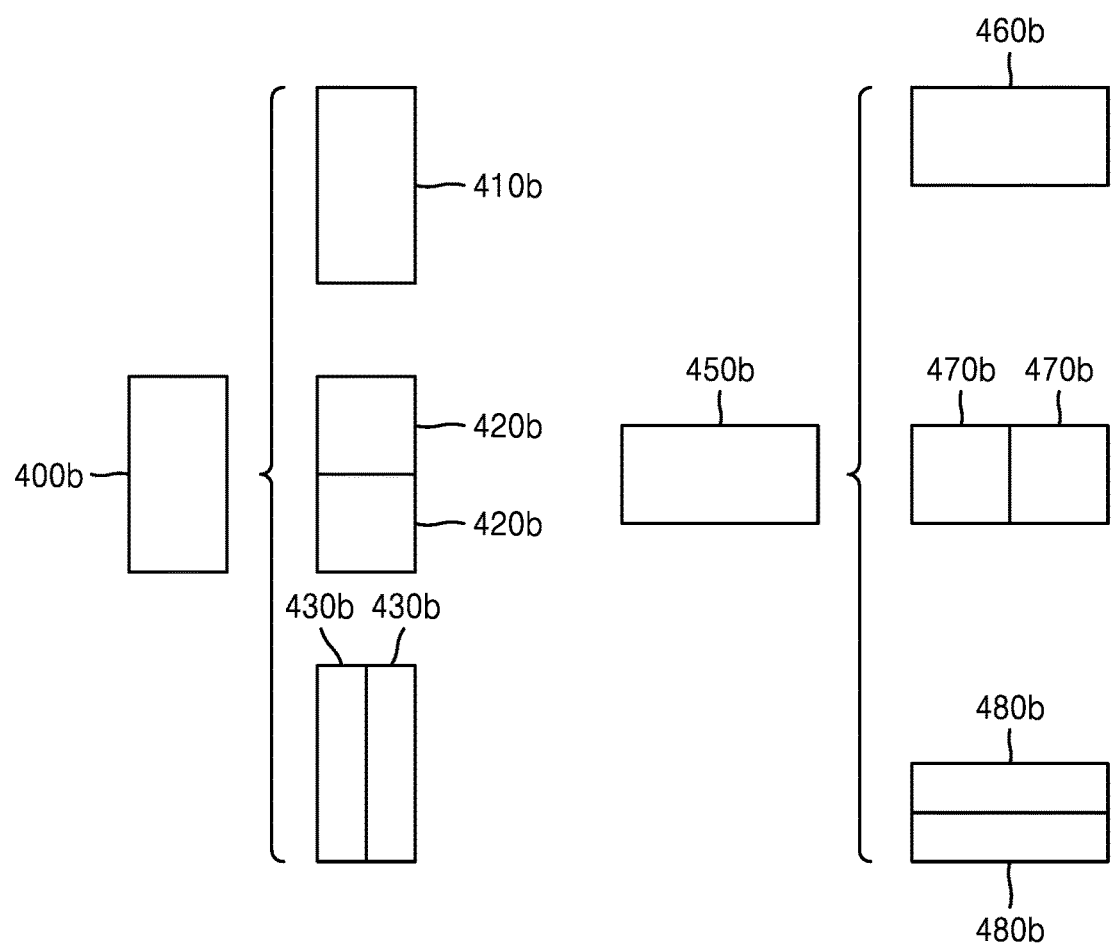
Figure 4C:
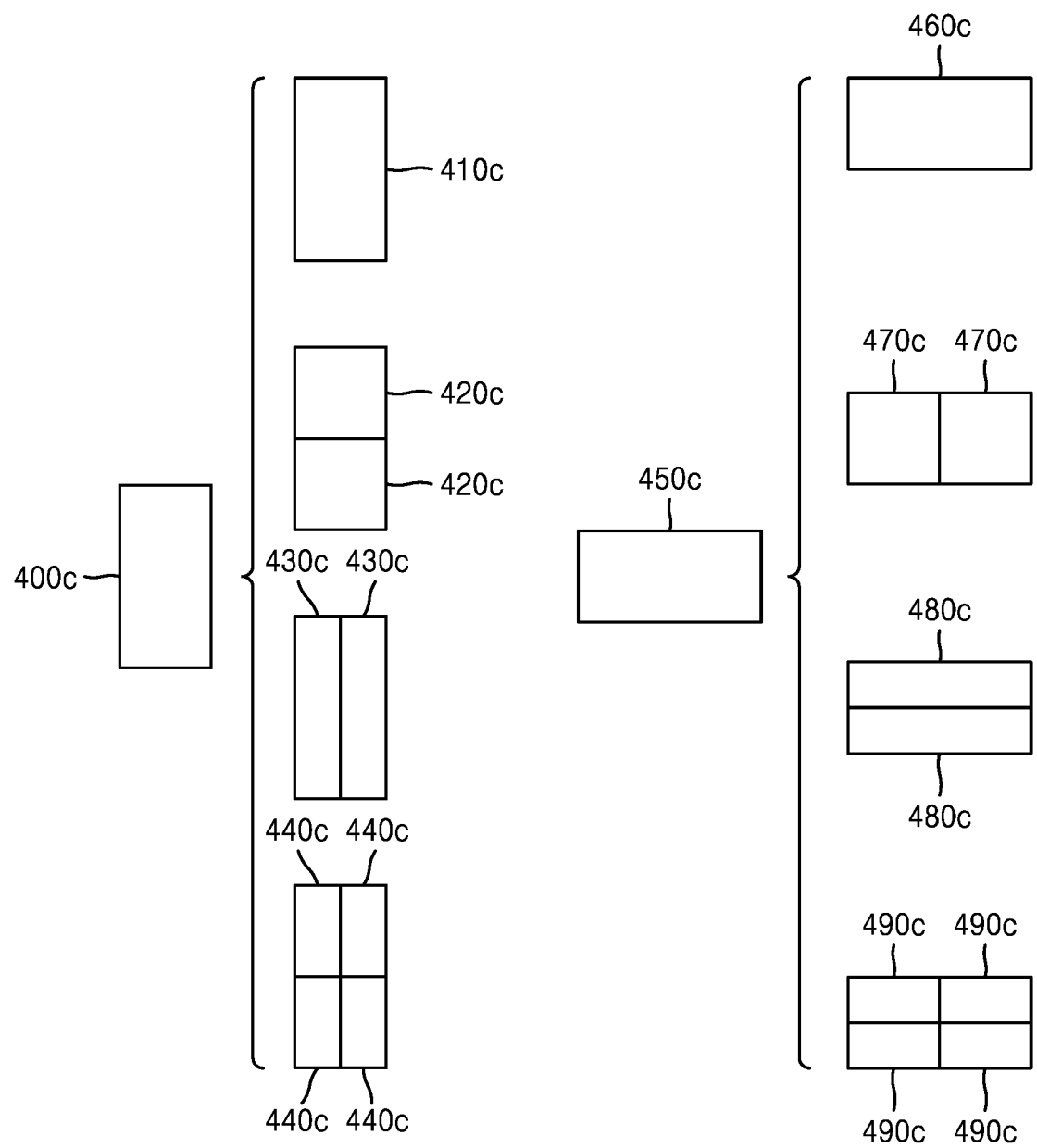

FIGS. 4A through 4C illustrate transformation units of various shapes that may be determined in a current coding unit of a non-square shape, according to an embodiment.

Referring to FIG. 4A, the decoder 120 may determine at least one transformation unit included in a current coding unit 400a of a non-square shape in which a height is longer than a width, according to an embodiment. The decoder 120 may determine the current coding unit 400a to include one transformation unit 410a or to include a plurality of transformation units 420a by splitting the current coding unit 400a in a horizontal direction. As another example, at least one transformation unit included in a current coding unit 450a of a non-square shape in which a width is longer than a height may be determined, according to an embodiment. The decoder 120 may determine the current coding unit 450a to include one transformation unit 460a or to include a plurality of transformation units 470a by splitting the current coding unit 450a in a horizontal direction. According to an embodiment, a shape of the plurality of transformation units 420a or 470a determined in the current coding unit 400a or 450a of the non-square shape may be a square shape.

Referring to FIG. 4B, the decoder 120 may determine at least one transformation unit included in a current coding unit 400b of a non-square shape in which a height is longer than a width, according to an embodiment. The decoder 120 may determine the current coding unit 400b to include one transformation unit 410b or to include a plurality of transformation units 420b or 430b by splitting the current coding unit 400b in a horizontal direction or a vertical direction. As another example, at least one transformation unit included in a current coding unit 450b of a non-square shape in which a width is longer than a height may be determined according to an embodiment. The decoder 120 may determine the current coding unit 450b to include one transformation unit 460b or to include a plurality of transformation units 470b or 480b by splitting the current coding unit 450b in a vertical direction or a horizontal direction.

Referring to FIG. 4C, the decoder 120 may determine at least one transformation unit included in a current coding unit 400c of a non-square shape in which a height is longer than a width, according to an embodiment. The decoder 120 may determine the current coding unit 400c to include one transformation unit 410c or to include a plurality of transformation units 420c or 430c by splitting the current coding unit 400c in a horizontal direction or a vertical direction, or may determine a plurality of transformation units 440c by splitting the current coding unit 400c in the vertical direction and the horizontal direction. As another example, at least one transformation unit included in a current coding unit 450c of a non-square shape in which a width is longer than a height may be determined, according to an embodiment. The decoder 120 may determine the current coding unit 450c to include one transformation unit 460c, to include a plurality of transformation units 470c or 480c by splitting the current coding unit 450c in a vertical direction or a horizontal direction, or to include a plurality of transformation units 490c by splitting the current coding unit 450c in the vertical direction and the horizontal direction.

However, because the shapes of at least one transformation unit described above have been described as embodiments of various shapes determinable by a transformation unit, based on a shape of a current coding unit, a combination of shapes of at least one transformation unit determinable by the decoder 120 is not limited to the above shapes and should be construed as including various types of shapes of transformation units included in the current coding unit.

According to an embodiment, the decoder 120 may determine the plurality of transformation units included in the current coding unit by comparing a size of the current coding unit and a largest size of the transformation unit.

Figure 5:
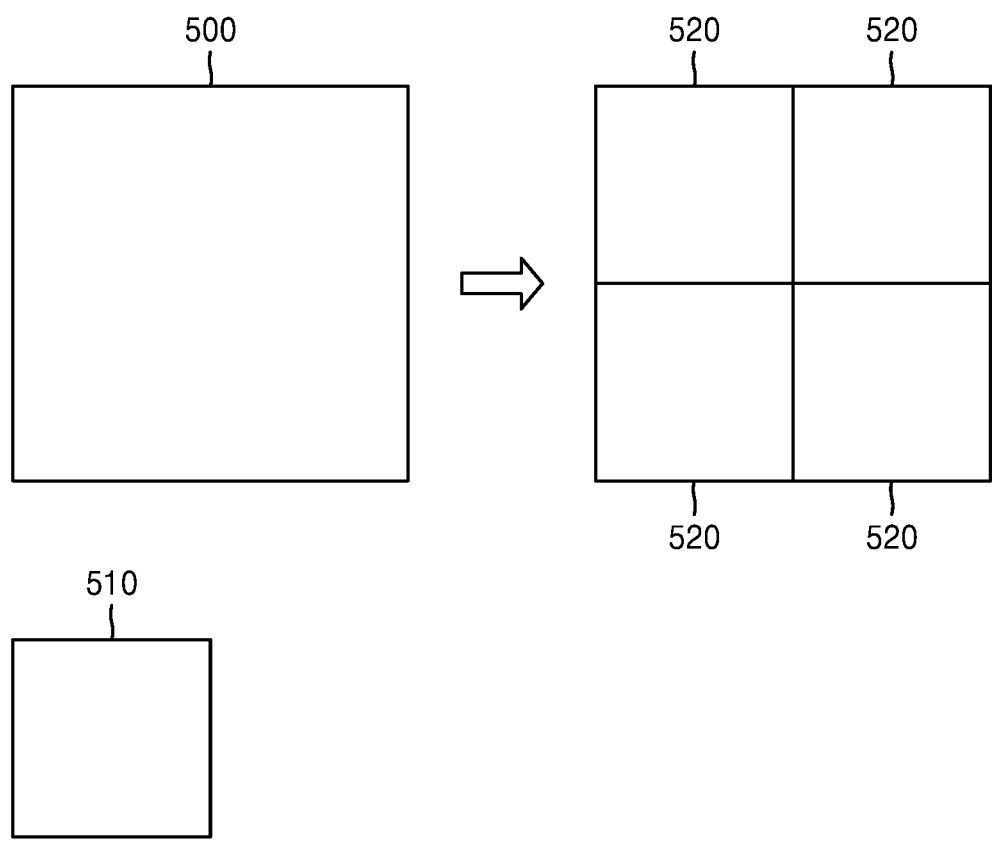
FIG. 5 illustrates processes by which a plurality of transformation units included in a current coding unit are determined based on a comparison result of a size of the current coding unit and a largest size of the transformation unit, according to an embodiment.

FIG. 5 illustrates processes of determining a plurality of transformation units included in a current coding unit, based on a comparison result of a size of the current coding unit and a largest size of the transformation unit, according to an embodiment.

According to an embodiment, the decoder 120 may determine at least one transformation unit included in a current coding unit 500, and a largest size of the transformation unit may be pre-determined. According to an embodiment, the decoder 120 may compare the current coding unit 500 and a transformation unit 510 having the pre-determined largest size. When the size of the current coding unit 500 is larger than the largest size of the transformation unit 520 based on a comparison result, the decoder 120 may determine a plurality of transformation units 520 having the largest size included in the current coding unit 500. Referring to FIG. 5, when the size of the current coding unit 500 is 2N×2N and the largest size of the transformation unit 510 is N×N, the decoder 120 may split) the current transformation unit into the transformation unit 520 of the largest size included in the current coding unit 500 together with processes for determining at least one transformation unit included in the current coding unit 500. In other words, the decoder 120 may determine a plurality of transformation units of a largest size included in a current coding unit and then determine whether to split each transformation unit of the largest size into transformation units of smaller sizes, so as to determine at least one transformation unit included in the current coding unit larger than the transformation unit of the largest size.

According to an embodiment, the bitstream obtainer 110 may obtain, from the bitstream, information about the largest size of the transformation unit. The information about the largest size of the transformation unit may be an integer directly indicating the largest size of the transformation unit or an index related to the largest size.

According to an embodiment, the bitstream obtainer 110 may obtain, from the bitstream, information about a block shape of the transformation unit, and the decoder 120 may determine at least one transformation unit included in the current coding unit, based on the information about the block shape of the transformation unit. The block shape of the transformation unit may vary, and information or syntax capable of indicating all various shapes of the transformation unit needs to be obtained from the bitstream in order for the decoder 120 to use all shapes to determine a transformation unit included in a data unit (for example, a picture, a slice, a slice segment, a tile, a largest coding unit, a coding unit, or the like). In this case, a data amount to be obtained by the bitstream obtainer 110 is relatively increased, and thus bitstream use efficiency may be decreased. According to an embodiment, a combination of shapes of the transformation unit may vary for each certain data unit (for example, a picture, a slice, a slice segment, a tile, a largest coding unit, a coding unit, or the like). For example, the bitstream obtainer 110 may obtain, from the bitstream, the information about the block shape of the transformation unit for each certain data unit, and the decoder 120 may differently determine a combination of block shapes of the transformation unit for each certain data unit, based on the information about the block shape of the transformation unit.

Figure 6:
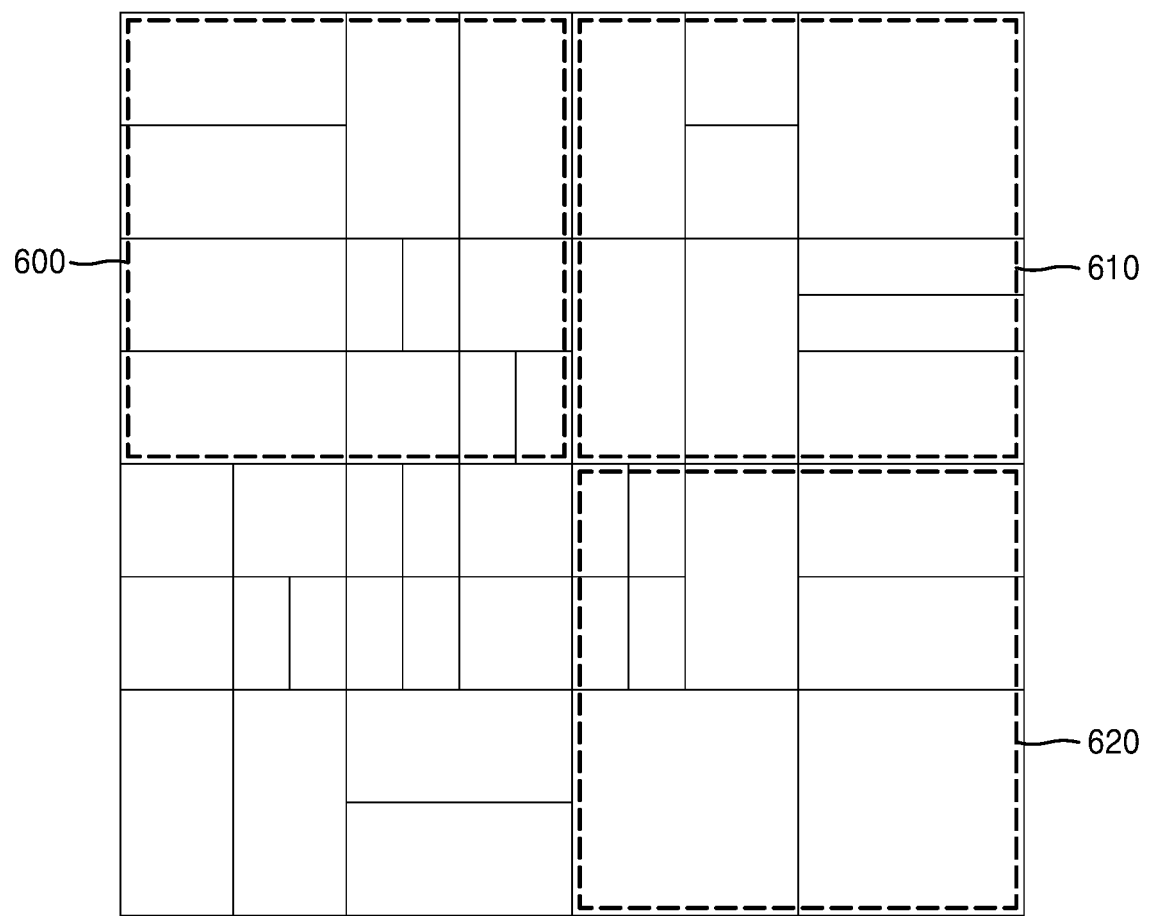
FIG. 6 is a diagram for describing a characteristic that a combination of shapes of transformation units may vary for each certain data unit, according to an embodiment.

FIG. 6 is a diagram for describing a characteristic that a combination of shapes of transformation units may vary for each certain data unit, according to an embodiment.

According to an embodiment, the bitstream obtainer 110 may obtain, from a bitstream, information about a block shape of a transformation unit for each of largest coding units 600 through 630 that are certain data units, and the decoder 120 may determine at least one transformation unit, based on the information about the block shape of the transformation unit obtained for each largest coding unit. Here, the information about the block shape of the transformation unit may be information indicating combinations of pre-determined block shapes including shapes of transformation units of small sizes, which may be determined as a transformation unit of a square shape or non-square shape is split. Hereinafter, for convenience of description, the combinations of block shapes indicated by the information about the block shape of the transformation unit will be described based on the shapes of FIGS. 4A through 4C.

Referring to FIG. 6 according to an embodiment, the bitstream obtainer 110 may obtain a bitstream including information indicating a combination including shapes of transformation units shown in FIG. 4A, in relation to the largest coding unit 600. In this case, the decoder 120 may determine at least one transformation unit included in one of at least one coding unit included in the largest coding unit 600 by using the shapes of transformation units described through FIG. 4A. In other words, the decoder 120 may determine a transformation unit by splitting a long side of a transformation unit of a non-square shape or not splitting the transformation unit, within the largest coding unit 600.

Referring to FIG. 6 according to an embodiment, the bitstream obtainer 110 may obtain a bitstream including information indicating a combination including shapes of transformation units shown in FIG. 4B, in relation to the largest coding unit 610. In this case, the decoder 120 may determine at least one transformation unit included in one of at least one coding unit included in the largest coding unit 610, by using the shapes of transformation units described through FIG. 4B. In other words, the decoder 120 may determine at least one transformation unit by splitting a transformation unit of a non-square shape in a vertical direction or a horizontal direction or not splitting the transformation unit, within the largest coding unit 610.

Referring to FIG. 6 according to an embodiment, the bitstream obtainer 110 may obtain a bitstream including information indicating a combination including shapes of transformation units shown in FIG. 4C, in relation to the largest coding unit 620. In this case, the decoder 120 may determine at least one transformation unit included in one of at least one coding unit included in the largest coding unit 610, by using the shapes of transformation units described through FIG. 4C. In other words, the decoder 120 may determine at least one transformation unit by splitting a transformation unit of a non-square shape in at least one of a vertical direction or a horizontal direction or not splitting the transformation unit, within the largest coding unit 620.

According to an embodiment, the bitstream obtainer 110 may obtain a bitstream including information indicating a combination of shapes of transformation units shown in FIGS. 3A and 3B, in relation to the largest coding unit 600. The decoder 120 may determine, by using the shapes of the transformation units described through FIGS. 3A and 3B, at least one transformation unit included in one of at least one coding unit included in the largest coding unit 600. A combination of shapes of transformation units determinable as a transformation unit of a square shape is split is not limited to the shapes shown in FIGS. 3A and 3B, and may include combinations including partial shapes among the shapes shown in FIGS. 3A and 3B.

According to an embodiment, the bitstream obtainer 110 may obtain, from a bitstream, at least one of information indicating a shape of a transformation unit usable by the decoder 120 or information indicating a size of a transformation unit, for each certain data unit. For example, the image decoding apparatus 100 may obtain at least one of the information indicating a shape of a transformation unit or the information indicating a size of a transformation unit, from one of a sequence parameter set, a picture parameter set, a video parameter set, a slice header, and a slice segment header. In addition, the image decoding apparatus 100 may obtain, from the bitstream, and use the information indicating a shape of a transformation unit and the information indicating a size of a transformation unit, for each largest coding unit, reference coding unit, and processing block. Characteristics of the reference coding unit and processing block will be described later.

According to an embodiment, the bitstream obtainer 110 of the image decoding apparatus 100 may obtain, from a bitstream, at least one of information about a largest size or information about a smallest size of a transformation unit. At least one of the largest size or the smallest size of the transformation unit may be pre-determined according to an embodiment, and accordingly, at least one of the information about a largest size of a transformation unit or the information about a smallest size of a transformation unit may be obtained from the bitstream through the bitstream obtainers 110. The decoder 120 may determine at least one transformation unit by using a largest size and a smallest size of a transformation unit determinable by using the obtained information. According to an embodiment, the information about a largest size of a transformation unit and the information about a smallest size of a transformation unit may be obtained for each certain data unit (a sequence, a picture, a slice, a slice segment, a tile, a largest coding unit, a coding unit, or the like). For example, when the bitstream obtainer 110 obtains at least one of the information about a largest size of a transformation unit or the information about a smallest size of a transformation unit from the bitstream for each sequence including a plurality of pictures, the decoder 120 may determine a largest size and a smallest size of a transformation unit for each sequence by using such information. According to an embodiment, the information about a largest size of a transformation unit and the information about a smallest size of a transformation unit may be information indicating a length of one side of a transformation unit of a square shape or length of a long side of a non-square shape, or may be an index indicating a size of pre-determined block. Information indicating a length of a side of a transformation unit may be the number of samples or the number of samples on which a log operation is performed.

According to an embodiment, the bitstream obtainer 110 may obtain a bitstream including the information about a largest size of a transformation unit and the information about a smallest size of a transformation unit, and information indicating a difference between a largest size and a smallest size of a transformation unit, from the bitstream. The decoder 120 may determine a largest size or a smallest size of a transformation unit by using one of the information about a largest size of a transformation unit and the information about a smallest size of a transformation unit, and the information indicating a difference between a largest size and a smallest size of a transformation unit. According to an embodiment, the decoder 120 may determine a largest size of a transformation unit by using the information about a smallest size of a transformation unit and the information indicating a difference between a largest size and a smallest size of a transformation unit. According to an embodiment, the decoder 120 may determine a smallest size of a transformation unit by using the information about a largest size of a transformation unit and the information indicating a difference between a largest size and a smallest size of a transformation unit.

According to an embodiment, the decoder 120 may determine a transformation unit for performing inverse transformation of a luma component and a chroma component of an image, for each component. According to an embodiment, the decoder 120 may differently set a smallest size of a transformation unit regarding a luma component of an image and a smallest size of a transformation unit regarding a chroma component. For example, the decoder 120 may determine a smallest size of a transformation unit regarding a luma component to 4×4 and determine a smallest size of a transformation unit regarding a chroma component to 4×2 or 2×4. In other words, the decoder 120 may determine a smallest size of a transformation unit by distinguishing a luma component and a chroma component, in consideration of a relationship or proportion of the luma component and the chroma component used according to a method of decoding an image. According to an embodiment, the decoder 120 may set a smallest size of a transformation unit of a luma component and a smallest size of a transformation unit of a chroma component of an image to be different, and set a largest size thereof to be the same.

Figure 7:
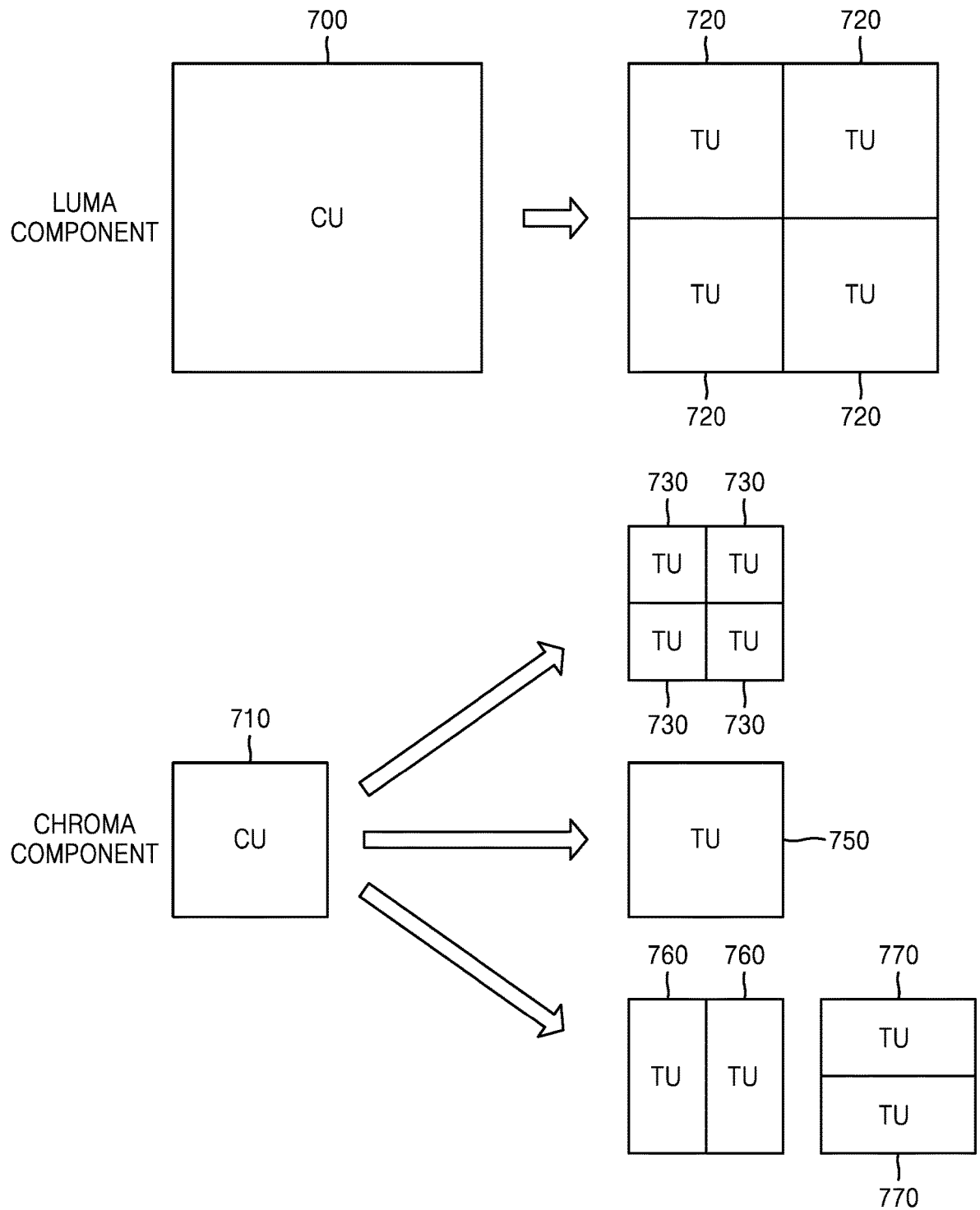
FIG. 7 illustrates a transformation unit of a smallest size that may be determined for each luma component and a chroma component, according to an embodiment.

FIG. 7 illustrates a transformation unit of a smallest size that may be determined for each luma component and a chroma component, according to an embodiment.

According to an embodiment, the decoder 120 may determine at least one transformation unit included in a current coding unit 700 regarding a luma component of an image, and may determine at least one transformation unit included in a current coding unit 710 regarding a chroma component of an image. According to an embodiment, the decoder 120 may set a smallest size of a transformation unit regarding the luma component and a smallest size of a transformation unit regarding the chroma component to be different. For example, the decoder 120 may determine the smallest size of the transformation unit regarding the luma component to 4×4, and determine the smallest size of the transformation unit regarding the chroma component to 4×2 or 2×4.

According to an embodiment, when a size of the current coding unit 700 regarding the luma component is 8×8, the decoder 120 may determine at least one transformation unit having a size equal to or greater than 4×4, as at least one transformation unit included in the current coding unit 700 regarding the luma component. Referring to FIG. 7, the decoder 120 may determine four transformation units included in the current coding unit 710 having the size of 8×8, and in this case, the transformation unit may have a size of 4×4 that is a smallest size.

According to an embodiment, the decoder 120 may determine the current coding unit 710 regarding the chroma component related to the luma component of the current coding unit 700. According to an embodiment, when the size of the current coding unit 700 regarding the luma component is 2N×2N, the decoder 120 may determine the size of the current coding unit 710 regarding the chroma component related to the luma component to N×N. Referring to FIG. 7, when the size of the current coding unit 700 regarding the luma component is 8×8 according to an embodiment, the size of the current coding unit 710 regarding the chroma component may be determined to be 4×4.

According to an embodiment, a size of a transformation unit regarding a chroma component may be a size obtained by splitting a transformation unit regarding a luma component in at least one of a vertical direction or a horizontal direction. In other words, the transformation unit regarding the chroma component may have a size smaller than that of the transformation unit regarding the luma component.

According to an embodiment, smallest sizes of the transformation unit regarding the luma component and the transformation unit regarding the chroma component may be different. Hereinafter, for convenience of description, an embodiment in which the smallest size of the transformation unit regarding the luma component is 4×4 and the smallest size of the transformation unit regarding the chroma component is 4×2 or 2×4 will be described.

According to an embodiment, the decoder 120 may determine at least one transformation unit included in the current coding unit 710 regarding the chroma component, in consideration of the smallest size of the transformation unit. According to an embodiment, the transformation unit regarding the chroma component may have a size obtained as the decoder 120 splits the transformation unit regarding the luma component in the vertical direction and the horizontal direction. However, when the size obtained by splitting the transformation unit regarding the luma component in the vertical direction and the horizontal direction is smaller than the smallest size of the transformation unit regarding the chroma component, the decoder 120 may determine the transformation unit regarding the chroma component, in consideration of the smallest size of the transformation unit regarding the chroma component.

According to an embodiment, when the size obtained by splitting the transformation unit regarding the luma component in the vertical direction and the horizontal direction is smaller than the smallest size of the transformation unit regarding the chroma component, the decoder 120 may determine the transformation unit regarding the chroma component having the smallest size.

According to an embodiment, when the size obtained by splitting the transformation unit regarding the luma component in the vertical direction and the horizontal direction is smaller than is smaller than the smallest size of the transformation unit regarding the chroma component, the decoder 120 may determine a transformation unit having a size equal to or greater than the smallest size of the transformation unit regarding the chroma component by merging transformation units having sizes obtained by splitting the transformation unit regarding the luma component in the vertical direction and the horizontal direction. For example, the decoder 120 uses the size of the transformation unit regarding the luma component as the size of the transformation unit regarding the chroma component, without splitting the transformation unit regarding the luma component in the vertical direction and the horizontal direction. As another example, when it is determined that the size of the transformation unit obtained by splitting the transformation unit regarding the luma component in the vertical direction and the horizontal direction is smaller than the smallest size of the transformation unit of the chroma component, the decoder 120 may merge transformation units obtained by splitting the transformation unit regarding the chroma component in the smallest sizes. For example, at least one transformation unit regarding the chroma component having the smallest size may be determined by merging four transformation units having a size of 2×2, by comparing the smallest size of the transformation unit regarding the chroma component and the four transformation units having the size of 2×2 determined as the transformation unit regarding the luma component and having the size of 4×4 is split.

Referring to FIG. 7, the decoder 120 may determine at least one transformation unit (for example, 730, 750, 760, or 770) included in the current coding unit 710 regarding the chroma component. The decoder 120 may determine the transformation unit regarding the chroma component, in consideration of the smallest size of the transformation unit, and the smallest size of the transformation unit may vary according to the luma component and the chroma component. When the size of the current coding unit 710 regarding the chroma component is 2N×2N, the decoder 120 may determine the transformation unit 730 having a size of N×N, the transformation unit 750 having a size of 2N×2N, or the transformation unit 760 or 770 having a size of 2N×N or N×2N. According to an embodiment, the decoder 120 may determine the transformation unit in consideration of the smallest size of the transformation unit regarding the chroma component. For example, when the smallest size of the transformation unit regarding the chroma component is 4×2 or 2×4, the decoder 120 is unable to determine the four transformation units 730 having a size of 2×2 from the current coding unit 710 having a size of 4×4. In this case, the decoder 120 may merge the transformation units 730 having the size of 2×2 to determine the transformation unit 760 having the size of 2×4 or the transformation unit 770 having the size of 4×2. As another example, the decoder 120 may skip processes of determining the four transformation units 730 having the size of 2×2, and may determine the transformation unit having the smallest size as at least one transformation unit included in the current coding unit 710.

According to an embodiment, the bitstream obtainer 110 may obtain, from the bitstream, information indicating whether a current transformation unit includes a non-zero transformation coefficient, and the decoder 120 may perform a decoding process on a sample included in a transformation unit of a current depth by using the information indicating whether a non-zero transformation coefficient is included. Here, the information indicating whether the non-zero transformation coefficient is included may be information related to the transformation unit of the current depth determined during split processes of the transformation unit, and the transformation unit of the current depth may be split into transformation units of smaller sizes afterwards.

According to an embodiment, the decoder 120 may determine whether to perform residual signal decoding processes on the transformation unit of the current depth, based on the information indicating whether the non-zero transformation coefficient is included in the transformation unit of the current depth. In other words, when the non-zero transformation coefficient is not included in the transformation unit of the current depth, the decoding processes of residual signal on the transformation unit of the current depth may be omitted. On the other hand, when the non-zero transformation coefficient is included in the transformation unit of the current depth, the decoding processes may be performed by obtaining a residual signal regarding the transformation unit of the current depth from the bitstream.

According to an embodiment, the bitstream obtainer 110 may obtain, from the bitstream, the information indicating whether the non-zero transformation coefficient is included in the transformation unit of the current depth for each luma component and chroma component related to the current coding unit. In other words, the bitstream obtainer 110 may obtain, from the bitstream, at least one of the information indicating whether the non-zero transformation coefficient is included in the transformation unit of the current depth regarding the luma component or the information indicating whether the non-zero transformation coefficient is included in the transformation unit of the current depth regarding the chroma component.

According to an embodiment, the bitstream obtainer 110 may obtain, from the bitstream, at least one of the information indicating whether the non-zero transformation coefficient is included in the transformation unit of the current depth regarding the luma component or the information indicating whether the non-zero transformation coefficient is included in the transformation unit of the current depth regarding the chroma component, even when the transformation unit of the current depth is no longer split during split processes for determining at least one transformation unit included in the current coding unit.

According to an embodiment, the image decoding apparatus 100 may obtain the bitstream including the information indicating whether the non-zero transformation coefficient is included in the transformation unit of the current depth for each luma component and chroma component. While using a method of obtaining the information indicating whether the non-zero transformation coefficient is included, the image decoding apparatus 100 may differently use the method for each transformation unit regarding the luma component and transformation unit regarding the chroma component. For example, in order to obtain the information indicating whether the non-zero transformation coefficient is included in the transformation unit of the current depth regarding the chroma component, the bitstream obtainer 110 may obtain, from the bitstream, the information for each transformation unit of the current depth used during the split processes. As another example, the bitstream obtainer 110 may obtain, from the bitstream, information indicating whether the non-zero transformation coefficient is included in the transformation unit of the current depth regarding the luma component, only when the transformation unit of the current depth is no longer split. However, the above embodiment is an example for describing that the method of obtaining the information indicating whether the non-zero transformation coefficient is included in the transformation unit may vary for each luma component or chroma component, and thus the method of obtaining the information indicating whether the non-zero transformation coefficient is included in the transformation unit including the luma component or chroma component may be embodied according to a combination of various embodiments.

Figure 8:
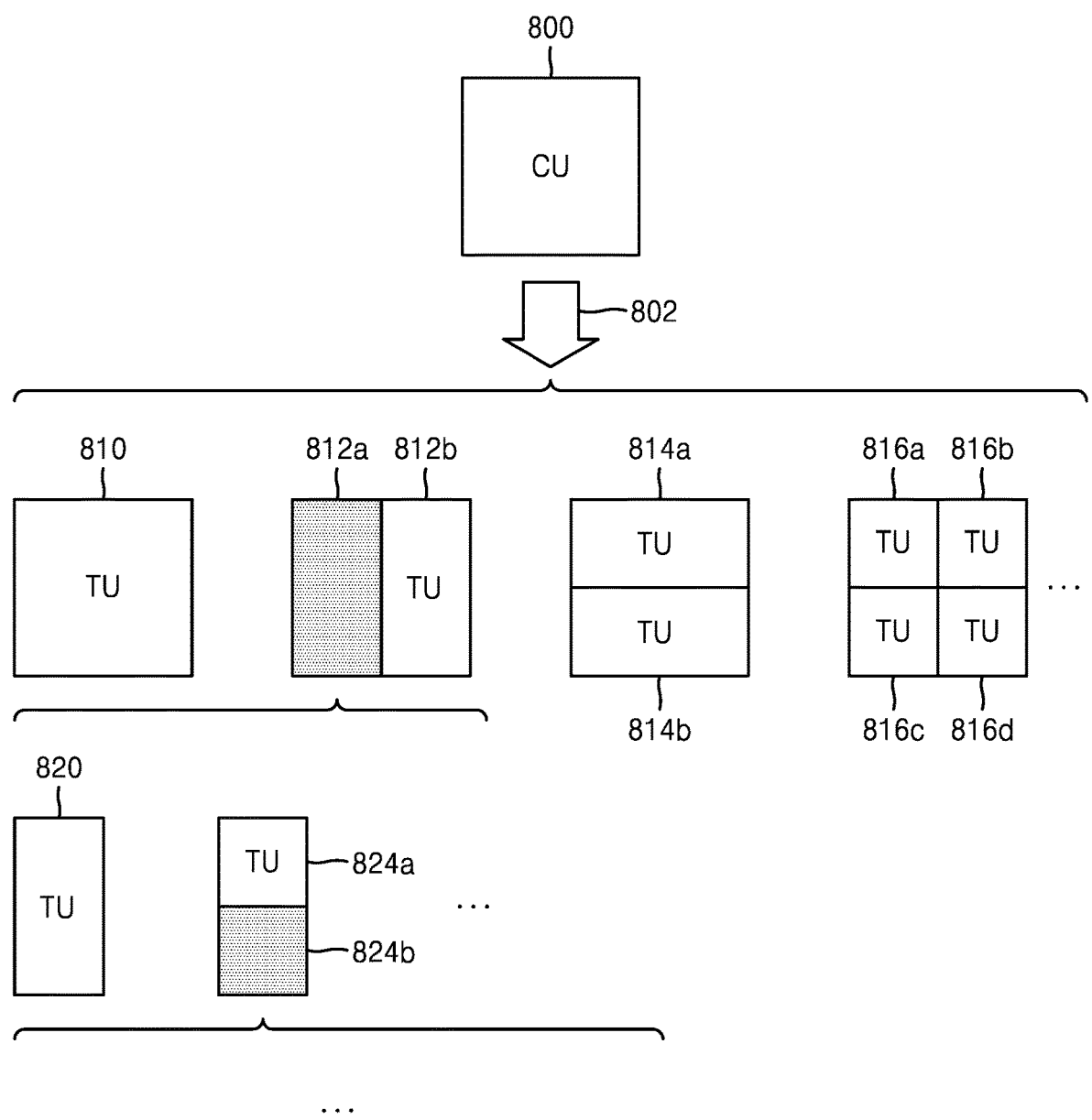
FIG. 8 is a diagram for describing processes of obtaining information indicating whether a non-zero transformation coefficient is included in a transformation unit of a current depth during a process of determining at least one transformation unit included in a current coding unit, according to an embodiment.

FIG. 8 is a diagram for describing processes of obtaining information indicating whether a non-zero transformation coefficient is included in a transformation unit of a current depth during a process of determining at least one transformation unit included in a current coding unit, according to an embodiment.

According to an embodiment, the decoder 120 may determine at least one transformation unit included in a current coding unit 800. Because a method of determining a transformation unit has been described above through FIGS. 3A, 3B, and 4A through 4C, details thereof will be omitted. Referring to FIG. 8, the decoder 120 may perform split processes 802 of at least one transformation unit included in the current coding unit 800. The decoder 120 may perform processes of determining a block having the same size as the current coding unit 800 as a transformation unit of a current depth, and then splitting the transformation unit of the current depth. According to an embodiment, blocks determined as the transformation unit of the current depth is split may be blocks of a depth lower than the current depth of the transformation unit before being split. However, when a depth is determined based on a long side of a block according to an embodiment, a depth of the blocks determined as the transformation unit of the current depth is split to smaller sizes (for example, split only in a horizontal direction or vertical direction) may also be the same as the current depth.

According to an embodiment, when it is determined that the transformation unit of the current depth is no longer split into blocks of small sizes, the decoder 120 may perform decoding of an image by using the transformation unit of the current depth. The decoder 120 may determine, as a transformation unit, a block 810 having the same size as the current coding unit 800 or determine a plurality of blocks 812a and 812b, 814a and 814b, or 816a through 816d by splitting the block 810 having the same size as the current coding unit 800. When the transformation unit of the current depth is no longer split during the split processes for determining a transformation unit, the decoder 120 may decode an image by using the transformation unit of the current depth. When the transformation unit (for example, 812a) of the current depth is split into smaller sizes, the decoder 120 may further split the transformation unit of the current depth, which may be recursive split processes. The decoder 120 may perform split processes on the transformation unit 812a of a non-square shape, and because such split processes have been described with reference to FIGS. 4A through 4C, details thereof will be omitted.

According to an embodiment, the bitstream obtainer 110 may obtain the information indicating whether the non-zero transformation coefficient is included in the transformation unit of the current depth determined during the split processes for determining at least one transformation unit, for each transformation unit of the current depth. Referring to FIG. 8, the decoder 120 may recursively split the block having the same size as the current coding unit 800 so as to determine at least one transformation unit included in the current coding unit 800. For example, while the decoder 120 determines a transformation unit 824a among the at least one transformation unit included in the current coding unit 800, the bitstream obtainer 110 may obtain the information indicating whether the non-zero transformation coefficient is included in the transformation unit of the current depth when the transformation unit of the current depth having the same size as the current coding unit 800 is split in the vertical direction and obtain the information indicating whether the non-zero transformation coefficient is included in the split block 812a again when the transformation unit 812a among transformation units split from the transformation unit of the current depth is split in the horizontal direction.

According to an embodiment, the bitstream obtainer 110 may obtain the information indicating whether the non-zero transformation coefficient is included in the at least one transformation unit included in the current coding unit for each of at least one transformation unit. Referring to FIG. 8, the decoder 120 may recursively split the transformation unit of the current depth having the same size as the current coding unit 800 to determine at least one transformation unit included in the current coding unit 800. The bitstream obtainer 110 may obtain, from the bitstream, the information indicating whether the non-zero transformation coefficient is included in the transformation unit that is no longer split. For example, while the decoder 120 determines the transformation unit 824a among the at least one transformation unit included in the current coding unit 800, it is not required for the bitstream obtainer 110 to obtain the information indicating whether the non-zero transformation coefficient is included when a block having the same size as the current coding unit 800 is split in the vertical direction and when the transformation unit 812a among split blocks is split in the horizontal direction. The bitstream obtainer 110 may obtain, from the bitstream, the information indicating whether the non-zero transformation coefficient is included in the transformation unit 824a during decoding processes of the transformation unit 824a when the transformation unit 824a that is no longer split is determined.

However, the details described with reference to FIG. 8 is merely an example used for convenience of description, and thus a shape of a current coding unit may indicate not only a square shape, but also a non-square shape, and processes of determining a transformation unit should not be limited to the processes shown in FIG. 8.

The image decoding apparatus 100 may differently determine the method of obtaining, from the bitstream, the information indicating whether the non-zero transformation coefficient is included in the transformation unit of the current depth, based on at least one of a block shape of the current coding unit, which one of a luma component and a chroma component of the image is related to the current coding unit, a prediction mode used n the current coding unit, or the number of transformation units included in the current coding unit.

According to an embodiment, the image decoding apparatus 100 may differently determine the method of obtaining, from the bitstream, information indicating whether the non-zero transformation coefficient is included in the current block, based on a shape of a coding unit. According to an embodiment, the bitstream obtainer 110 may obtain the information indicating whether the non-zero transformation coefficient is included in each transformation unit determined during the split processes for determining at least one transformation unit, for each transformation unit of the current depth. Moreover, the bitstream obtainer 110 may obtain the information indicating whether the non-zero transformation coefficient is included in the transformation unit of the current depth only when the transformation unit of the current depth is no longer split.

For example, as described with reference to FIGS. 3A and 3B, the image decoding apparatus 100 may determine at least one transformation unit included in a coding unit of a square shape or non-square shape. The decoder 120 may determine at least one transformation unit included in a current coding unit via recursive split processes of a transformation unit. According to an embodiment, when a shape of the current coding unit is a non-square shape, the bitstream obtainer 110 may obtain information indicating whether a non-zero transformation coefficient is included, for each transformation unit of a current depth used in split processes of a transformation unit for determining at least one transformation unit.

According to an embodiment, the image decoding apparatus 100 may differently determine a method of obtaining, from a bitstream, information indicating whether a non-zero transformation coefficient is included in a current block, based on a block shape of a coding unit and which one of a luma component and a chroma component of an image is related to a current coding unit. According to an embodiment, when the shape of the current coding unit is a non-square shape and the current coding unit is a coding unit related to a chroma component of an image, the bitstream obtainer 110 may generate the information indicating whether the non-zero transformation coefficient is included for each transformation unit of a current depth used during split processes of a transformation unit for determining at least one transformation unit.

According to an embodiment, the image decoding apparatus 100 may differently determine a method of obtaining, from a bitstream, information indicating whether a non-zero transformation coefficient is included in a current block, based on a block shape of a coding unit and a prediction mode used in a current coding unit. According to an embodiment, when the shape of the current coding unit is a non-square shape and an intra prediction mode may be used in the current coding unit, the bitstream obtainer 110 may generate information indicating whether a non-zero transformation coefficient is included for each transformation unit of a current depth used during split processes of a transformation unit for determining at least one transformation unit.

According to an embodiment, the image decoding apparatus 100 may determine a method of obtaining information indicating whether a non-zero transformation coefficient is included in a transformation unit, based on a shape of a transformation unit of a current depth. For example, when the transformation unit of the current depth is a square shape, the bitstream obtainer 110 may use the method of obtaining information indicating whether a non-zero transformation coefficient is included differently for each transformation unit regarding a luma component and a transformation unit regarding a chroma component. On the other hand, when the transformation unit of the current depth is a non-square shape, the bitstream obtainer 110 may use the same method with respect to using methods of obtaining information indicating whether a non-zero transformation coefficient is included in a transformation unit regarding a luma component and a transformation unit regarding a chroma component (for example, a method of obtaining information for each transformation unit of a current depth used during split processes or a method of obtaining information only when a transformation unit of a current depth is no longer split).

However, a method of, performed by the image decoding apparatus 100, obtaining, from a bitstream, information indicating whether a non-zero transformation coefficient is included in a current block, based on a combination of various conditions described above should not be limitedly construed as being obtained for each block split processes for determining at least one transformation unit, and may be variously used for each combination of conditions. In other words, a method of obtaining information indicating whether a non-zero transformation coefficient is used for each transformation unit of a current depth or a method of obtaining information indicating whether a non-zero transformation coefficient is included in a transformation unit of a current depth only when the transformation unit is no longer split may be used by distinguishing cases based on a combination of various conditions described above.

According to an embodiment, the decoder 120 may determine at least one transformation unit based on at least one of a shape or size of a current coding unit. For example, the decoder 120 may determine a transformation unit having the same shape as the current coding unit without performing split processes for determining a transformation unit when the current coding unit is a non-square shape. According to an embodiment, the decoder 120 may split the current transformation unit into a plurality of transformation units equal to or greater than a smallest size of the transformation unit, when the current coding unit is a non-square shape and a transformation unit having the same shape as the current coding unit is not usable.

According to an embodiment, even when a smallest size of a transformation unit is 4×4, the decoder 120 may not determine that two transformation units of a size of 4×4 are included when a current coding unit is a non-square shape of 4×8 or 8×4. In this case, the decoder 120 may determine a transformation unit of a non-square shape of 4×8 or 8×4 having the same size as the current coding unit.

According to an embodiment, the decoder 120 may determine a depth of a transformation unit, based on a length of long side of the transformation unit. In other words, the decoder 120 may determine a depth of a split block to be the same as a current depth when a length of a long side of the split block is the same as the long side of the transformation unit of the current depth even when the transformation unit of the current depth is split (for example, when a transformation unit of a square shape is split only in a vertical direction or a horizontal direction).

According to an embodiment, the image decoding apparatus 100 may obtain, from a bitstream, at least one syntax related to a transformation unit, based on a shape of a transformation unit of a current depth.

According to an embodiment, the decoder 120 may decode a residual signal based on at least one transformation unit included in a current coding unit. The bitstream obtainer 110 may obtain, from a bitstream, information related to the residual signal, based on determined at least one transformation unit, and the decoder 120 may perform decoding by using the obtained information related to the residual signal.

According to an embodiment, the bitstream obtainer 110 may obtain, from a bitstream, a bin string about a residual signal among one of at least one transformation unit. Such a decoder 120 may decode a syntax by using the bin string, and during such decoding processes, the decoder 120 may use various types of context information. Such context information may include various types of information used during context-based adaptive binary arithmetic code (CABAC) decoding processes. For example, the context information may indicate a context index used to determine a syntax corresponding to the bin string. The decoder 120 may determine a value corresponding to the context index as an initial value by using a context table, and perform CABAC decoding by using the determined initial value.

According to an embodiment, the decoder 120 may consider various types of information to determine context information. For example, the decoder 120 may consider a shape of a transformation unit of a current depth to determine the context information. In other words, the context information used in CABAC may vary according to the shape of the transformation unit. According to an embodiment, the decoder 120 may determine the context information by using at least one of a type of syntax, a depth of a coding unit to which a transformation unit of a current depth is included, a syntax of an adjacent block, a size of a transformation unit, or a shape of a transformation unit, so as to determine the context information.

According to an embodiment, the decoder 120 may determine context information based on a shape of a transformation unit, wherein such context information may indicate a context index used to determine a syntax corresponding to a bin string and such a context index may be determined by using a context index offset (ctxIdxOffset) and a value (for example, ctxInc) added to the context index offset. In other words, the decoder 120 may determine the context index (ctxIndx) by adding ctxIdxOffset and ctxInc. According to an embodiment, the context index offset (ctxIdxOffset) may be defined to be a smallest value of the context index (ctxIdx) determinable on a context table (ctxTable), based on an initial type (initType) used during arithmetic initialization processes of syntax. In order to determine ctxInc, the decoder 120 may use at least one of a type of syntax, a depth of a coding unit to which a transformation unit of a current depth is included, a syntax of an adjacent block, a size of a transformation unit, or a shape of a transformation unit, and determine the context index (CtxIdx) by adding the determined ctxInc and ctxIdxOffset. According to an embodiment, the decoder 120 may determine the context information based on the shape of transformation unit, for each syntax usable during CABAC decoding processes of a residual signal.

The various embodiments described above are operations related to an image decoding method performed by the image decoding apparatus 100. Hereinafter, operations of an image encoding apparatus 200 performing an image encoding method corresponding to processes in a reverse order of such an image decoding method will be described through various embodiments.

Figure 2:
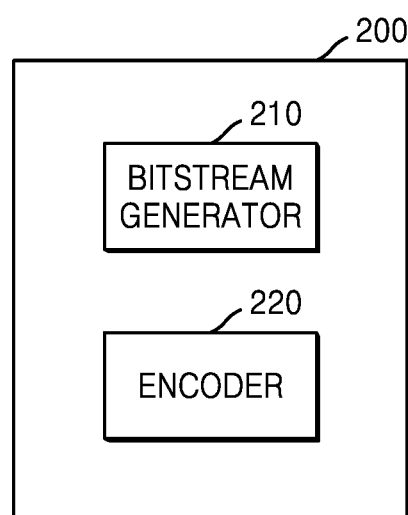
FIG. 2 is a block diagram of an image encoding apparatus for encoding an image, the encoding being based on a transformation unit included in a coding unit splitting an image, according to an embodiment.

FIG. 2 is a block diagram of an image encoding apparatus for encoding an image, based on a transformation unit included in a coding unit splitting an image, according to an embodiment.

Referring to FIG. 2, the image encoding apparatus 200 may include an encoder 220 for encoding an image according to an embodiment and a bitstream generator 210 for generating a bitstream including information about the encoded image and certain information or syntax, such as block shape information. According to an embodiment, the encoder 220 of the image encoding apparatus 200 may determine at least one coding unit splitting the image, and the bitstream generator 210 may generate a bitstream including the block shape information indicating a shape of the at least one coding unit. In addition, the encoder 220 of the image encoding apparatus 200 may determine at least one transformation unit included in a current coding unit, based on a shape of the current coding unit that is one of at least one coding unit, according to an embodiment. According to an embodiment, the block shape information may be information or syntax indicating whether the current coding unit is a square shape or a non-square shape.

According to an embodiment, the encoder 220 of the image encoding apparatus 200 may determine at least one transformation unit included in the current coding unit. The bitstream generator 210 may generate a bitstream including split information indicating whether a current transformation unit that is one of the at least one transformation unit is to be split into small transformation units. According to an embodiment, the encoder 220 of the image encoding apparatus 200 may determine a plurality of transformation units included in the current coding unit, based on whether the current coding unit is a square shape or a non-square shape. Here, the current transformation unit may denote a data block used during processes of recursively splitting a tree structure into transformation units that are no longer split. In other words, the current transformation unit may be a data block of various shapes and sizes that may be determined to be split into a plurality of transformation units of small sizes during recursive split processes.

According to an embodiment, split information of a transformation unit indicates that the current transformation unit is split into a plurality of transformation units, and when the current coding unit is a square shape, the encoder 220 may determine a plurality of transformation units of a square shape included in the current coding unit.

According to an embodiment, split information of a transformation unit indicates that the current transformation unit is split into a plurality of transformation units, and when the current coding unit is a non-square shape, the encoder 220 may determine a plurality of transformation units by splitting the current coding unit in a vertical direction or a horizontal direction.

FIGS. 3A and 3B illustrate transformation units of various shapes that may be determined in a current coding unit of a square shape, according to an embodiment.

Referring to FIG. 3A, the encoder 220 of the image encoding apparatus 200 may determine at least one coding unit including the current coding unit 300. Processes of determining a coding unit will be described below through various embodiments. A shape of the determined coding unit may be a square shape or a non-square shape. The encoder 220 may determine a shape of a transformation unit that may be included in the current coding unit 300, based on a shape of the current coding unit 300, according to an embodiment. For example, when the current coding unit 300 is a block of a square shape having a size of 2N×2N, the encoder 220 may determine the transformation unit 310a having a size of 2N×2N, the transformation unit 310b having a size of N×2N, or the transformation unit 310c having a size of 2N×N, as a shape of at least one transformation unit included in the current coding unit 300.

Referring to FIG. 3B, the encoder 220 of the image encoding apparatus 200 may determine at least one coding unit including the current coding unit 350. The encoder 220 may determine a shape of a transformation unit that may be included in the current coding unit 350, based on a shape of the current coding unit 350 of a square shape, according to an embodiment. For example, when the current coding unit 350 is a block of a square shape having a size of 2N×2N, the encoder 220 may determine one transformation unit 360a having a size of 2N×2N or four transformation units 370b having a size of N×N, as a shape of at least one transformation unit included in the current coding unit 300.

According to an embodiment, various embodiments including FIGS. 3A and 3B may be used as a method by which the encoder 220 determines at least one transformation unit included in a coding unit of a square shape, and a shape of a determinable transformation unit may include various shapes in which embodiments are combined.

According to an embodiment, the encoder 220 may determine at least one transformation unit included in a current coding unit, based on a shape of the current coding unit. For example, a plurality of transformation units included in the current coding unit may be determined based on whether the current coding unit is a square shape or a non-square shape.

FIGS. 4A through 4C illustrate transformation units of various shapes that may be determined in a current coding unit of a non-square shape, according to an embodiment.

Referring to FIG. 4A, the encoder 220 may determine at least one transformation unit included in the current coding unit 400a of a non-square shape in which a height is longer than a width, according to an embodiment. Referring to FIG. 4B, the encoder 220 may determine at least one transformation unit included in the current coding unit 400b of a non-square shape in which a height is longer than a width, according to an embodiment. Referring to FIG. 4C, the encoder 220 may determine at least one transformation unit included in the current coding unit 400c of a non-square shape in which a height is longer than a width, according to an embodiment. Such operations of the encoder 220 may correspond to operations similar to those of the decoder 120 described above, detailed descriptions thereof will be omitted.

According to an embodiment, the encoder 220 may determine the plurality of transformation units included in the current coding unit by comparing a size of the current coding unit and a largest size of the transformation unit.

FIG. 5 illustrates processes of determining a plurality of transformation units included in a current coding unit, based on a comparison result of a size of the current coding unit and a largest size of the transformation unit, according to an embodiment.

According to an embodiment, the encoder 220 may determine at least one transformation unit included in the current coding unit 500, and a largest size of the transformation unit may be pre-determined. According to an embodiment, the encoder 220 may compare the current coding unit 500 and the transformation unit 510 having the pre-determined largest size. When the size of the current coding unit 500 is larger than the largest size of the transformation unit 520 based on a comparison result, the encoder 220 may determine the plurality of transformation units 520 having the largest size included in the current coding unit 500. Referring to FIG. 5, when the size of the current coding unit 500 is 2N×2N and the largest size of the transformation unit 510 is N×N, the encoder 220 may split the current transformation unit into the transformation unit 520 of the largest size included in the current coding unit 500 together with processes for determining at least one transformation unit included in the current coding unit 500. In other words, the encoder 220 may determine a plurality of transformation units of a largest size included in a current coding unit and then determine whether to split each transformation unit of the largest size into transformation units of smaller sizes, so as to determine at least one transformation unit included in the current coding unit larger than the transformation unit of the largest size.

According to an embodiment, the bitstream generator 210 may generate the bitstream including information about the largest size of the transformation unit. The information about the largest size of the transformation unit may be an integer directly indicating the largest size of the transformation unit or an index related to the largest size.

According to an embodiment, the encoder 220 may determine at least one transformation unit included in a current coding unit, based on a block shape of a transformation unit. The bitstream generator 210 may generate a bitstream including information about the block shape of the transformation unit. The block shape of the transformation unit may vary, and a bitstream including information or syntax capable of indicating all shapes of the transformation unit needs to be generated for each certain data unit (for example, a picture, a slice, a slice segment, a tile, a largest coding unit, a coding unit, or the like) included in an image, in order for the decoder 120 to use all shapes supported by a codec throughout the image. In this case, a data amount to be generated by the bitstream generator 210 is relatively increased, and thus bitstream use efficiency may be decreased. According to an embodiment, a combination of shapes of the transformation unit may vary for each certain data unit (for example, a picture, a slice, a slice segment, a tile, a largest coding unit, a coding unit, or the like). For example, the bitstream generator 210 may generate a bitstream including the information about the block shape of the transformation unit for each certain data unit. The image decoding apparatus 100 that obtained such information may differently determine a combination of block shapes of the transformation unit for each certain data unit, based on the information about the block shape of the transformation unit.

FIG. 6 is a diagram for describing a characteristic that a combination of shapes of transformation units may vary for each certain data unit, according to an embodiment.

According to an embodiment, the encoder 220 may determine at least one transformation unit for each certain data unit (for example, the largest coding units 600 through 630), and the bitstream generator 210 may generate a bitstream including information about a block shape of a transformation unit for each of the largest coding units 600 through 630 that are the certain data units.

Referring to FIG. 6 according to an embodiment, the bitstream generator 210 may generate a bitstream including information indicating a combination including shapes of transformation units shown in FIG. 4A, in relation to the largest coding unit 600. In other words, the encoder 220 may use the shapes of transformation units described through FIG. 4A to determine at least one transformation unit included in one of at least one coding unit included in the largest coding unit 600, and in this case, the bitstream generator 210 may generate the bitstream including the information indicating the combination including the shapes of transformation units of FIG. 4A, in relation to the largest coding unit 600.

Referring to FIG. 6 according to an embodiment, the bitstream generator 210 may generate a bitstream including information indicating a combination including shapes of transformation units shown in FIG. 4B, in relation to the largest coding unit 610. In other words, the encoder 220 may use the shapes of transformation units described through FIG. 4B to determine at least one transformation unit included in one of at least one coding unit included in the largest coding unit 610, and in this case, the bitstream generator 210 may generate the bitstream including the information indicating that the shapes of transformation units of FIG. 4B are usable in the largest coding unit 610.

Referring to FIG. 6 according to an embodiment, the bitstream generator 210 may generate a bitstream including information indicating a combination including shapes of transformation units shown in FIG. 4C, in relation to the largest coding unit 620. In other words, the encoder 220 may use the shapes of transformation units described through FIG. 4C to determine at least one transformation unit included in one of at least one coding unit included in the largest coding unit 610, and in this case, the bitstream generator 210 may generate the bitstream including the information indicating that the shapes of transformation units of FIG. 4C are usable in the largest coding unit 620.

According to an embodiment, the bitstream generator 210 may generate a bitstream including information indicating a combination of shapes of transformation units shown in FIG. 3A, in relation to the largest coding unit 600, 610, or 620. In other words, the encoder 220 may use the shapes of transformation units described through FIG. 3A to determine at least one transformation unit included in one of at least one coding unit included in the largest coding unit 600, 610, or 620, and in this case, the bitstream generator 210 may generate the bitstream including information indicating that the shapes of transformation units of FIG. 3A are usable in the largest coding unit 600, 610, or 620. A combination of shapes of transformation units determinable as a transformation unit of a square shape is split is not limited to the shapes shown in FIG. 3A, and may include combinations including partial shapes among the shapes shown in FIG. 3A.

According to an embodiment, the bitstream generator 210 may generate a bitstream including at least one of information indicating a shape of a transformation unit usable by the encoder 220 to determine a transformation unit or information indicating a size of a transformation unit, for each certain data unit. For example, the image encoding apparatus 200 may generate at least one of the information indicating a shape of a transformation unit or the information indicating a size of a transformation unit, for a sequence parameter set, a picture parameter set, a video parameter set, a slice header, or a slice segment header. In addition, the bitstream generator 210 may generate the bitstream including the information indicating a shape of a transformation unit and the information indicating a size of a transformation unit, for each largest coding unit, reference coding unit, and processing block. Characteristics of the reference coding unit and processing block will be described later.

According to an embodiment, the encoder 220 may determine at least one transformation unit by using a largest size and smallest size of a transformation unit. The bitstream generator 210 may generate a bitstream including at least one of information about the largest size of the transformation unit or information about the smallest size. At least one of the largest size or the smallest size of the transformation unit may be pre-determined according to an embodiment, and accordingly, at least one of the information about a largest size of a transformation unit or the information about a smallest size of a transformation unit may be generated from the bitstream through the bitstream generator 210. According to an embodiment, the information about a largest size of a transformation unit and the information about a smallest size of a transformation unit may be generated for each certain data unit (a sequence, a picture, a slice, a slice segment, a tile, a largest coding unit, a coding unit, or the like). For example, the encoder 220 may determine the largest size and the smallest size of the transformation unit for each sequence, and the bitstream generator 210 may generate the bitstream including at least one of the information about a largest size of a transformation unit or the information about a smallest size of a transformation unit for each sequence including a plurality of pictures. According to an embodiment, the information about a largest size of a transformation unit and the information about a smallest size of a transformation unit may be information indicating a length of one side of a transformation unit of a square shape or length of a long side of a non-square shape, or may be an index indicating a size of pre-determined block. Information indicating a length of a side of a transformation unit may be the number of samples or the number of samples on which a log operation is performed.

According to an embodiment, the bitstream generator 210 may generate a bitstream including the information about a largest size of a transformation unit and the information about a smallest size of a transformation unit, and a bitstream including information indicating a difference between a largest size and a smallest size of a transformation unit. The image decoding apparatus 100 capable of obtaining such information from the bitstream may determine a largest size or a smallest size of a transformation unit by using one of the information about a largest size of a transformation unit and the information about a smallest size of a transformation unit, and the information indicating a difference between a largest size and a smallest size of a transformation unit. Because the image decoding apparatus 100 using the information about a largest size of a transformation unit or the information about a smallest size of a transformation unit obtained from the bitstream have been described above through various embodiments, details thereof will be omitted.

According to an embodiment, the encoder 220 may determine a transformation unit for performing inverse transformation of a luma component and a chroma component of an image, for each component. According to an embodiment, the encoder 220 may differently set a smallest size of a transformation unit regarding a luma component of an image and a smallest size of a transformation unit regarding a chroma component. For example, the encoder 220 may determine a smallest size of a transformation unit regarding a luma component to 4×4 and determine a smallest size of a transformation unit regarding a chroma component to 4×2 or 2×4. In other words, the encoder 220 may determine a smallest size of a transformation unit by distinguishing a luma component and a chroma component, in consideration of a relationship or proportion of the luma component and the chroma component used according to a method of decoding an image. According to an embodiment, the encoder 220 may set a smallest size of a transformation unit of a luma component and a smallest size of a transformation unit of a chroma component of an image to be different, and set a largest size thereof to be the same.

FIG. 7 illustrates a transformation unit of a smallest size that may be determined for each luma component and a chroma component, according to an embodiment.

According to an embodiment, the encoder 220 may determine at least one transformation unit included in the current coding unit 700 regarding a luma component of an image, and may determine at least one transformation unit included in the current coding unit 710 regarding a chroma component of an image. According to an embodiment, the encoder 220 may set a smallest size of a transformation unit regarding the luma component and a smallest size of a transformation unit regarding the chroma component to be different. For example, the encoder 220 may determine the smallest size of the transformation unit regarding the luma component to 4×4, and determine the smallest size of the transformation unit regarding the chroma component to 4×2 or 2×4.

According to an embodiment, when a size of the current coding unit 700 regarding the luma component is 8×8, the encoder 220 may determine at least one transformation unit having a size equal to or greater than 4×4, as at least one transformation unit included in the current coding unit 700 regarding the luma component. Referring to FIG. 7, the encoder 220 may determine four transformation units included in the current coding unit 710 having the size of 8×8, and in this case, the transformation unit may have a size of 4×4 that is a smallest size.

According to an embodiment, the encoder 220 may determine the current coding unit 710 regarding the chroma component related to the luma component of the current coding unit 700. According to an embodiment, when the size of the current coding unit 700 regarding the luma component is 2N×2N, the encoder 220 may determine the size of the current coding unit 710 regarding the chroma component related to the luma component to N×N. Referring to FIG. 7, when the size of the current coding unit 700 regarding the luma component is 8×8 according to an embodiment, the size of the current coding unit 710 regarding the chroma component may be determined to be 4×4.

According to an embodiment, a size of a transformation unit regarding a chroma component may be a size obtained by splitting a transformation unit regarding a luma component in at least one of a vertical direction or a horizontal direction. In other words, the transformation unit regarding the chroma component may have a size smaller than that of the transformation unit regarding the luma component.

According to an embodiment, smallest sizes of the transformation unit regarding the luma component and the transformation unit regarding the chroma component may be different. Hereinafter, for convenience of description, an embodiment in which the smallest size of the transformation unit regarding the luma component is 4×4 and the smallest size of the transformation unit regarding the chroma component is 4×2 or 2×4 will be described.

According to an embodiment, the encoder 220 may determine at least one transformation unit included in the current coding unit 710 regarding the chroma component, in consideration of the smallest size of the transformation unit. According to an embodiment, the transformation unit regarding the chroma component may have a size obtained as the encoder 220 splits the transformation unit regarding the luma component in the vertical direction and the horizontal direction. However, when the size obtained by splitting the transformation unit regarding the luma component in the vertical direction and the horizontal direction is smaller than the smallest size of the transformation unit regarding the chroma component, the encoder 220 may determine the transformation unit regarding the chroma component, in consideration of the smallest size of the transformation unit regarding the chroma component.

According to an embodiment, when the size obtained by splitting the transformation unit regarding the luma component in the vertical direction and the horizontal direction is smaller than the smallest size of the transformation unit regarding the chroma component, the encoder 220 may determine the transformation unit regarding the chroma component having the smallest size.

According to an embodiment, when the size obtained by splitting the transformation unit regarding the luma component in the vertical direction and the horizontal direction is smaller than is smaller than the smallest size of the transformation unit regarding the chroma component, the encoder 220 may determine a transformation unit having a size equal to or greater than the smallest size of the transformation unit regarding the chroma component by merging transformation units having sizes obtained by splitting the transformation unit regarding the luma component in the vertical direction and the horizontal direction. For example, the encoder 220 uses the size of the transformation unit regarding the luma component as the size of the transformation unit regarding the chroma component, without splitting the transformation unit regarding the luma component in the vertical direction and the horizontal direction. As another example, when it is determined that the size of the transformation unit obtained by splitting the transformation unit regarding the luma component in the vertical direction and the horizontal direction is smaller than the smallest size of the transformation unit of the chroma component, the encoder 220 may merge transformation units obtained by splitting the transformation unit regarding the chroma component in the smallest sizes. For example, at least one transformation unit regarding the chroma component having the smallest size may be determined by merging four transformation units having a size of 2×2, by comparing the smallest size of the transformation unit regarding the chroma component and the four transformation units having the size of 2×2 determined as the transformation unit regarding the luma component and having the size of 4×4 is split.

Referring to FIG. 7, the encoder 220 may determine at least one transformation unit (for example, 730, 750, 760, or 770) included in the current coding unit 710 regarding the chroma component. The encoder 220 may determine the transformation unit regarding the chroma component, in consideration of the smallest size of the transformation unit, and the smallest size of the transformation unit may vary according to the luma component and the chroma component. When the size of the current coding unit 710 regarding the chroma component is 2N×2N, the encoder 220 may determine the transformation unit 730 having a size of N×N, the transformation unit 750 having a size of 2N×2N, or the transformation unit 760 or 770 having a size of 2N×N or N×2N. According to an embodiment, the encoder 220 may determine the transformation unit in consideration of the smallest size of the transformation unit regarding the chroma component. For example, when the smallest size of the transformation unit regarding the chroma component is 4×2 or 2×4, the encoder 220 is unable to determine the four transformation units 730 having a size of 2×2 from the current coding unit 710 having a size of 4×4. In this case, the encoder 220 may merge the transformation units 730 having the size of 2×2 to determine the transformation unit 760 having the size of 2×4 or the transformation unit 770 having the size of 4×2. As another example, the encoder 220 may skip processes of determining the four transformation units 730 having the size of 2×2, and may determine the transformation unit having the smallest size as at least one transformation unit included in the current coding unit 710.

According to an embodiment, the bitstream generator 210 may generate the bitstream including information indicating whether a current transformation unit includes a non-zero transformation coefficient. Here, the information indicating whether the non-zero transformation coefficient is included may be information related to the transformation unit of the current depth determined during split processes of the transformation unit, and the transformation unit of the current depth may be split into transformation units of smaller sizes afterwards.

According to an embodiment, the encoder 220 may skip encoding processes of a residual signal regarding the transformation unit of the current depth when the non-zero transformation coefficient is not included in the transformation unit of the current depth.

According to an embodiment, the bitstream generator 210 may generate the bitstream including the information indicating whether the non-zero transformation coefficient is included in the transformation unit of the current depth for each luma component and chroma component related to the current coding unit. In other words, the bitstream generator 210 may generate the bitstream including at least one of the information indicating whether the non-zero transformation coefficient is included in the transformation unit of the current depth regarding the luma component or the information indicating whether the non-zero transformation coefficient is included in the transformation unit of the current depth regarding the chroma component.

According to an embodiment, the bitstream generator 210 may generate the bitstream including at least one of the information indicating whether the non-zero transformation coefficient is included in the transformation unit of the current depth regarding the luma component or the information indicating whether the non-zero transformation coefficient is included in the transformation unit of the current depth regarding the chroma component, when the transformation unit of the current depth is no longer split during split processes for determining at least one transformation unit included in the current coding unit.

According to an embodiment, the image encoding apparatus 200 may generate the bitstream including the information indicating whether the non-zero transformation coefficient is included in the transformation unit of the current depth for each luma component and chroma component. While using a method of generating the bitstream including the information indicating whether the non-zero transformation coefficient is included, the image encoding apparatus 200 may differently use the method for each transformation unit regarding the luma component and transformation unit regarding the chroma component. For example, the bitstream generator 210 may generate the bitstream including the information indicating whether the non-zero coefficient is included in the transformation unit of the current depth regarding the chroma component, for each transformation unit of the current depth used during the split processes of a transformation unit. As another example, the bitstream obtainer 110 may generate the bitstream including information indicating whether the non-zero transformation coefficient is included in the transformation unit of the current depth regarding the luma component, only when the transformation unit of the current depth is no longer split.

However, the above embodiment is an example for describing that the method of generating the bitstream including the information indicating whether the non-zero transformation coefficient is included in the transformation unit may vary for each luma component or chroma component, and thus the method of generating the bitstream including the information indicating whether the non-zero transformation coefficient is included in the transformation unit including the luma component or chroma component may be embodied according to a combination of various embodiments.

FIG. 8 is a diagram for describing processes of generating information indicating whether a non-zero transformation coefficient is included in a transformation unit of a current depth during a process of determining at least one transformation unit included in a current coding unit, according to an embodiment. Operations performed by the image encoding apparatus 200 in relation to FIG. 8 may be similar to those of the image decoding apparatus 100 described with reference to FIG. 8, details thereof will be omitted.

The image encoding apparatus 200 may differently determine the method of generating the information indicating whether the non-zero transformation coefficient is included in the transformation unit of the current depth, based on at least one of a block shape of the current coding unit, which one of a luma component and a chroma component of an image is related to the current coding unit, a prediction mode used in the current coding unit, or the number of transformation units included in the current coding unit.

According to an embodiment, the image encoding apparatus 200 may differently determine the method of generating the information indicating whether the non-zero transformation coefficient is included in the current block, based on a shape of a coding unit. According to an embodiment, the bitstream generator 210 may generate the information indicating whether the non-zero transformation coefficient is included in each transformation unit determined during the split processes for determining at least one transformation unit, for each transformation unit of the current depth. Moreover, the bitstream generator 210 may generate the information indicating whether the non-zero transformation coefficient is included in the transformation unit of the current depth only when the transformation unit of the current depth is no longer split.

For example, as described with reference to FIG. 3A, the image encoding apparatus 200 may determine at least one transformation unit included in a coding unit of a square shape or non-square shape. The encoder 220 may determine at least one transformation unit included in the current coding unit via recursive split processes of a transformation unit. According to an embodiment, when a shape of the current coding unit is a non-square shape, the bitstream generator 210 may generate the information indicating whether the non-zero transformation coefficient is included, for each transformation unit of the current depth used in the split processes of a transformation unit for determining at least one transformation unit.

According to an embodiment, the image encoding apparatus 200 may differently determine the method of generating the information indicating whether the non-zero transformation coefficient is included in the current block, based on the block shape of the coding unit and which one of the luma component and the chroma component of the image is related to the current coding unit. According to an embodiment, when the shape of the current coding unit is a non-square shape and the current coding unit is a coding unit related to the chroma component of an image, the bitstream generator 210 may generate the information indicating whether the non-zero transformation coefficient is included for each transformation unit of the current depth used during the split processes of the transformation unit for determining at least one transformation unit.

According to an embodiment, the image encoding apparatus 200 may differently determine the method of obtaining a bitstream including the information indicating whether the non-zero transformation coefficient is included in the current block, based on the block shape of the coding unit and the prediction mode used in the current coding unit. According to an embodiment, when the shape of the current coding unit is a non-square shape and an intra prediction mode may be used in the current coding unit, the bitstream generator 210 may generate the information indicating whether the non-zero transformation coefficient is included for each transformation unit of the current depth used during the split processes of the transformation unit for determining at least one transformation unit.

According to an embodiment, the image encoding apparatus 200 may determine the method of generating the bitstream including the information indicating whether the non-zero transformation coefficient is included in the transformation unit, based on a shape of the transformation unit of the current depth. For example, when the transformation unit of the current depth is a square shape, the bitstream generator 210 may use different methods for each transformation unit regarding the luma component and the transformation unit regarding a chroma component, while generating the bitstream including the information indicating whether the non-zero transformation coefficient is included. On the other hand, when the transformation unit of the current depth is a non-square shape, the bitstream obtainer 110 may use the same method with respect to generating the bitstream including the information indicating whether the non-zero transformation coefficient is included in the transformation unit regarding the luma component and the transformation unit regarding the chroma component (for example, a method of obtaining information for each transformation unit of a current depth used during split processes or a method of obtaining information only when a transformation unit of a current depth is no longer split).

However, a method of, performed by the image encoding apparatus 200, generating information indicating whether a non-zero transformation coefficient is included in a current block, based on a combination of various conditions described above should not be limitedly construed as being generating a bitstream for each transformation unit of a current depth for determining at least one transformation unit, and may be variously used for each combination of conditions. In other words, a method of obtaining information indicating whether a non-zero transformation coefficient is used for each transformation unit of a current depth or a method of generating information indicating whether a non-zero transformation coefficient is included in a transformation unit of a current depth only when the transformation unit is no longer split may be used by distinguishing cases based on a combination of various conditions described above.

According to an embodiment, the encoder 220 may determine at least one transformation unit based on at least one of a shape or size of a current coding unit. For example, the encoder 220 may determine a transformation unit having the same shape as the current coding unit without performing split processes for determining a transformation unit when the current coding unit is a non-square shape. According to an embodiment, the encoder 220 may split the current transformation unit into a plurality of transformation units equal to or greater than a smallest size of the transformation unit, when the current coding unit is a non-square shape and the transformation unit having the same shape as the current coding unit is not usable.

According to an embodiment, even when a smallest size of a transformation unit is 4×4, the encoder 220 may not determine that two transformation units of a size of 4×4 are included when a current coding unit is a non-square shape of 4×8 or 8×4. In this case, the encoder 220 may determine a transformation unit of a non-square shape of 4×8 or 8×4 having the same size as the current coding unit.

According to an embodiment, the encoder 220 may determine a depth of a transformation unit, based on a length of long side of the transformation unit. In other words, the encoder 220 may determine a depth of a split block to be the same as a current depth when a length of a long side of the split block is the same as the long side of the transformation unit of the current depth even when the transformation unit of the current depth is split (for example, when a transformation unit of a square shape is split only in a vertical direction or a horizontal direction).

According to an embodiment, the image encoding apparatus 200 may generate a bitstream including at least one syntax related to a transformation unit, based on a shape of a transformation unit of a current depth.

According to an embodiment, the encoder 220 may encode a residual signal based on at least one transformation unit included in a current coding unit. The bitstream generator 210 may generate a bitstream including information related to the residual signal, based on at least one transformation unit.

According to an embodiment, the bitstream generator 210 may generate a bitstream including a bin string indicating a syntax used in encoding processes. The encoder 220 may use various types of context information during the encoding processes, and such context information may include various types of information used during CABAC decoding processes. For example, the context information may indicate a context index used to determine a syntax corresponding to the bin string. The encoder 220 may determine a value corresponding to the context index as an initial value by using a context table, and perform CABAC encoding by using the determined initial value.

According to an embodiment, the encoder 220 may consider various types of information to determine context information. For example, the encoder 220 may consider a shape of a transformation unit of a current depth to determine the context information. In other words, the context information used in CABAC may vary according to the shape of the transformation unit. According to an embodiment, the encoder 220 may determine the context information by using at least one of a type of syntax, a depth of a coding unit to which a transformation unit of a current depth is included, a syntax of an adjacent block, a size of a transformation unit, or a shape of a transformation unit, so as to determine the context information.

According to an embodiment, the encoder 220 may determine context information based on a shape of a transformation unit, wherein such context information may indicate a context index used to determine a syntax corresponding to a bin string, and such a context index may be determined by using a context index offset (ctxIdxOffset) and a value (for example, ctxInc) added to the context index offset. In other words, the encoder 220 may determine the context index (ctxIndx) by adding ctxIdxOffset and ctxInc. According to an embodiment, the context index offset (ctxIdxOffset) may be defined to be a smallest value of the context index (ctxIdx) determinable on a context table (ctxTable), based on an initial type (initType) used during arithmetic initialization processes of syntax. In order to determine ctxInc, the encoder 220 may use at least one of a type of syntax, a depth of a coding unit to which a transformation unit of a current depth is included, a syntax of an adjacent block, a size of a transformation unit, or a shape of a transformation unit, and determine the context index (CtxIdx) by adding the determined ctxInc and ctxIdxOffset. According to an embodiment, the encoder 220 may determine the context information based on the shape of transformation unit, for each syntax usable during CABAC decoding processes of a residual signal.

Hereinafter, a method of determining coding units of various shapes usable by the image decoding apparatus 100 or the image encoding apparatus 200 will be described according to various embodiments described above.

According to an embodiment, the bitstream obtainer 110 may obtain, from a bitstream, information for obtaining certain information, such as split shape information, block shape information, or the like, and the decoder 120 may decode an image by using the obtained information. According to an embodiment, when the bitstream obtainer 110 of the image decoding apparatus 100 obtained at least one of the block shape information or the split shape information, the decoder 120 of the image decoding apparatus 100 may determine at least one coding unit splitting an image, based on at least one of the block shape information or the split shape information.

According to an embodiment, the decoder 120 of the image decoding apparatus 100 may determine a shape of a coding unit, based on the block shape information. For example, the block shape information may include information indicating whether the coding unit is a square shape or a non-square shape. The decoder 120 may determine the shape of the coding unit by using the block shape information.

According to an embodiment, the decoder 120 may determine to which shape a coding unit is split, based on the split shape information. For example, the split shape information may indicate information about a shape of at least one coding unit included in the coding unit.

According to an embodiment, the decoder 120 may determine whether a coding unit is split, according to the split shape information. The split shape information may include information about at least one coding unit included in the coding unit, and when the split shape information indicates that only one coding unit is included in the coding unit or that the coding unit is not split, the decoder 120 may determine that the coding unit including the split shape information is not split. When the split shape information indicates that the coding unit is to be split into a plurality of split units, the decoder 120 may split the coding unit into the plurality of coding units, based on the split shape information.

According to an embodiment, the split shape information may indicate the number of coding units into which a coding unit is split, or indicate a direction in which the coding unit is split. For example, the split shape information may indicate split in at least one of a vertical direction or a horizontal direction, or may include non-split.

Figure 9:
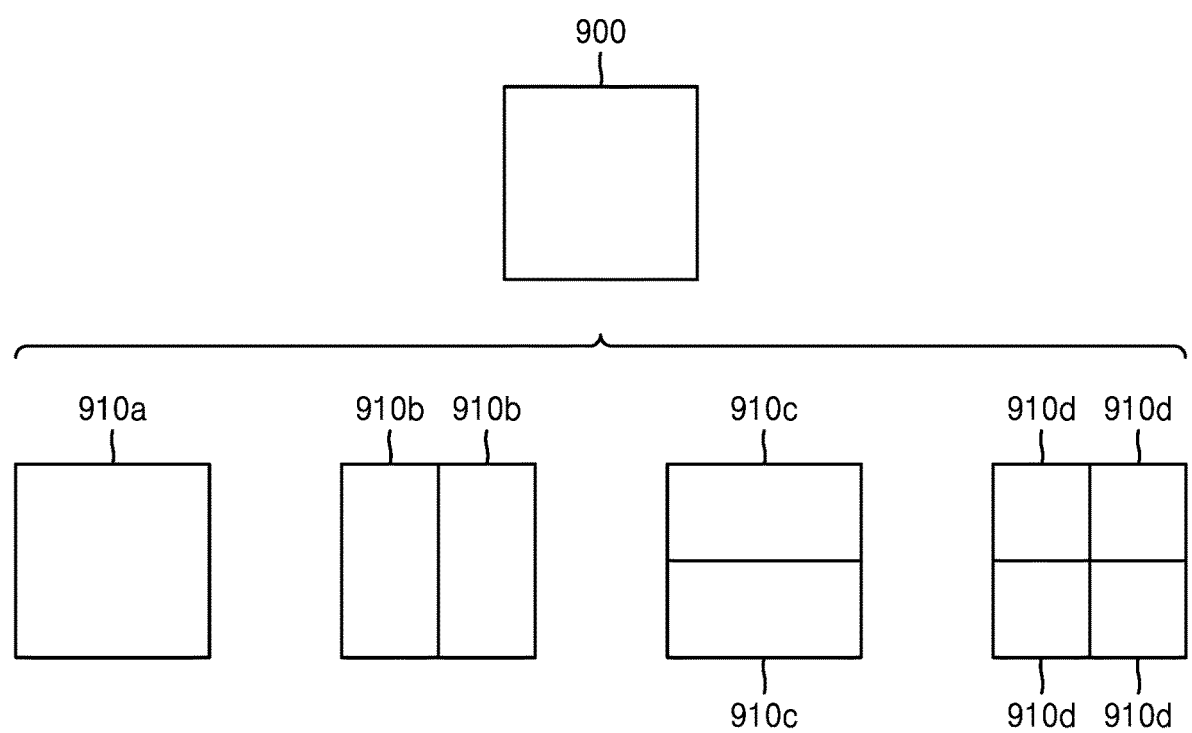
FIG. 9 illustrates processes of determining at least one coding unit when a current coding unit is split, according to an embodiment.

FIG. 9 illustrates processes of determining at least one coding unit as the image decoding apparatus 100 splits a current coding unit, according to an embodiment.

According to an embodiment, the decoder 120 may determine a shape of a coding unit by using block shape information, and determine a shape into which a coding unit is split by using split shape information. In other words, a split method of a coding unit, which is indicated by the split shape information, may be determined based on a block shape indicated by the block shape information used by the decoder 120.

According to an embodiment, the decoder 120 may use block shape information indicating that a current coding unit has a square shape. For example, the decoder 120 may determine, according to split shape information, whether to not split a square coding unit, to split the square coding unit vertically, to split the square coding unit horizontally, or to split the square coding unit into four coding units. Referring to FIG. 9, when block shape information of a current coding unit 900 indicates a square shape, the decoder 120 may not split a coding unit 910a having the same size as the current coding unit 900 according to split shape information indicating non-split, or determine coding units 910b, 910c, or 910d based on split shape information indicating a certain split method.

Referring to FIG. 9, the decoder 120 may determine two coding units 910b by splitting the current coding unit 900 in a vertical direction based on split shape information indicating a split in a vertical direction, according to an embodiment. The decoder 120 may determine two coding units 910c by splitting the current coding unit 900 in a horizontal direction based on split shape information indicating a split in a horizontal direction. The decoder 120 may determine four coding units 910d by splitting the current coding unit 900 in vertical and horizontal directions based on split shape information indicating splitting in vertical and horizontal directions. However, a split shape into which a square coding unit may be split is not limited to the above shapes, and may include any shape indicatable by split shape information. Certain split shapes into which a square coding unit are split will now be described in detail through various embodiments.

Figure 10:
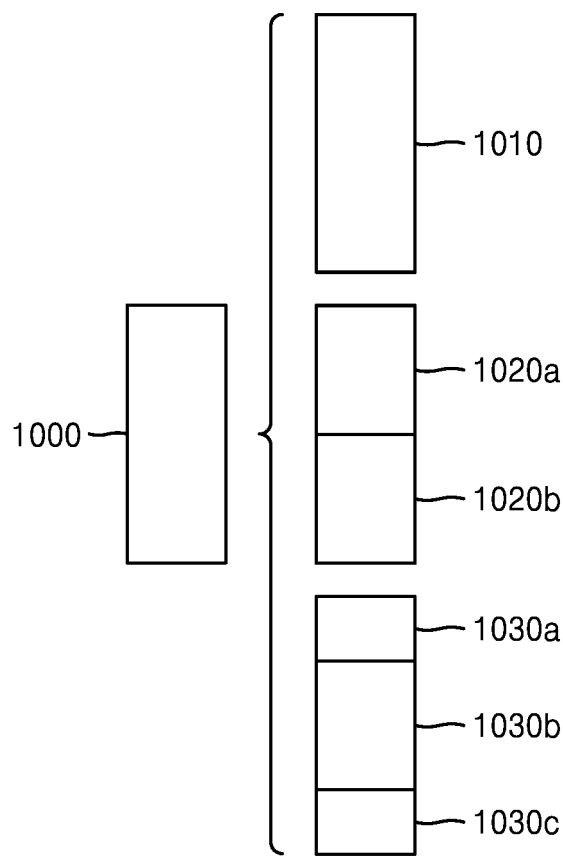
FIG. 10 illustrates processes of determining at least one coding unit when a coding unit of a non-square shape is split, according to an embodiment.
Figure 10:
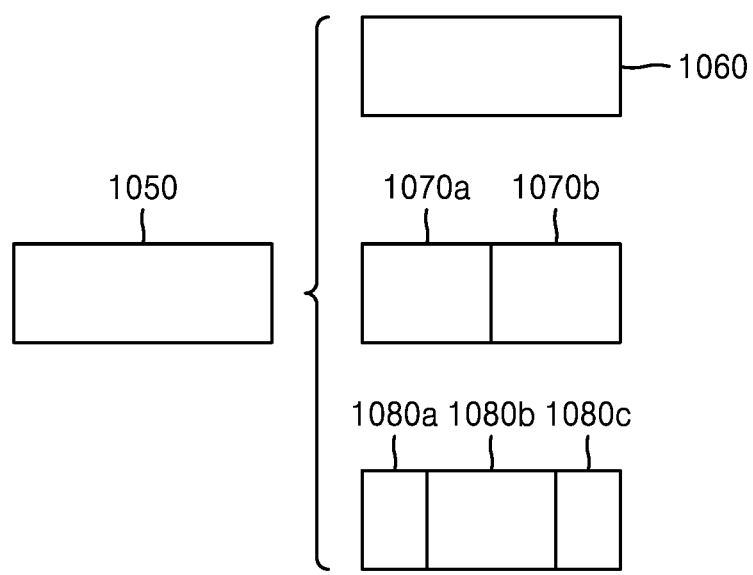

FIG. 10 illustrates processes of determining at least one coding unit when the image decoding apparatus 100 splits a coding unit having a non-square shape, according to an embodiment.

According to an embodiment, the decoder 120 may use block shape information indicating that a current coding unit has a non-square shape. The decoder 120 may determine, according to split shape information, whether to not split the non-square current coding unit or to split the non-square current coding unit via a certain method. Referring to FIG. 10, when block shape information of a current coding unit 1000 or 1050 indicates a non-square shape, the decoder 120 may not split coding units 1010 or 1060 having the same size as the current coding unit 1000 or 1050 according to split shape information indicating non-split, or determine coding units 1020a, 1020b, 1030a, 1030b, 1030c, 1070a, 1070b, 1080a, 1080b, and 1080c based on split shape information indicating a certain split method. A certain split method of splitting a non-square coding unit will now be described in detail through various embodiments.

According to an embodiment, the decoder 120 may determine a shape into which a coding unit is split by using split shape information, and in this case, the split shape information may indicate the number of at least one coding unit generated as the coding unit is split. Referring to FIG. 10, when split shape information indicates that the current coding unit 1000 or 1050 is to be split into two coding units, the decoder 120 may determine two coding units 1020a and 1020b or 1070a and 1070b included in the current coding unit 1000 or 1050 by splitting the current coding unit 1000 or 1050 based on the split shape information.

According to an embodiment, when the decoder 120 splits the current coding unit 1000 or 1050 having a non-square shape based on split shape information, the decoder 120 may split the current coding unit 1000 or 1050 considering locations of long sides of the current coding unit 1000 or 1050 having a non-square shape. For example, the decoder 120 may determine a plurality of coding units by splitting the current coding unit 1000 or 1050 in a direction of splitting the long sides of the current coding unit 1000 or 1050 considering a shape of the current coding unit 1000 or 1050.

According to an embodiment, when split shape information indicates that a coding unit is to be split into an odd number of blocks, the decoder 120 may determine the odd number of coding units included in the current coding unit 1000 or 1050. For example, when split shape information indicates that the current coding unit 1000 or 1050 is to be split into three coding units, the decoder 120 may split the current coding unit 1000 or 1050 into three coding units 1030a through 1030c or 1080a through 1080c. According to an embodiment, the decoder 120 may determine the odd number of coding units included in the current coding unit 1100 or 1150, and the sizes of the determined coding units may not be all the same. For example, the size of coding unit 1030b or 1080b from among the determined odd number of coding units 1030a through 1030c or 1080a through 1080c may be different from the sizes of coding units 1030a and 1030c or 1080a and 1080c. In other words, coding units that may be determined when the current coding unit 1000 or 1050 is split may have a plurality of types of sizes, and in some cases, the coding units 1030a through 1030c or 1080a through 1080c may have different sizes.

According to an embodiment, when split shape information indicates that a coding unit is to be split into an odd number of blocks, the decoder 120 may determine the odd number of coding units included in the current coding unit 1000 or 1050, and in addition, may set a certain limit on at least one coding unit from among the odd number of coding units generated via splitting. Referring to FIG. 10, the decoder 120 may differentiate decoding processes performed on the coding unit 1030b or 1080b located at the center from among the three coding units 1030a through 1030c or 1080a through 1080c generated as the current coding unit 1000 or 1050 is split from the other coding units 1030a and 1030c or 1080a and 1080c. For example, the decoder 120 may limit the coding unit 1030b or 1080b located at the center to be no longer split unlike the other coding units 1030a and 1030c or 1080a and 1080c, or to be split only a certain number of times.

Figure 11:
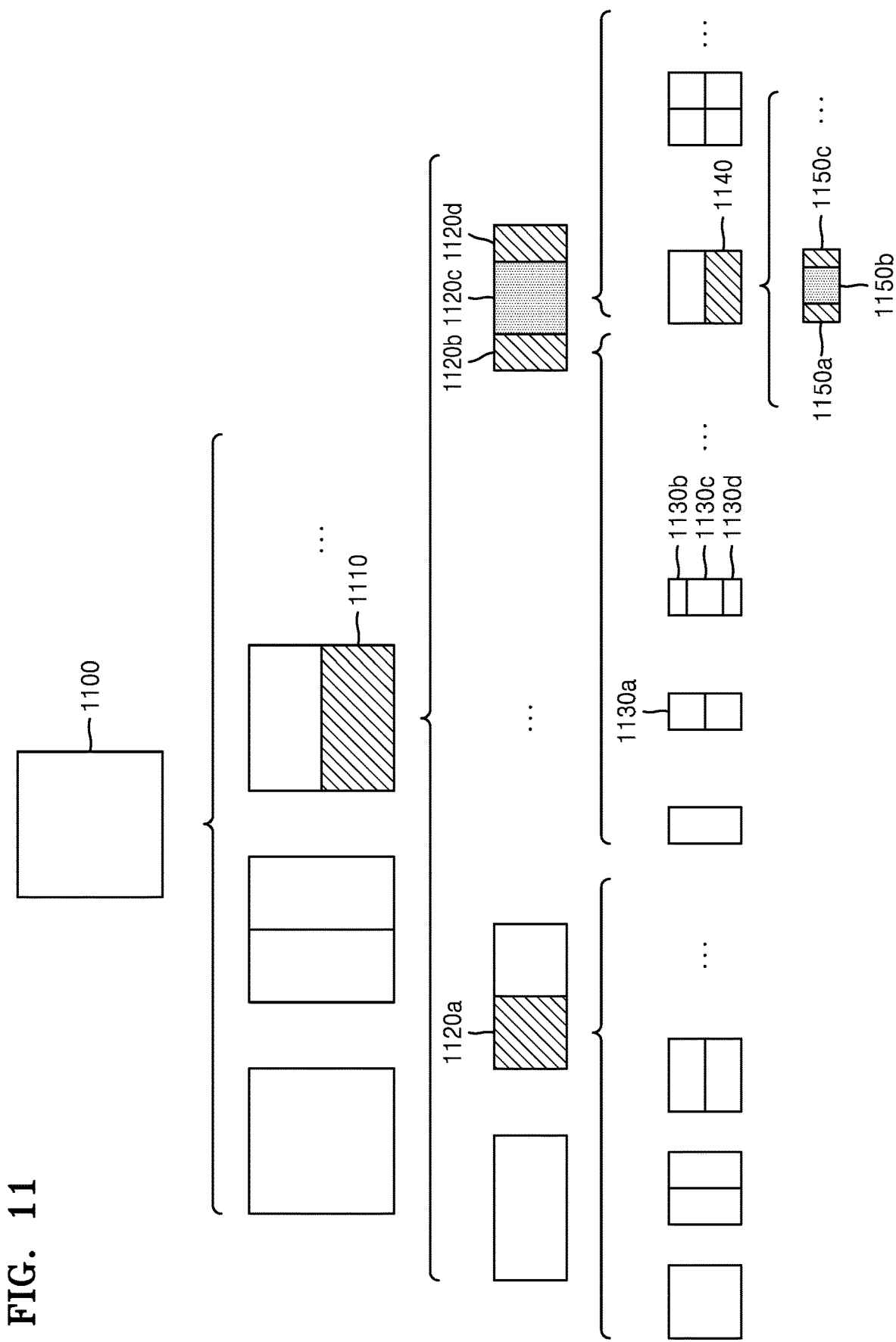
FIG. 11 illustrates processes of splitting a coding unit, based on at least one of block shape information or split shape information, according to an embodiment.

FIG. 11 illustrates processes of the image decoding apparatus 100 splitting a coding unit, based on at least one of a block shape information or split shape information, according to an embodiment.

According to an embodiment, the decoder 120 may determine that a first coding unit 1100 having a square shape is split or not split into coding units, based on at least one of block shape information or split shape information. According to an embodiment, when split shape information indicates that the first coding unit 1100 is to be split in a horizontal direction, the decoder 120 may determine a second coding unit 1110 by splitting the first coding unit 1100 in a horizontal direction. A first coding unit, a second coding unit, and a third coding unit used according to an embodiment are terms used to indicate a relation between before and after splitting a coding unit. For example, a second coding unit may be determined by splitting a first coding unit, and a third coding unit may be determined by splitting a second coding unit. Hereinafter, it will be understood that relations between first through third coding units are in accordance with the features described above.

According to an embodiment, the image decoding apparatus 100 may determine that the determined second coding unit 1110 is split or not split into coding units based on at least one of block shape information or split shape information. Referring to FIG. 11, the decoder 120 may split the second coding unit 1110, which has a non-square shape and is determined by splitting the first coding unit 1100, into at least one third coding unit 1110a, 1120b, 1120c, or 1120d, or may not split the second coding unit 1110, based on at least one of block shape information or split shape information. The bitstream obtainer 110 of the image decoding apparatus 100 may obtain at least one of the block shape information or the split shape information, and the decoder 120 may obtain a plurality of second coding units (for example, the second coding units 1110) having various shapes by splitting the first coding unit 1100 based on at least one of the obtained block shape information or split shape information, wherein the second coding unit 1110 may be split according to a method of splitting the first coding unit 1100 based on at least one of the block shape information or the split shape information.

According to an embodiment, when the first coding unit 1100 is split into the second coding units 1110 based on at least one of block shape information or split shape information with respect to the first coding unit 1100, the second coding unit 1110 may also be split into third coding units (for example, the third coding units 1120a through 1120d) based on at least one of block shape information or split shape information with respect to the second coding unit 1210. In other words, a coding unit may be recursively split based on at least one of split shape information or block shape information related to each coding unit. Accordingly, a square coding unit may be determined from a non-square coding unit, and such a square coding unit may be recursively split such that a non-square coding unit is determined. Referring to FIG. 11, a certain coding unit (for example, a coding unit located at the center or a square coding unit) from among the odd number of third coding units 1120b through 1120d determined when the second coding unit 1110 having a non-square shape is split may be recursively split. According to an embodiment, the third coding unit 1120c having a square shape from among the third coding units 1120b through 1120d may be split in a horizontal direction into a plurality of fourth coding units. A fourth coding unit 1140 having a non-square shape from among the plurality of fourth coding units may again be split into a plurality of coding units. For example, the fourth coding unit 1140 having a non-square shape may be split into an odd number of coding units 1150a through 1150c.

A method that may be used to recursively split a coding unit will be described below through various embodiments.

According to an embodiment, the decoder 120 may determine that each of the third coding units 1120a through 1120d is split into coding units or that the second coding unit 1110 is not split, based on at least one of block shape information or split shape information. The decoder 120 may split the second coding unit 1110 having a non-square shape into the odd number of third coding units 1120b through 1120d, according to an embodiment. The image decoding apparatus 100 may set a certain limit on a certain third coding unit from among the third coding units 1120b through 1120d. For example, the image decoding apparatus 100 may limit that the third coding unit 1120c located at the center of the third coding units 1120b through 1120d is no longer split, or is split into a settable number of times. Referring to FIG. 11, the image decoding apparatus 100 may limit that the third coding unit 1120c located at the center of the third coding units 1120b through 1120d included in the second coding unit 1110 having a non-square shape is no longer split, is split into a certain split shape (for example, split into four coding units or split into shapes corresponding to those into which the second coding unit 1110 is split), or is split only a certain number of times (for example, split only n times wherein n>0). However, such limits on the third coding unit 1120c located at the center are only examples and should not be interpreted as being limited by those examples, but should be interpreted as including various limits as long as the third coding unit 1120c located at the center are decoded differently from the other third coding units 1120b and 1120d.

According to an embodiment, the image decoding apparatus 100 may obtain at least one of block shape information or split shape information used to split a current coding unit from a certain location in the current coding unit.

Figure 12:
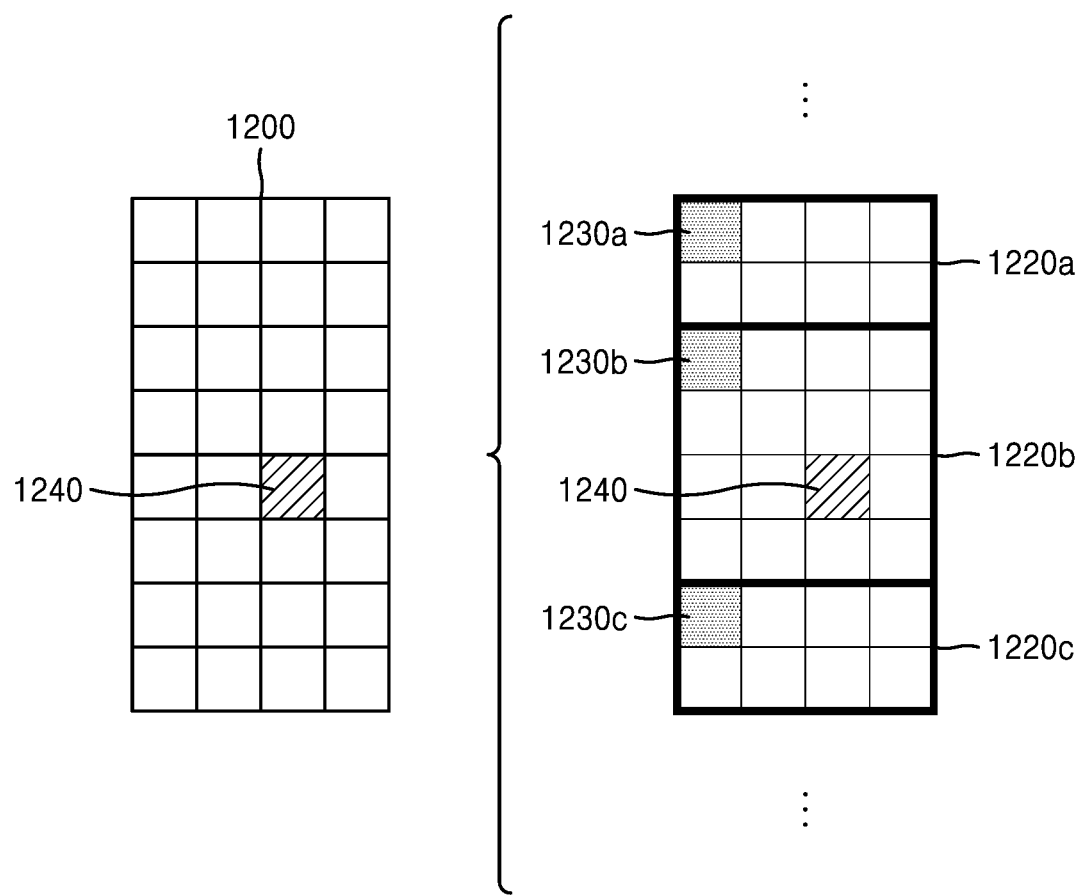
FIG. 12 illustrates a method of determining a certain coding unit from among an odd number of coding units, according to an embodiment.

FIG. 12 illustrates a method of determining, by the decoder 120, a certain coding unit from among an odd number of coding units, according to an embodiment. Referring to FIG. 12, at least one of block shape information or split shape information of a current coding unit 1200 may be obtained from a sample at a certain location (for example, a sample 1240 located at the center) from among a plurality of samples included in the current coding unit 1200. However, the certain location in the current coding unit 1200 from which at least one of block shape information or split shape information is obtained is not limited to the center location shown in FIG. 12, but may be any location (for example, an uppermost location, a lowermost location, a left location, a right location, an upper left location, a lower left location, an upper right location, or a lower right location) included in the current coding unit 1200. The image decoding apparatus 100 may determine that a current coding unit is split into coding units having various shapes and sizes or is not split by obtaining at least one of block shape information or split shape information from a certain location.

According to an embodiment, the image decoding apparatus 100 may select one coding unit when a current coding unit is split into a certain number of coding units. A method of selecting one of a plurality of coding units may vary, and details thereof will be described below through various embodiments.

According to an embodiment, the decoder 120 of the image decoding apparatus 100 may split a current coding unit into a plurality of coding units, and determine a coding unit at a certain location.

FIG. 12 illustrates a method of determining, by the image decoding apparatus 100, a coding unit at a certain location from among an odd number of coding units, according to an embodiment.

According to an embodiment, the decoder 120 may use information indicating a location of each of the odd number of coding units so as to determine a coding unit located at the center from among the odd number of coding units. Referring to FIG. 12, the decoder 120 may determine the odd number of coding units 1220a through 1220c by splitting the current coding unit 1200. The decoder 120 may determine the center coding unit 1220b by using information about the locations of the odd number of coding units 1220a through 1220c. For example, the decoder 120 may determine the coding unit 1220b located at the center by determining the locations of the coding units 1220a through 1220b based on information indicating locations of certain samples included in the coding units 1220a through 1220c. In detail, the decoder 120 may determine the coding unit 1220b located at the center by determining the locations of the coding units 1220a through 1220c based on information indicating locations of upper left samples 1230a through 1230c of the coding units 1220a through 1220c.

According to an embodiment, the information indicating the locations of the upper left samples 1230a through 1230c included in the coding units 1220a through 1220c respectively may include information about a location or coordinates of the coding units 1220a through 1220c in a picture. According to an embodiment, the information indicating the locations of the upper left samples 1230a through 1230c included in the coding units 1220a through 1220c respectively may include information indicating widths or heights of the coding units 1220a through 1220c included in the current coding unit 1200, and such widths or heights may correspond to information indicating differences between coordinates of the coding units 1220a through 1220c in a picture. In other words, the image decoding apparatus 100 may determine the coding unit 1220b located at the center by directly using the information about the locations or coordinates of the coding units 1220a through 1220c in a picture or by using information about the widths or heights of the coding units 1220a through 1220c indicating to the differences between coordinates.

According to an embodiment, the information indicating the location of the upper left sample 1230a of the upper coding unit 1220a may indicate (xa, ya) coordinates, the information indicating the location of the upper left sample 1230b of the center coding unit 1220b may indicate (xb, yb) coordinates, and the information indicating the location of the upper left sample 1230c of the lower coding unit 1220c may indicate (xc, yc) coordinates. The image decoding apparatus 100 may determine the center coding unit 1220b by using the coordinates of the upper left samples 1230a through 1230c respectively included in the coding units 1220a through 1220c. For example, when the coordinates of the upper left samples 1230a through 1230c are arranged in an ascending order or descending order, the coding unit 1220b including the coordinates (xb, yb) of the sample 1230b located at the center may be determined as a coding unit located at the center from among the coding units 1220a through 1220c determined when the current coding unit 1200 is split. However, coordinates indicating the locations of the upper left samples 1230a through 1230c may be coordinates indicating absolute locations in a picture, and in addition, (dxb, dyb) coordinates, i.e., information indicating a relative location of the upper left sample 1230b of the center coding unit 1220b, and (dxc, dyc) coordinates, i.e., information indicating a relative location of the upper left sample 1230c of the lower coding unit 1220c, may be used based on the location of the upper left sample 1230a of the upper coding unit 1220a. Also, a method of determining a coding unit at a certain location by using, as information indicating locations of samples included in coding units, coordinates of the samples is not limited to the above, and various arithmetic methods capable of using coordinates of samples may be used.

According to an embodiment, the image decoding apparatus 100 may split the current coding unit 1200 into the plurality of coding units 1220a through 1220c, and select a coding unit from the coding units 1220a through 1220c according to a certain standard. For example, the decoder 120 may select the coding unit 1220b having a different size from among the coding units 1220a through 1220c.

According to an embodiment, the image decoding apparatus 100 may determine widths or heights of the coding units 1220a through 1220c by respectively using the (xa, ya) coordinates, i.e., the information indicating the location of the upper left sample 1230a of the upper coding unit 1220a, the (xb, yb) coordinates, i.e., the information indicating the location of the upper left sample 1230b of the center coding unit 1220b, and the (xc, yc) coordinates, i.e., the information indicating the location of the upper left sample 1230c of the lower coding unit 1220c. The image decoding apparatus 100 may determine the sizes of the coding units 1220a through 1220c by respectively using the coordinates (xa, ya), (xb, yb), and (xc, yc) indicating the locations of the coding units 1220a through 1220c.

According to an embodiment, the image decoding apparatus 100 may determine the width of the upper coding unit 1220a to be xb-xa, and the height to be yb-ya. According to an embodiment, the decoder 120 may determine the width of the center coding unit 1220b to be xc-xb, and the height to be yc-yb. According to an embodiment, the decoder 120 may determine the width or height of the lower coding unit 1220c by using the width and height of the current coding unit 1200 and the widths and heights of the upper coding unit 1220a and center coding unit 1320b. The decoder 120 may determine one coding unit having a different size from other coding units based on the determined widths and heights of the coding units 1220a through 1220c. Referring to FIG. 12, the image decoding apparatus 100 may determine the center coding unit 1220b having a size different from those of the upper coding unit 1220a and lower coding unit 1220c as a coding unit at a certain location. However, processes of the image decoding apparatus 100 determining a coding unit having a different size from other coding units are only an example of determining a coding unit at a certain location by using sizes of coding units determined based on sample coordinates, and thus various processes of determining a coding unit at a certain location by comparing sizes of coding units determined according to certain sample coordinates may be used.

However, a location of a sample considered to determine a location of a coding unit is not limited to the upper left as described above, and information about a location of an arbitrary sample included in a coding unit may be used.

According to an embodiment, the image decoding apparatus 100 may select a coding unit at a certain location from among an odd number of coding units determined when a current coding unit is split, while considering a shape of the current coding unit. For example, when the current coding unit has a non-square shape in which a width is longer than a height, the encoder 120 may determine a coding unit at a certain location in a horizontal direction. In other words, the decoder 120 may determine one of coding units having a different location in the horizontal direction and set a limit on the one coding unit. When the current coding unit has a non-square shape in which a height is longer than a width, the decoder 120 may determine a coding unit at a certain location in a vertical direction. In other words, the decoder 120 may determine one of coding units having a different location in the vertical direction and set a limit on the one coding unit.

According to an embodiment, the image decoding apparatus 100 may use information indicating a location of each of an even number of coding units so as to determine a coding unit at a certain location from among the even number of coding units. The decoder 120 may determine the even number of coding units by splitting a current coding unit, and determine the coding unit at the certain location by using information about the locations of the even number of coding units. Detailed processes thereof may be similar to those of determining a coding unit at a certain location (for example, a center location) from among an odd number of coding units described in FIG. 12, and thus details thereof are not provided again.

According to an embodiment, when a current coding unit having a non-square shape is split into a plurality of coding units, certain information about a coding unit at a certain location during splitting processes may be used to determine the coding unit at the certain location from among the plurality of coding units. For example, the decoder 120 of the image decoding apparatus 100 may use at least one of block shape information or split shape information stored in a sample included in a center coding unit during splitting processes so as to determine a coding unit located at the center from among a plurality of coding units obtained by splitting a current coding unit.

Referring to FIG. 12, the decoder 120 of the image decoding apparatus 100 may split the current coding unit 1200 into the plurality of coding units 1220a through 1220c based on at least one of block shape information or split shape information, and determine the coding unit 1220b located at the center from among the plurality of coding units 1220a through 1320c. In addition, the decoder 120 may determine the coding unit 1220b located at the center considering a location from which at least one of the block shape information or the split shape information is obtained. In other words, at least one of the block shape information or the split shape information of the current coding unit 1200 may be obtained from the sample 1240 located at the center of the current coding unit 1200, and when the current coding unit 1200 is split into the plurality of coding units 1220a through 1220c based on at least one of the block shape information or the split shape information, the coding unit 1220b including the sample 1240 may be determined as a coding unit located at the center. However, information used to determine a coding unit located at the center is not limited to at least one of the block shape information or the split shape information, and various types of information may be used while determining a coding unit located at the center.

According to an embodiment, certain information for identifying a coding unit at a certain location may be obtained from a certain sample included in a coding unit to be determined. Referring to FIG. 12, the decoder 120 may use at least one of block shape information or split shape information obtained from a sample at a certain location in the current coding unit 1200 (for example, a sample located at the center of the current coding unit 1200), so as to determine a coding unit at a certain location (for example, a coding unit located at the center from among a plurality of coding units) from among the plurality of coding units 1220a through 1220c determined when the current coding unit 1200 is split. In other words, the decoder 120 may determine the sample at the certain location considering a block shape of the current coding unit 1200, and determine and set a certain limit on the coding unit 1220b including a sample from which certain information (for example, at least one of block shape information or split shape information) is obtainable, from among the plurality of coding units 1220a through 1220c determined when the current coding unit 1300 is split. Referring to FIG. 12, according to an embodiment, the decoder 120 may determine, as a sample from which certain information is obtainable, the sample 1240 located at the center of the current coding unit 1200, and set a certain limit on the coding unit 1220b including such a sample 1240 during decoding processes. However, a location of a sample from which certain information is obtainable is not limited to the above, and may be a sample at an arbitrary location included in the coding unit 1220b determined to set a limit.

According to an embodiment, a location of a sample from which certain information is obtainable may be determined according to a shape of the current coding unit 1200. According to an embodiment, block shape information may determine whether a shape of a current coding unit is square or non-square, and determine a location of a sample from which certain information is obtainable according to the shape. For example, the decoder 120 may determine, as a sample from which certain information is obtainable, a sample located on a boundary of splitting at least one of a width or a height of a current coding unit into halves by using at least one of information about the width of the current coding unit or information about the height of the current coding unit. As another example, when block shape information related to a current coding unit indicates a non-square shape, the decoder 120 may determine, as a sample from which certain information is obtainable, one of samples adjacent to a boundary of splitting long sides of the current coding unit into halves.

According to an embodiment, when a current coding unit is split into a plurality of coding units, the image decoding apparatus 100 may use at least one of block shape information or split shape information so as to determine a coding unit at a certain location from among the plurality of coding units. According to an embodiment, the bitstream obtainer 110 may obtain at least one of block shape information or split shape information from a sample at a certain location included in a coding unit, and the decoder 120 may split a plurality of coding units generated as a current coding unit is split by using at least one of the split shape information or the block shape information obtained from the sample at the certain location included in each of the plurality of coding units. In other words, a coding unit may be recursively split by using at least one of block shape information or split shape information obtained from a sample at a certain location included in each coding unit. Because processes of recursively splitting a coding unit have been described above with reference to FIG. 11, details thereof are not provided again.

According to an embodiment, the image decoding apparatus 100 may determine at least one coding unit by splitting a current coding unit, and determine an order of decoding the at least one coding unit according to a certain block (for example, the current coding unit).

Figure 13:
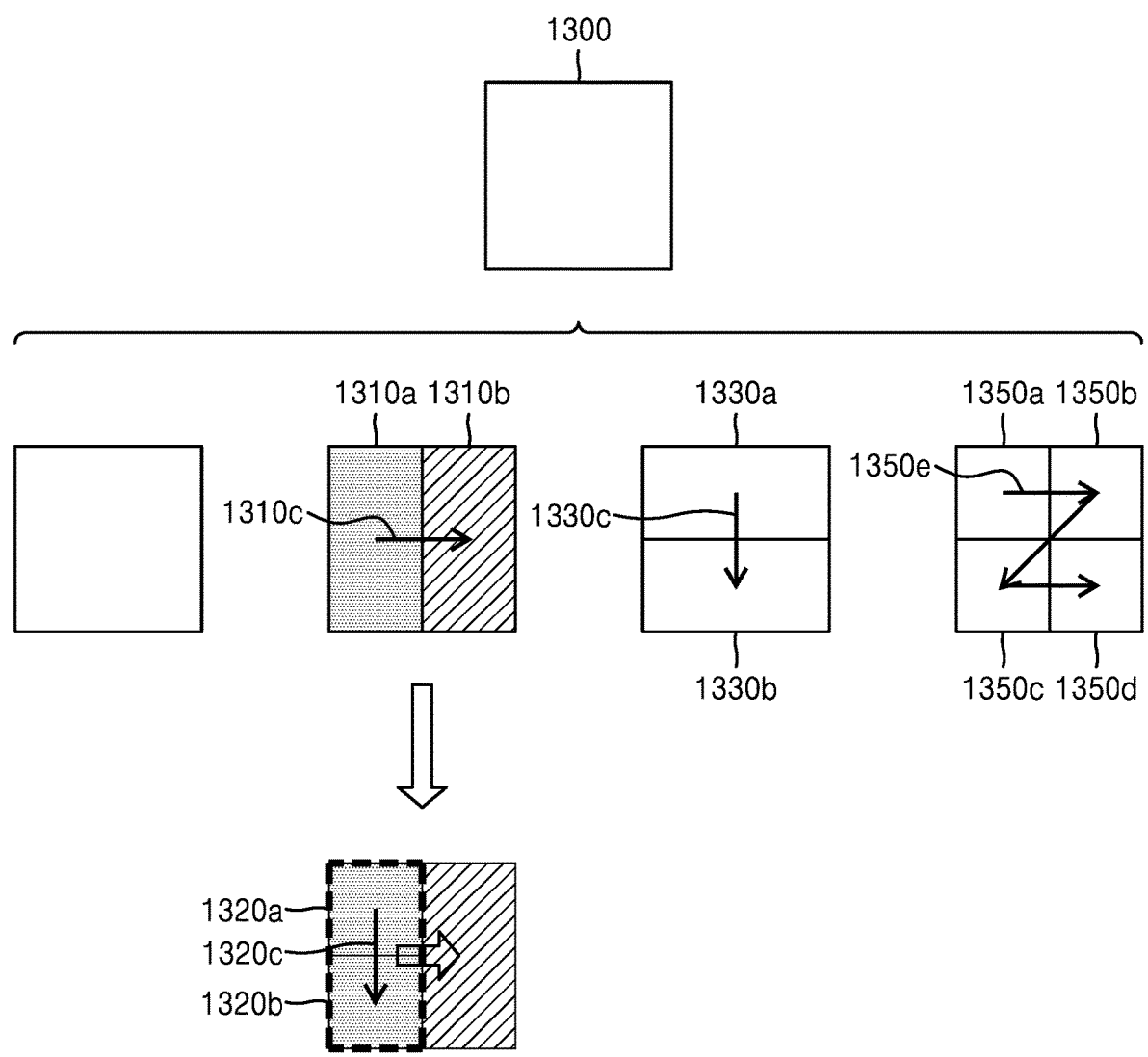
FIG. 13 illustrates an order of processing a plurality of coding units when the plurality of coding units are determined when a current coding unit is split, according to an embodiment.

FIG. 13 illustrates an order of processing a plurality of coding units when the plurality of coding units are determined when the image decoding apparatus 100 splits a current coding unit, according to an embodiment.

According to an embodiment, the decoder 120 may determine second coding units 1310a and 1310b by splitting a first coding unit 1300 in a vertical direction, determine second coding units 1330a and 1330b by splitting the first coding unit 1300 in a horizontal direction, or determine second coding units 1350a through 1350d by splitting the first coding unit 130 in horizontal and vertical directions, according to block shape information and split shape information.

Referring to FIG. 13, the decoder 120 may determine the second coding units 1310a and 1310b, which are determined by splitting the first coding unit 1300 in the vertical direction, to be processed in a horizontal direction 1310c. The image decoding apparatus 100 may determine the second coding units 1330a and 1330b, which are determined by splitting the first coding unit 1300 in the horizontal direction, to be processed in a vertical direction 1330*c*. The image decoding apparatus 100 may determine the second coding units 1350*a* through 1350*d*, which are determined by splitting the first coding unit 1300 in the vertical and horizontal directions, to be processed) according to a certain order in which coding units located in one row is processed and then coding units located in a next row is processed (for example, a raster scan order or a z-scan order 1350*e*).

According to an embodiment, the image decoding apparatus 100 may recursively split coding units. Referring to FIG. 13, the decoder 120 may determine the plurality of second coding units 1310*a* and 1310*b*, 1330*a* and 1330*b*, or 1350*a* through 1350*d* by splitting the first coding unit 1300, and recursively split each of the plurality of second coding units 1310*a* and 1310*b*, 1330*a* and 1330*b*, or 1350*a* through 1350*d*. A method of splitting the plurality of second coding units 1310*a* and 1310*b*, 1330*a* and 1330*b*, or 1350*a* through 1350*d* may be similar to a method of splitting the first coding unit 1300. Accordingly, each of the plurality of second coding units 1310*a* and 1310*b*, 1330*a* and 1330*b*, or 1350*a* through 1350*d* may be independently split into a plurality of coding units. Referring to FIG. 13, the decoder 120 may determine the second coding units 1310*a* and 1310*b* by splitting the first coding unit 1300 in the vertical direction, and in addition, determine that each of the second coding units 1310*a* and 1310*b* is independently split or not split.

According to an embodiment, the decoder 120 may split the second coding unit 1310*a* at the left in a horizontal direction into third coding units 1320*a* and 1320*b*, and may not split the second coding unit 1310*b* at the right.

According to an embodiment, an order of processing coding units may be determined based on split processes of coding units. In other words, an order of processing coding units that are split may be determined based on an order of processing coding units before being split. The decoder 120 may determine an order of processing the third coding units 1320*a* and 1320*b* determined when the second coding unit 1310*a* at the left is split independently from the second coding unit 1310*b* at the right. Because the third coding units 1320*a* and 1320*b* are determined when the second coding unit 1310*a* at the left is split in a horizontal direction, the third coding units 1320*a* and 1320*b* may be processed in a vertical direction 1320*c*. Also, because an order of processing the second coding unit 1310*a* at the left and the second coding unit 1310*b* at the right corresponds to the horizontal direction 1310*c*, the second coding unit 1310*b* at the right may be processed after the third coding units 1320*a* and 1320*b* included in the second coding unit 1310*a* at the left are processed in the vertical direction 1320*c*. The above descriptions are related processes of determining an order of processing coding units according to coding units before being split, but such processes are not limited to the above embodiments, and any method of independently processing, in a certain order, coding units split into various shapes may be used.

Figure 14:
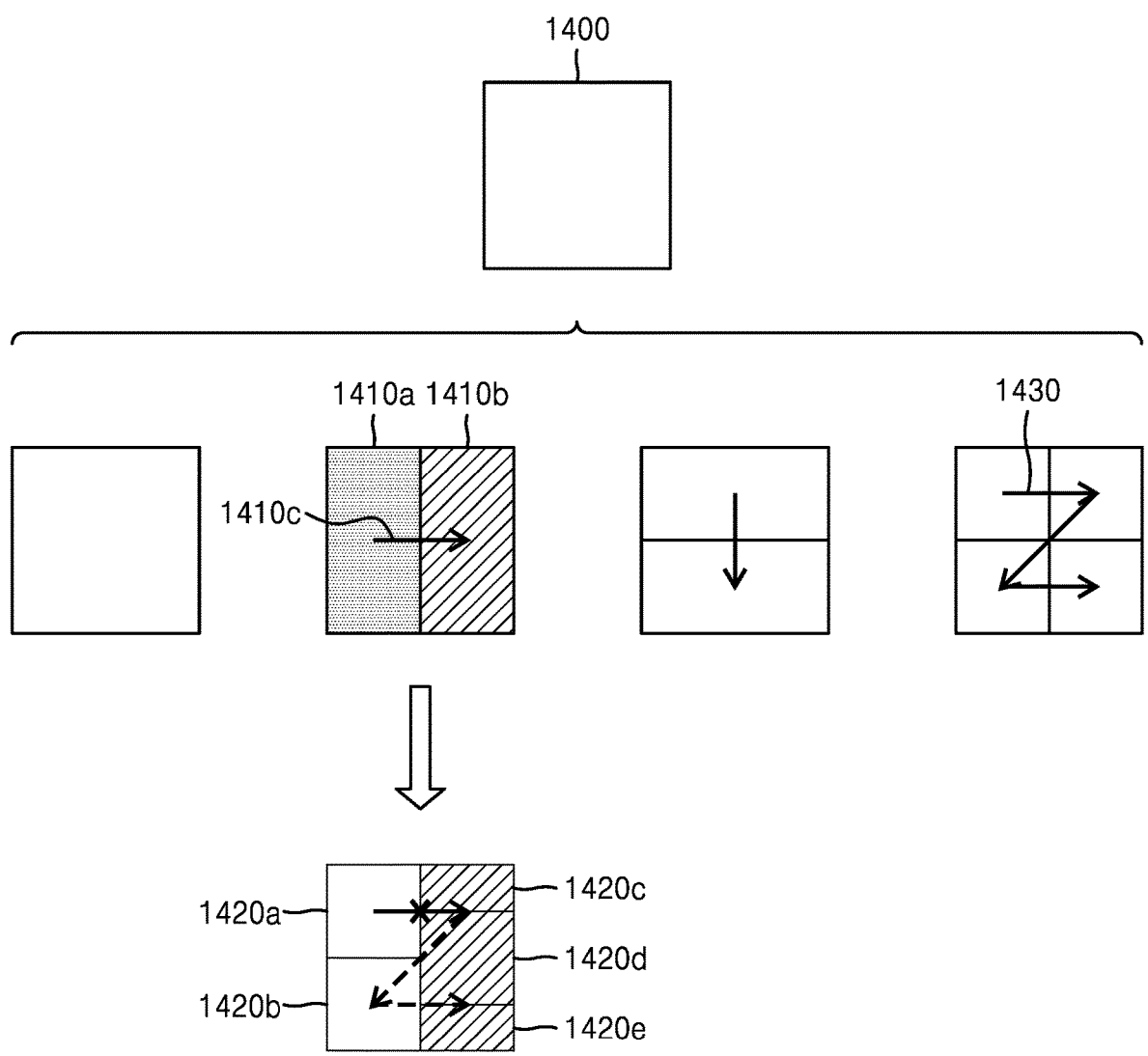
FIG. 14 illustrates processes of determining that a current coding unit is split into an odd number of coding units when coding units are not processable in a certain order, according to an embodiment.

FIG. 14 illustrates processes of determining that a current coding unit is split into an odd number of coding units when coding units are not processable in a certain order by the image decoding apparatus 100, according to an embodiment.

According to an embodiment, the image decoding apparatus 100 may determine that a current coding unit is split into an odd number of coding units based on block shape information and split shape information obtained by the bitstream obtainer 110. Referring to FIG. 14, a first coding unit 1400 having a square shape may be split into second coding units 1410*a* and 1410*b* having a non-square shape, and the second coding units 1410*a* and 1410*b* may be independently respectively split into third coding units 1420*a* and 1420*b*, and 1420*c* through 1420*e*. According to an embodiment, the decoder 120 may split the second coding unit 1410*a* at the left from among the second coding units 1410*a* and 1410*b* into a horizontal direction to determine the plurality of third coding units 1420*a* and 1420*b*, and split the second coding unit 1410*b* at the right into the odd number of third coding units 1420*c* through 1420*e*.

According to an embodiment, the decoder 120 may determine whether a coding unit split into an odd number exists by determining whether the third coding units 1420*a* through 1420*e* are processable in a certain order. Referring to FIG. 14, the decoder 120 may determine the third coding units 1420*a* through 1420*e* by recursively splitting the first coding unit 1400. The decoder 120 may determine, based on at least one of block shape information or split shape information, whether a coding unit is split into an odd number from among shapes into which the first coding unit 1400, the second coding units 1410*a* and 1410*b*, or the third coding units 1420*a* through 1420*e* are split. For example, the second coding unit 1410*b* at the right from among the second coding units 1410*a* and 1410*b* may be split into the odd number of third coding units 1420*c* through 1420*e*. An order of processing a plurality of coding units included in the first coding unit 1400 may be a certain order (for example, a z-scan order 1430), and the decoder 120 may determine whether the third coding units 1420*c* through 1420*e* determined when the second coding unit 1410*b* at the right is split into an odd number satisfy a condition of being processable according to the certain order.

According to an embodiment, the image decoding apparatus 100 may determine whether the third coding units 1420*a* through 1420*e* included in the first coding unit 1400 satisfy a condition of being processable according to a certain order, wherein the condition is related to whether at least one of a width or a height of each of the second coding units 1410*a* and 1410*b* is split into halves according to boundaries of the third coding units 1420*a* through 1420*e*. For example, the third coding units 1420*a* and 1420*b* determined when the height of the second coding unit 1410*a* at the left and having a non-square shape is split into halves satisfy the condition, but it may be determined that the third coding units 1420*c* through 1420*e* do not satisfy the condition because the boundaries of the third coding units 1420*c* through 1420*e* that are determined when the second coding unit 1410*b* at the right is split into three coding units do not split the width or height of the second coding unit 1410*b* at the right into halves. The image decoding apparatus 100 may determine disconnection of a scan order when the condition is not satisfied, and determine that the second coding unit 1410*b* at the right is split into the odd number of coding units, based on a result of the determination. According to an embodiment, the image decoding apparatus 100 may set a certain limit on a coding unit at a certain location from among an odd number of coding units obtained by splitting a coding unit, and because such a limit or certain location has been described above through various embodiments, details thereof are not provided again.

Figure 15:
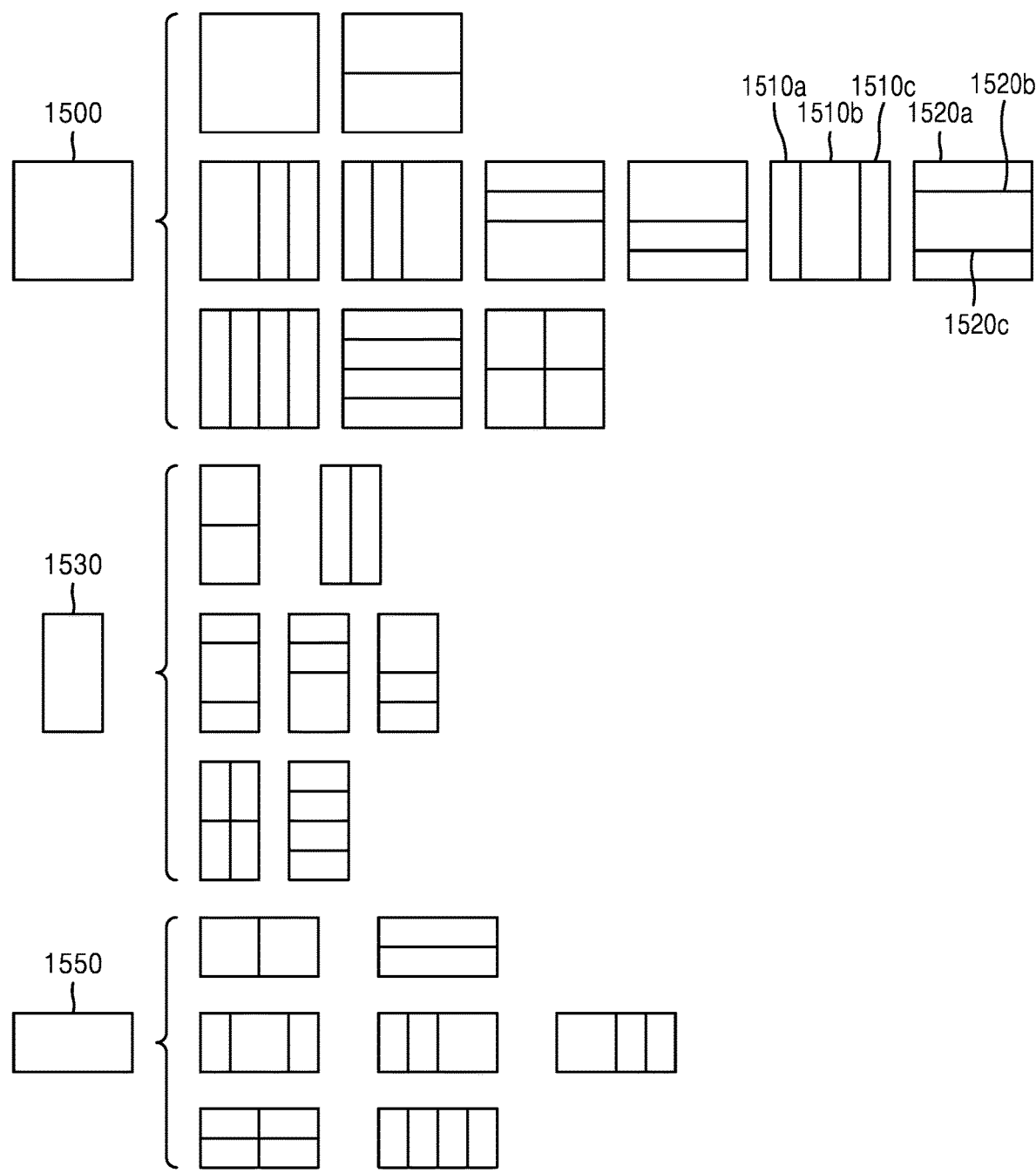
FIG. 15 illustrates processes of determining at least one coding unit when a first coding unit is split, according to an embodiment.

FIG. 15 illustrates processes of determining at least one coding unit when the image decoding apparatus 100 splits a first coding unit 1500, according to an embodiment. According to an embodiment, the decoder 120 may split the first coding unit 1500 based on at least one of block shape information or split shape information obtained through the bitstream obtainer 110. The first coding unit 1500 having a square shape may be split into four coding units having a square shape or a plurality of coding units having a non-square shape. For example, referring to FIG. 15, when block shape information indicates that the first coding unit 1500 is a square and split shape information indicates a split into non-square coding units, the decoder 120 may split the first coding unit 1500 into a plurality of non-square coding units. In detail, when split shape information indicates that an odd number of coding units are determined by splitting the first coding unit 1500 in a horizontal direction or a vertical direction, the decoder 120 may determine, as the odd number of coding units, second coding units 1510a through 1510c by splitting the first coding unit 1500 having a square shape in a vertical direction, or second coding units 1520a through 1520c by splitting the first coding unit 1500 in a horizontal direction.

According to an embodiment, the decoder 120 may determine whether the second coding units 1510a through 1510c and 1520a through 1520c included in the first coding unit 1500 satisfy a condition of being processable in a certain order, wherein the condition is related to whether at least one of a width or a height of the first coding unit 1500 is split into halves according to boundaries of the second coding units 1510a through 1510c and 1520a through 1520c. Referring to FIG. 15, because the boundaries of the second coding units 1510a through 1510c determined when the first coding unit 1500 having a square shape is split in a vertical direction do not split the width of the first coding unit 1500 into halves, it may be determined that the first coding unit 1500 does not satisfy the condition of being processable in a certain order. Also, because the boundaries of the second coding units 1520a through 1520c determined when the first coding unit 1500 having a square shape is split in a horizontal direction do not split the height of the first coding unit 1500 into halves, it may be determined that the first coding unit 1500 does not satisfy the condition of being processable in a certain order. The image decoding apparatus 100 may determine disconnection of a scan order when the condition is not satisfied, and determine that the first coding unit 1500 is split into the odd number of coding units based on a result of the determination. According to an embodiment, the image decoding apparatus 100 may set a certain limit on a coding unit at a certain location from among an odd number of coding units obtained by splitting a coding unit, and because such a limit or certain location has been described above through various embodiments, details thereof are not provided again.

According to an embodiment, the image decoding apparatus 100 may determine coding units having various shapes by splitting a first coding unit.

Referring to FIG. 15, the image decoding apparatus 100 may split the first coding unit 1500 having a square shape and a first coding unit 1530 or 1550 having a non-square shape into coding units having various shapes.

Figure 16:
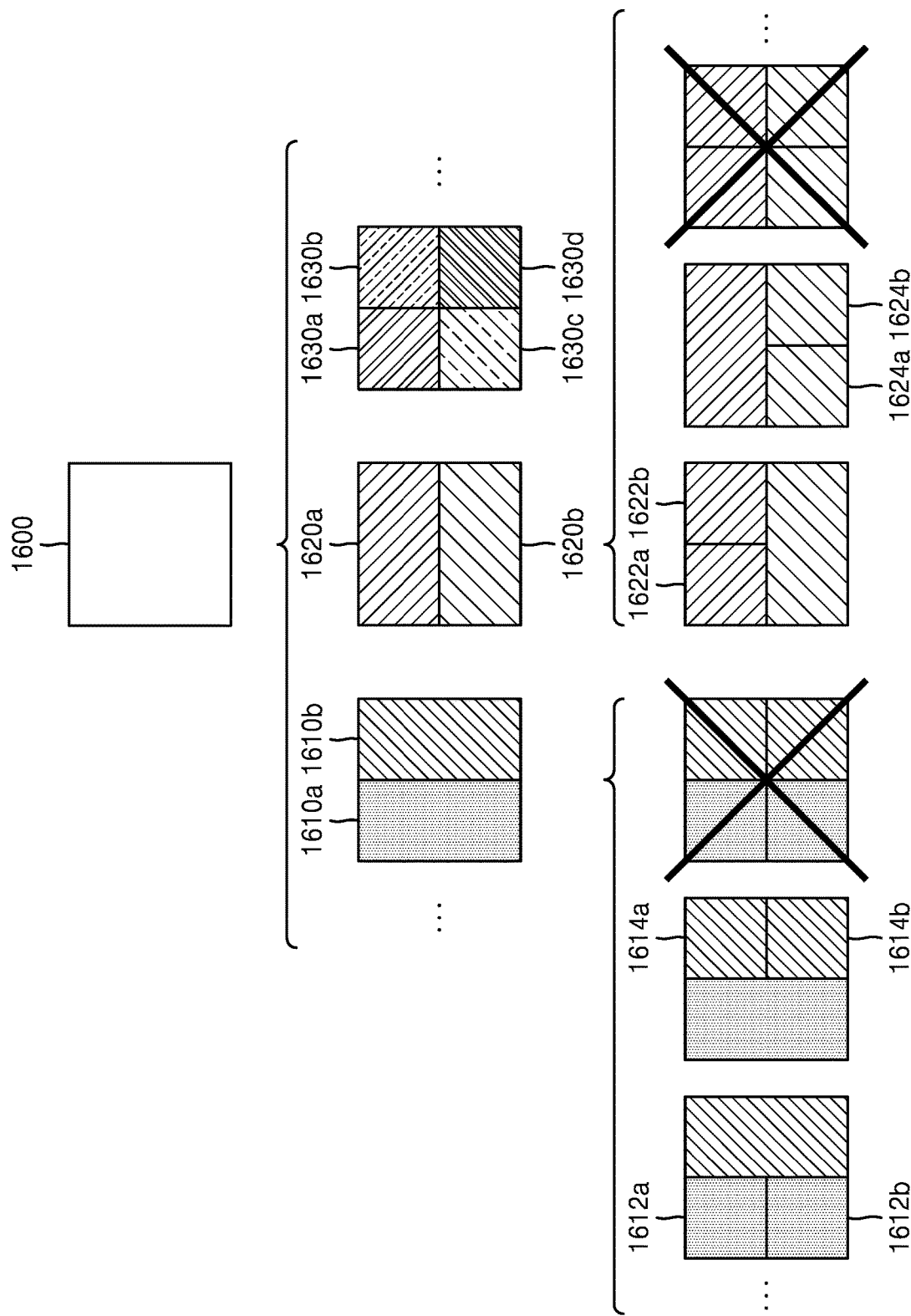
FIG. 16 illustrates that a shape into which a second coding unit is splittable is restricted when the second coding unit of a non-square shape determined when a first coding unit is split satisfies a certain condition, according to an embodiment.

FIG. 16 illustrates that a shape into which a second coding unit is splittable by the image decoding apparatus 100) is restricted when the second coding unit having a non-square shape determined when a first coding unit 1600 is split satisfies a certain condition, according to an embodiment.

According to an embodiment, the decoder 120 may determine that the first coding unit 1600 having a square shape is split into second coding units 1610a and 1610b or 1620a and 1620b having a non-square shape, based on at least one of block shape information or split shape information obtained through the bitstream obtainer 110. The second coding units 1610a and 1610b or 1620a and 1620b may be independently split. Accordingly, the decoder 120 may determine that the second coding units 1610a and 1610b or 1620a and 1620b are split into a plurality of coding units or are not split based on at least one of block shape information or split shape information related to each of the coding units 1610a and 1610b or 1620a and 1620b. According to an embodiment, the decoder 120 may determine third coding units 1612a and 1612b by splitting, in a horizontal direction, the second coding unit 1610a at the left having a non-square shape, which is determined when the first coding unit 1600 is split in a vertical direction. However, when the second coding unit 1610a at the left is split in the horizontal direction, the decoder 120 may set a limit that the second coding unit 1610b at the right is not split in the horizontal direction like the second coding unit 1610a at the left. When third coding units 1614a and 1614b are determined when the second coding unit 1610b at the right is split in the same direction, i.e., the horizontal direction, the third coding units 1612a, 1612b, 1614a, and 1614b are determined when the second coding units 1610a at the left and the second coding unit 1610b at the right are each independently split in the horizontal direction. However, this is the same result as splitting the first coding unit 1600 into four second coding units 1630a through 1630d having a square shape based on at least one of block shape information or split shape information, and thus may be inefficient in terms of image decoding.

According to an embodiment, the decoder 120 may determine third coding units 1622a and 1622b or 1624a, and 1624b by splitting, in a vertical direction, the second coding unit 1620a or 1620b having a non-square shape determined when the first coding unit 1600 is split in the horizontal direction. However, when one of second coding units (for example, the second coding unit 1620a at the top) is split in a vertical direction, the decoder 120 may set a limit that the other second coding unit (for example, the second coding unit 1620b at the bottom) is not split in the vertical direction like the second coding unit 1620a at the top for the above described reasons.

Figure 17:
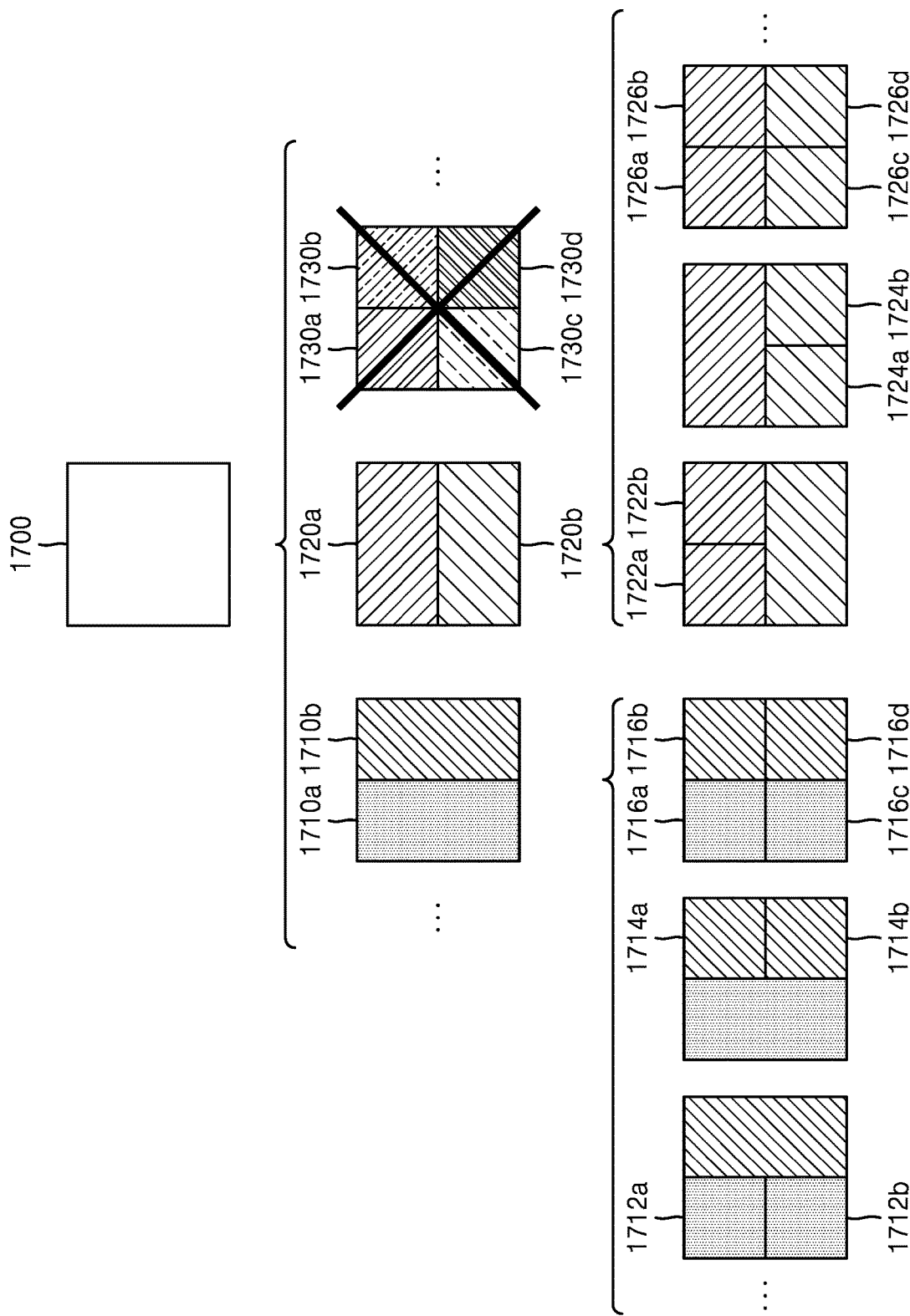
FIG. 17 illustrates processes of splitting a coding unit of a square shape when split shape information is unable to indicate that a coding unit is split into four square shapes, according to an embodiment.

FIG. 17 illustrates processes of the image decoding apparatus 100 splitting a coding unit having a square shape when split shape information is unable to indicate that a coding unit is split into four square shapes, according to an embodiment.

According to an embodiment, the decoder 120 may determine second coding units 1710a and 1710b, or 1720a and 1720b, by splitting a first coding unit 1700 based on at least one of block shape information or split shape information. Split shape information may include information about various shapes into which a coding unit may be split, but such information about various shapes may not include information for splitting a coding unit into four square coding units. According to such split shape information, the decoder 120 is unable to split the first coding unit 1700 having a square shape into four second coding units 1730a through 1730d having a square shape. The decoder 120 may determine the second coding units 1710a and 1710b, or 1720a and 1720b having a non-square shape based on the split shape information.

According to an embodiment, the decoder 120 may independently split each of the second coding units 1710a and 1710b, or 1720a and 1720b having a non-square shape. Each of the second coding units 1710a and 1710b, or 1720a and 1720b may be split in a certain order via a recursive method that may be a split method similar to a method of splitting the first coding unit 1700 based on at least one of the block shape information or the split shape information.

For example, the decoder may determine third coding units 1712a and 1712b having a square shape by splitting the second coding unit 1710a at the left in a horizontal direction, or determine third coding units 1714a and 1714b having a square shape by splitting the second coding unit 1710b at the right in a horizontal direction. In addition, the decoder 120 may determine third coding units 1716a through 1716d having a square shape by splitting both the second coding unit 1710a at the left and the second coding unit 1710b at the right in the horizontal direction. In this case, coding units may be determined in the same manner as when the first coding unit 1700 is split into four second coding units 1730a through 1730d having a square shape.

As another example, the decoder 120 may determine third coding units 1722a and 1722b having a square shape by splitting the second coding unit 1720a at the top in a vertical direction, and determine third coding units 1724a and 1724b having a square shape by splitting the second coding unit 1720b at the bottom in a vertical direction. In addition, the decoder 120 may determine third coding units 1726a through 1726d having a square shape by splitting both the second coding unit 1720a at the top and the second coding unit 1720b at the bottom in the vertical direction. In this case, coding units may be determined in the same manner as when the first coding unit 1700 is split into four second coding units 1730a through 1730d having a square shape.

Figure 18:
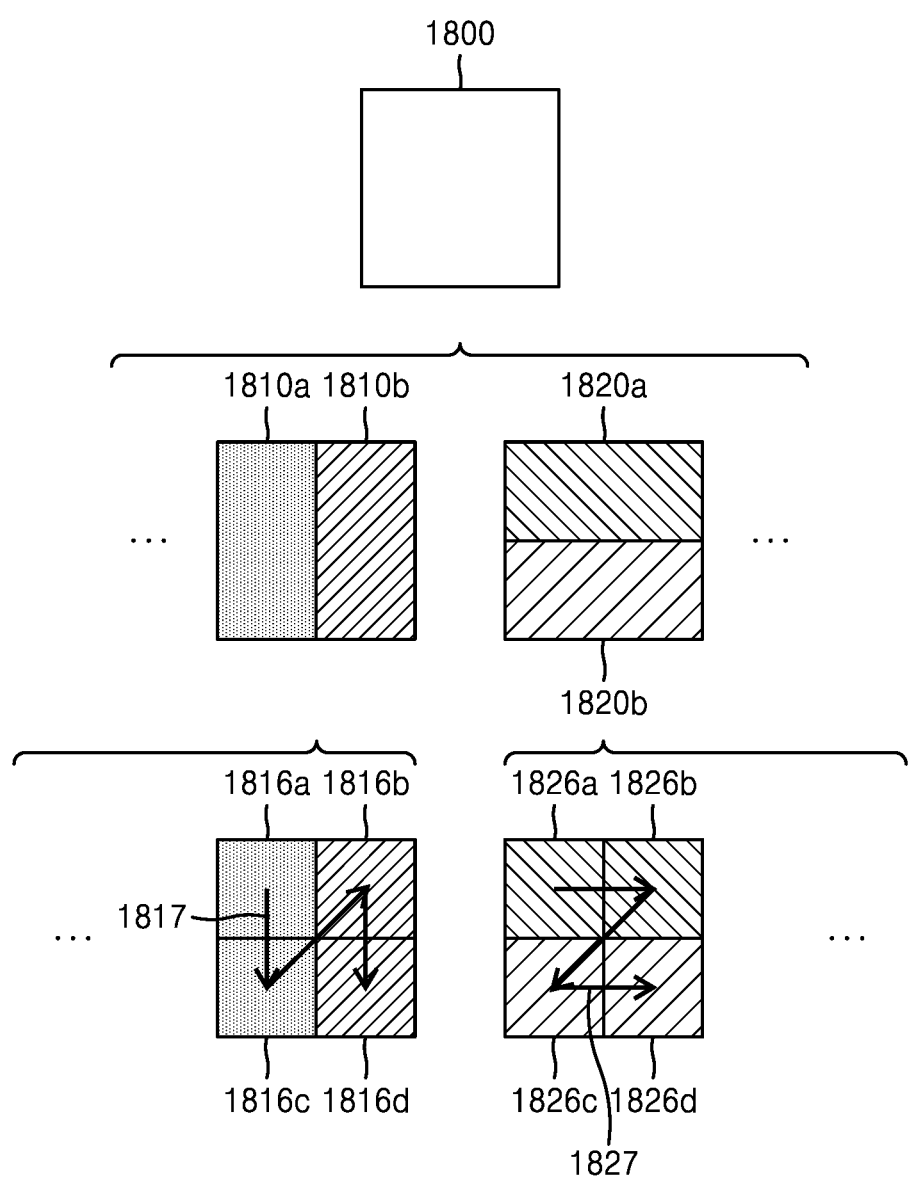
FIG. 18 illustrates that an order of processing a plurality of coding units may be changed according to processes of splitting a coding unit, according to an embodiment.

FIG. 18 illustrates that an order of processing a plurality of coding units may be changed according to processes of splitting a coding unit, according to an embodiment.

According to an embodiment, the decoder 120 may split a first coding unit 1800 based on block shape information and split shape information. When the block shape information indicates a square shape and the split shape information indicates that the first coding unit 1800 is to be split in at least one of a horizontal direction and a vertical direction, the decoder 120 may split the first coding unit 1800 to determine second coding units 1810a and 1810b, or 1820a and 1820b. Referring to FIG. 18, the second coding units 1810a and 1810b, or 1820a and 1820b having a non-square shape and determined when the first coding unit 1800 is split in the horizontal direction or the vertical direction may each be independently split based on block shape information and split shape information. For example, the decoder 120 may determine third coding units 1816a through 1816d by splitting, in the horizontal direction, each of the second coding units 1810a and 1810b generated as the first coding unit 1800 is split in the vertical direction, or determine third coding units 1826a through 1826d by splitting, in the horizontal direction, the second coding units 1820a and 1820b generated as the first coding unit 1800 is split in the horizontal direction. Processes of splitting the second coding units 1810a and 1810b, or 1820a and 1820b have been described above with reference to FIG. 16, and thus details thereof are not provided again.

According to an embodiment, the decoder 120 may process coding units according to a certain order. Features about processing coding units according to a certain order have been described above with reference to FIG. 13, and thus details thereof are not provided again. Referring to FIG. 18, the decoder 120 may determine four third coding units 1816a through 1816d or 1826a through 1826d having a square shape by splitting the first coding unit 1800 having a square shape. According to an embodiment, the decoder 120 may determine an order of processing the third coding units 1816a through 1816d or 1826a through 1826d based on how the first coding unit 1800 is split.

According to an embodiment, the decoder 120 may determine the third coding units 1816a through 1816d by splitting, in the horizontal direction, the second coding units 1810a and 1810b generated as the first coding unit 1800 is split in the vertical direction, and process the third coding units 1816a through 1816d according to an order 1817 of first processing, in the vertical direction, the third coding units 1816a and 1816b included in the second coding unit 1810a at the left, and then processing, in the vertical direction, the third coding units 1816c and 1816d included in the second coding unit 1810b at the right.

According to an embodiment, the decoder 120 may determine the third coding units 1826a through 1826d by splitting, in the vertical direction, the second coding units 1820a and 1820b generated as the first coding unit 1800 is split in the horizontal direction, and process the third coding units 1826a through 1826d according to an order 1827 of first processing, in the horizontal direction, the third coding units 1826a and 1826b included in the second coding unit 1820a at the top, and then processing, in the horizontal direction, the third coding units 1826c and 1826d included in the second coding unit 1820b at the bottom.

Referring to FIG. 18, the third coding units 1816a through 1816d or 1826a through 1826d having a square shape may be determined when the second coding units 1810a and 1810b, or 1820a and 1820b are each split. The second coding units 1810a and 1810b determined when the first coding unit 1800 is split in the vertical direction and the second coding units 1820a and 1820b determined when the first coding unit 1800 is split in the horizontal direction are split in different shapes, but according to the third coding units 1816a through 1816d and 1826a through 1826d determined afterwards, the first coding unit 1800 is split in coding units having same shapes. Accordingly, the decoder 120 may process pluralities of coding units determined in same shapes in different orders even when the coding units having the same shapes are consequently determined when coding units are recursively split through different processes based on at least one of block shape information or split shape information.

FIG. 19 illustrates processes of determining a depth of a coding unit as a shape and size of the coding unit are changed, when a plurality of coding units are determined when the coding unit is recursively split, according to an embodiment.

According to an embodiment, the decoder 120 may determine a depth of a coding unit according to a certain standard. For example, the certain standard may be a length of a long side of the coding unit. When a length of a long side of a current coding unit is split $2n$ times shorter than a length of a long side of a coding unit before being split, it may be determined that a depth of the current coding unit is increased n times a depth of the coding unit before being split, wherein n>0. Hereinafter, a coding unit having an increased depth is referred to as a coding unit of a lower depth.

Referring to FIG. 19, the decoder 120 may determine a second coding unit 1902 and a third coding unit 1904 of lower depths by splitting a first coding unit 1900 having a square shape, based on block shape information indicating a square shape (for example, block shape information may indicate '0:SQURE'), according to an embodiment. When a size of the first coding unit 1900 having a square shape is 2N×2N, the second coding unit 1902 determined by splitting a width and a height of the first coding unit 1900 by $\frac{1}{2^1}$ may have a size of N×N. In addition, the third coding unit 1904 determined by splitting a width and a height of the second coding unit 1902 by ½ may have a size of N/2×N/2. In this case, a width and a height of the third coding unit 1904 corresponds to $\frac{1}{2^2}$ of the first coding unit 1900. When a depth of first coding unit 1900 is D, a depth of the second coding unit 1902 having ½₁ of the width and the height of the first coding unit 1900 may be D+1, and a depth of the third coding unit 1904 having ½₂ of the width and the height of the first coding unit 1900 may be D+2.

According to an embodiment, the decoder 120 may determine a second coding unit 1912 or 1922 and a third coding unit 1914 or 1924 by splitting a first coding unit 1910 or 1920 having a non-square shape, based on block shape information indicating a non-square shape (for example, block shape information may indicate '1:NS_VER' indicating a non-square shape in which a height is longer than a width, or '2:NS_HOR' indicating a non-square shape in which a width is longer than a height), according to an embodiment.

The decoder 120 may determine a second coding unit (for example, the second coding unit 1902, 1912, or 1922) by splitting at least one of a width and a height of the first coding unit 1910 having a size of N×2N. In other words, the decoder 120 may determine the second coding unit 1902 having a size of N×N or the second coding unit 1922 having a size of N×N/2 by splitting the first coding unit 1910 in a horizontal direction, or determine the second coding unit 1912 having a size of N/2×N by splitting the first coding unit 1910 in horizontal and vertical directions.

According to an embodiment, the decoder 120 may determine a second coding unit (for example, the second coding unit 1902, 1912, or 1922) by splitting at least one of a width or a height of the first coding unit 1920 having a size of 2N×N. In other words, the decoder 120 may determine the second coding unit 1902 having a size of N×N or the second coding unit 1912 having a size of N/2×N by splitting the first coding unit 1920 in a vertical direction, or determine the second coding unit 1922 having a size of N×N/2 by splitting the first coding unit 1910 in horizontal and vertical directions.

According to an embodiment, the decoder 120 may determine a third coding unit (for example, the third coding unit 1904, 1914, or 1924) by splitting at least one of a width or a height of the second coding unit 1902 having a size of N×N. In other words, the decoder 120 may determine the third coding unit 1904 having a size of N/2×N/2, the third coding unit 1914 having a size of N/2²×N/2, or the third coding unit 1924 having a size of N/2×N/2² by splitting the second coding unit 1902 in vertical and horizontal directions.

According to an embodiment, the decoder 120 may determine a third coding unit (for example, the third coding unit 1904, 1914, or 1924) by splitting at least one of a width or a height of the second coding unit 1922 having a size of N/2×N. In other words, the decoder 120 may determine the third coding unit 1904 having a size of N/2×N/2 or the third coding unit 1924 having a size of N/2×N/2² by splitting the second coding unit 1912 in a horizontal direction, or the third coding unit 1914 having a size of N/2²×N/2 by splitting the second coding unit 1912 in vertical and horizontal directions.

According to an embodiment, the decoder 120 may determine a third coding unit (for example, the third coding unit 1904, 1914, or 1924) by splitting at least one of a width or a height of the second coding unit 1922 having a size of N×N/2. In other words, the decoder 120 may determine the third coding unit 1904 having a size of N/2×N/2 or the third coding unit 1914 having a size of N/2²×N/2 by splitting the second coding unit 1922 in a vertical direction, or the third coding unit 1924 having a size of N/2×N/2² by splitting the second coding unit 1922 in vertical and horizontal directions.

According to an embodiment, the decoder 120 may split a coding unit (for example, the first, second, or third coding unit 1900, 1902, or 1904) having a square shape in a horizontal or vertical direction. For example, the first coding unit 1910 having a size of N×2N may be determined by splitting the first coding unit 1900 having a size of 2N×2N in the vertical direction, or the first coding unit 1920 having a size of 2N×N may be determined by splitting the first coding unit 1900 in the horizontal direction. According to an embodiment, when a depth is determined based on a length of a longest side of a coding unit, a depth of a coding unit determined when the first coding unit 1900 having a size of 2N×2N is split in a horizontal or vertical direction may be the same as a depth of the first coding unit 1900.

According to an embodiment, the width and the height of the third coding unit 1914 or 1924 may be ½₂ of those of the first coding unit 1910 or 1920. When the depth of the first coding unit 1910 or 1920 is D, the depth of the second coding unit 1912 or 1922 that is ½ of the width and the height of the first coding unit 1910 or 1920 may be D+1, and the depth of the third coding unit 1914 or 1924 that is ½₂ of the width and the height of the first coding unit 1910 or 1924 may be D+2.

Figure 20:
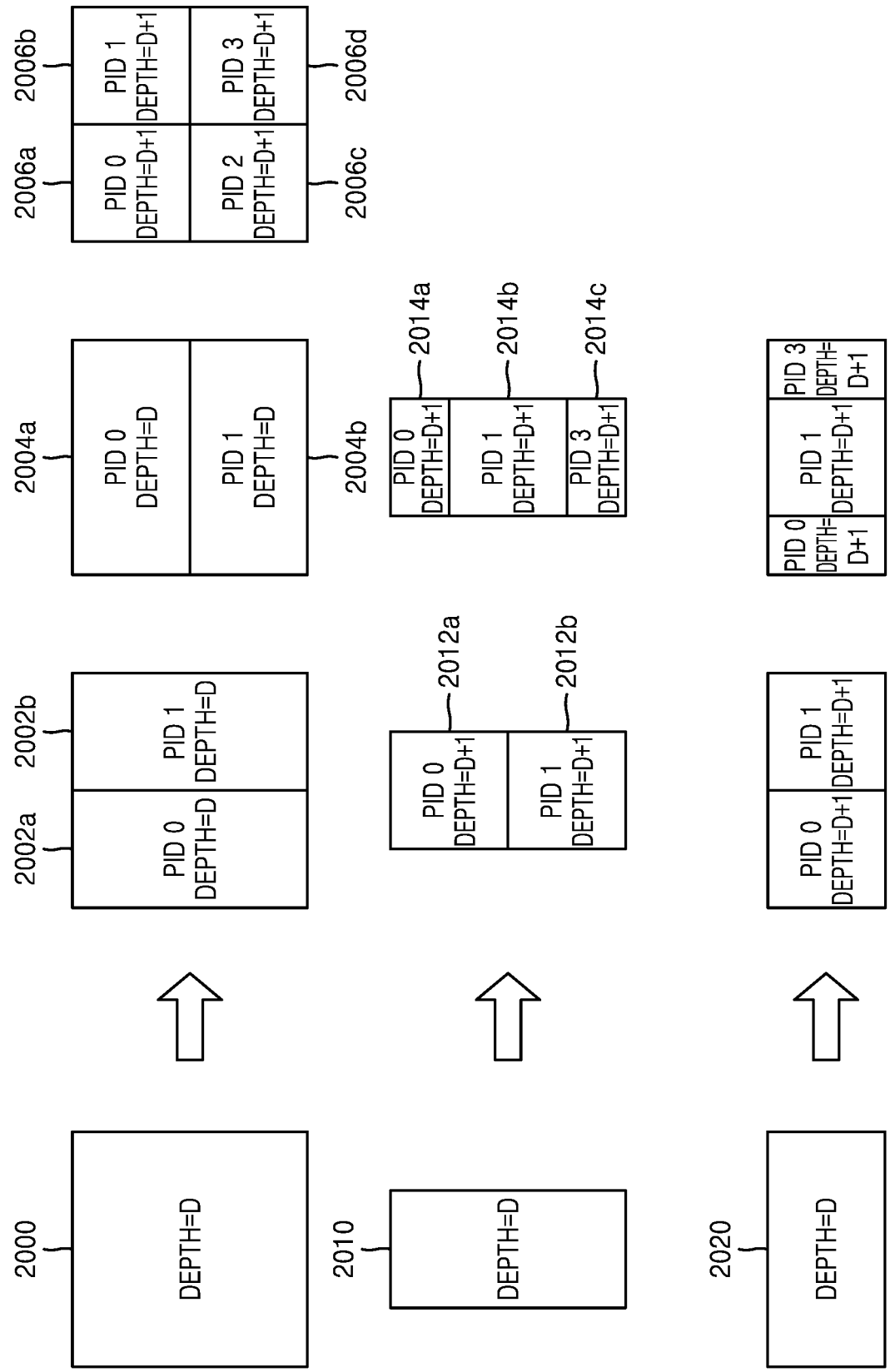
FIG. 20 illustrates a part index (PID) for distinguishing depths and coding units, which may be determined according to shapes and sizes of coding units, according to an embodiment.

FIG. 20 illustrates a part index (PID) for distinguishing depths and coding units, which may be determined according to shapes and sizes of coding units, according to an embodiment.

According to an embodiment, the decoder 120 may determine a second coding unit having various shapes by splitting a first coding unit 2000 having a square shape. Referring to FIG. 20, the decoder 120 may determine second coding units 2002a and 2002b, 2004a and 2004b, or 2006a through 2006d by splitting the first coding unit 2000 in at least one of a vertical direction or a horizontal direction, according to split shape information. In other words, the decoder 120 may determine the second coding units 2002a and 2002b, 2004a and 2004b, or 2006a through 2006d based on split shape information of the first coding unit 2000.

According to an embodiment, a depth of the second coding units 2002a and 2002b, 2004a and 2004b, or 2006a through 2006d determined according to the split shape information of the first coding unit 2000 having a square shape may be determined based on a length of a long side. For example, because a length of one side of the first coding unit 2000 having a square shape is the same as a length of a long side of the second coding units 2002a and 2002b or 2004a and 2004b having a non-square shape, the depths of the first coding unit 2000 and the second coding units 2002a and 2002b or 2004a and 2004b having a non-square shape may be the same, i.e., D. On the other hand, when the decoder 120 splits the first coding unit 2000 into the four second coding units 2006a through 2006d having a square shape, based on the split shape information, a length of one side of the second coding units 2006a through 2006d having a square shape is ½ of the length of one side of the first coding unit 2000, the depths of the second coding units 2006a through 2006d may be D+1, i.e., a depth lower than the depth D of the first coding unit 2000.

According to an embodiment, the decoder 120 may split a first coding unit 2010, in which a height is longer than a width, in a horizontal direction into a plurality of second coding units 2012a and 2012b or 2014a through 2014c, according to split shape information. According to an embodiment, the decoder 120 may split a first coding unit 2020, in which a width is longer than a height, in a vertical direction into a plurality of second coding units 2022a and 2022b or 2024a through 2024c, according to split shape information.

According to an embodiment, depths of the second coding units 2012a and 2012b, 2014a through 2014c, 2022a and 2022b, or 2024a through 2024c determined according to the split shape information of the first coding unit 2010 or 2020 having a non-square shape may be determined based on a length of a long side. For example, because a length of one side of the second coding units 2012a and 2012b having a square shape is ½ of a length of a long side of the first coding unit 2010 having a non-square shape, in which the height is longer than the width, the depths of the second coding units 2012a and 2012b are D+1, i.e., depths lower than the depth D of the first coding unit 2010 having a non-square shape.

In addition, the decoder 120 may split the first coding unit 2010 having a non-square shape into an odd number of second coding units 2014a through 2014c, based on split shape information. The odd number of second coding units 2014a through 2014c may include the second coding units 2014a and 2014c having a non-square shape, and the second coding unit 2014b having a square shape. In this case, because a length of a long side of the second coding units 2014a and 2014c having a non-square shape and a length of one side of the second coding unit 2014b having a square shape are ½ of a length of one side of the first coding unit 2010, depths of the second coding units 2014a through 2014b may be D+1, i.e., a depth lower than the depth D of the first coding unit 2010. The decoder 120 may determine depths of coding units related to the first coding unit 2020 having a non-square shape in which a width is longer than a height, in the similar manner as the determining of depths of coding units related to the first coding unit 2010.

According to an embodiment, with respect to determining PIDs for distinguishing coding units, when an odd number of coding units do not have the same size, the decoder 120 may determine PIDs based on a size ratio of the coding units. Referring to FIG. 20, the second coding unit 2014b located at the center from the odd number of second coding units 2014a through 2014c may have the same width as the second coding units 2014a and 2014c, but have a height twice higher than those of the second coding units 2014a and 2014c. In this case, the second coding unit 2014b located at the center may include two of the second coding units 2014a and 2014c. Accordingly, when the PID of the second coding unit 2014b located at the center is 1 according to a scan order, the PID of the second coding unit 2014c in a next order may be 3, the PID having increased by 2. In other words, values of the PID may be discontinuous. According to an embodiment, the decoder 120 may determine whether an odd number of coding units have the same sizes based on discontinuity of PID for distinguishing the coding units.

According to an embodiment, the image decoding apparatus 100 may determine whether a plurality of coding units determined when a current coding unit is split have certain split shapes based on values of PID. Referring to FIG. 20, the image decoding apparatus 100 may determine the even number of second coding units 2012a and 2012b or the odd number of second coding units 2014a through 2014c by splitting the first coding unit 2010 having a rectangular shape in which the height is longer than the width. The image decoding apparatus 100 may use the PID indicating each coding unit so as to distinguish a plurality of coding units. According to an embodiment, a PID may be obtained from a sample at a certain location (for example, an upper left sample) of each coding unit.

According to an embodiment, the image decoding apparatus 100 may determine a coding unit at a certain location from among coding units determined by using PIDs for distinguishing coding units. According to an embodiment, when split shape information of the first coding unit 2010 having a rectangular shape in which a height is longer than a width indicates that the first coding unit 2010 is split into three coding units, the image decoding apparatus 100 may split the first coding unit 2010 into the three second coding units 2014a through 2014c. The image decoding apparatus 100 may assign a PID to each of the three second coding units 2014a through 2014c. The image decoding apparatus 100 may compare PIDs of an odd number of coding units so as to determine a center coding unit from among the coding units. The image decoding apparatus 100 may determine, as a coding unit at a center location from among coding units determined when the first coding unit 2010 is split, the second coding unit 2014b having a PID corresponding to a center value from among PIDs, based on PIDs of the coding units. According to an embodiment, while determining PIDs for distinguishing coding units, when the coding units do not have the same sizes, the image decoding apparatus 100 may determine PIDs based on a size ratio of the coding units. Referring to FIG. 20, the second coding unit 2014b generated when the first coding unit 2010 is split may have the same width as the second coding units 2014a and 2014c, but may have a height twice higher than those of the second coding units 2014a and 2014c. In this case, when the PID of the second coding unit 2014b located at the center is 1, the PID of the second coding unit 2014c in a next order may be 3, the PID having increased by 2. As such, when an increasing range of PIDs differs while uniformly increasing, the image decoding apparatus 100 may determine that a current coding unit is split into a plurality of coding units including a coding unit having a different size from other coding units. According to an embodiment, when split shape information indicates splitting into an odd number of coding units, the image decoding apparatus 100 may split a current coding unit into a plurality of coding units, in which a coding unit at a certain location (for example, a center coding unit) has a size different from other coding units. In this case, the image decoding apparatus 100 may determine the center coding unit having the different size by using PIDs of the coding units. However, a PID, and a size or location of a coding unit at a certain location described above are specified to describe an embodiment, and thus should not be limitedly interpreted, and various PIDs, and various locations and sizes of a coding unit may be used.

According to an embodiment, the decoder 120 may use a certain data unit from which recursive splitting of a coding unit is started.

Figure 21:
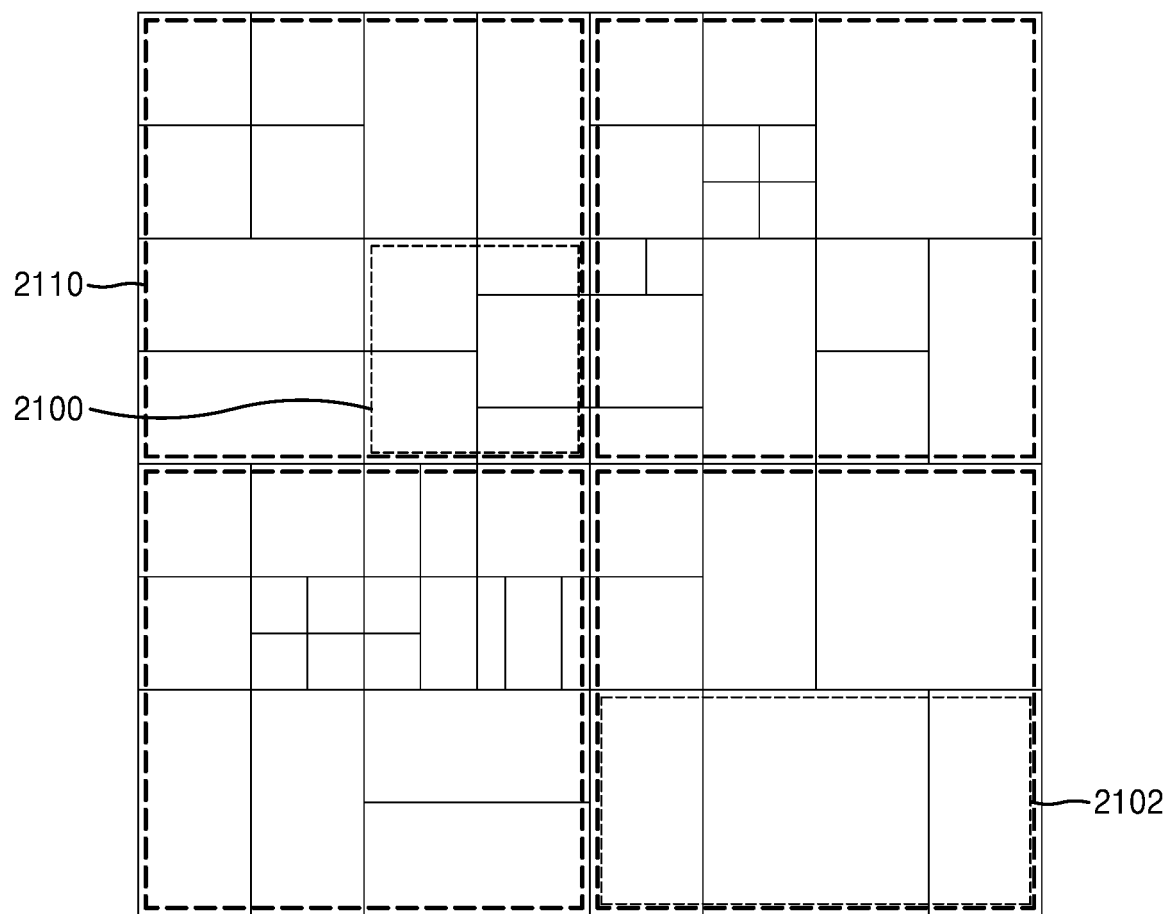
FIG. 21 illustrates that a plurality of coding units are determined according to a plurality of certain data units included in a picture, according to an embodiment.

FIG. 21 illustrates that a plurality of coding units are determined according to a plurality of certain data units included in a picture, according to an embodiment.

According to an embodiment, a certain data unit may be defined as a data unit from which a coding unit starts to be recursively split by using at least one of block shape information or split shape information. In other words, the certain data unit may correspond to a coding unit of an uppermost depth used while determining a plurality of coding units by splitting a current picture. Hereinafter, the certain data unit is referred to as a reference data unit for convenience of description.

According to an embodiment, the reference data unit may indicate a certain size and shape. According to an embodiment, the reference data unit may include M×N samples. Here, M and N may be the same, and may be an integer expressed as a multiple of 2. In other words, a reference data unit may indicate a square shape or a non-square shape, and may later be split into an integer number of coding units.

According to an embodiment, the decoder 120 of the image decoding apparatus 100 may split a current picture into a plurality of reference data units. According to an embodiment, the decoder 120 may split the plurality of reference data units obtained by splitting the current picture by using split shape information about each of the reference data units. Split processes of such reference data units may correspond to split processes using a quad-tree structure.

According to an embodiment, the decoder 120 may pre-determine a smallest size available for the reference data unit included in the current picture. Accordingly, the decoder 120 may determine the reference data unit having various sizes that are equal to or larger than the smallest size, and determine at least one coding unit based on the determined reference data unit by using block shape information and split shape information.

Referring to FIG. 21, the image decoding apparatus 100 may use a reference coding unit 2100 having a square shape, or may use a reference coding unit 2102 having a non-square shape. According to an embodiment, a shape and size of a reference coding unit may be determined according to various data units (for example, a sequence, a picture, a slice, a slice segment, and a largest coding unit) that may include at least one reference coding unit.

According to an embodiment, the bitstream obtainer 110 of the image decoding apparatus 100 may obtain, from a bitstream, at least one of information about a shape of a reference coding unit or information about a size of the reference coding unit, according to the various data units. Processes of determining at least one coding unit included in the reference coding unit 2100 having a square shape have been described above through processes of splitting the current coding unit 900 of FIG. 9, and processes of determining at least one coding unit included in the reference coding unit 2100 having a non-square shape have been described above through processes of splitting the current coding unit 1000 or 1050 of FIG. 10, and thus details thereof are not provided again.

According to an embodiment, in order to determine a size and shape of a reference coding unit according to some data units pre-determined based on a certain condition, the decoder 120 may use a PID for distinguishing the size and shape of the reference coding unit. In other words, the bitstream obtainer 110 may obtain, from a bitstream, only a PID for distinguishing a size and shape of a reference coding unit as a data unit satisfying a certain condition (for example, a data unit having a size equal to or smaller than a slice) from among various data units (for example, a sequence, a picture, a slice, a slice segment, and a largest coding unit), according to slices, slice segments, and largest coding units. The decoder 120 may determine the size and shape of the reference data unit according to data units that satisfy the certain condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size or the shape of the reference coding unit related to the PID indicating the size and shape of the reference coding unit may be pre-determined. In other words, the decoder 120 may select at least one of the pre-determined size or shape of the reference coding unit according to the PID so as to determine at least one of the size or shape of the reference coding unit included in a data unit that is a criterion for obtaining the PID.

According to an embodiment, the decoder 120 may use at least one reference coding unit included in one largest coding unit. In other words, a largest coding unit splitting an image may include at least one reference coding unit, and a coding unit may be determined when each of the reference coding unit is recursively split. According to an embodiment, at least one of a width or height of the largest coding unit may be an integer times at least one of a width or height of the reference coding unit. According to an embodiment, a size of a reference coding unit may be equal to a size of a largest coding unit, which is split n times according to a quad-tree structure. In other words, the decoder 120 may determine a reference coding unit by splitting a largest coding unit n times according to a quad-tree structure, and split the reference coding unit based on at least one of block shape information or split shape information according to various embodiments.

Figure 22:
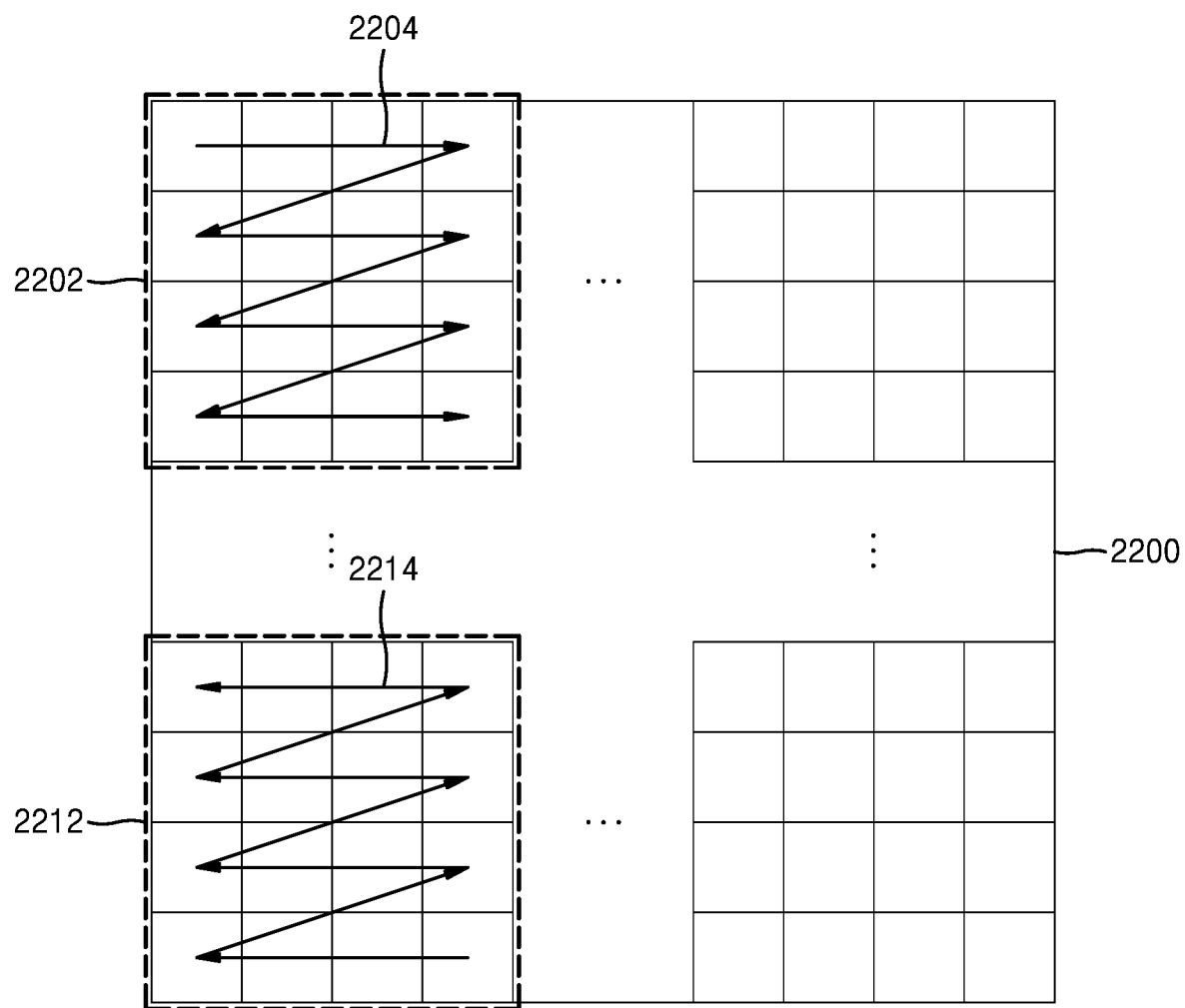
FIG. 22 illustrates a processing block serving as a criterion for determining a determination order of reference coding units included in a picture, according to an embodiment.

FIG. 22 illustrates a processing block serving as a criterion of determining a determination order of reference coding units included in a picture 2200, according to an embodiment.

According to an embodiment, the decoder 120 may determine at least one processing block splitting a picture. A processing block is a data unit including at least one reference coding unit splitting an image, and the at least one reference coding unit included in the processing block may be determined in a certain order. In other words, a determining order of the at least one reference coding unit determined in each processing block may correspond to one of various orders for determining a reference coding unit, and may vary according to processing blocks. A determining order of reference coding units determined per processing block may be one of various orders, such as a raster scan order, a Z-scan order, an N-scan order, an up-right diagonal scan order, a horizontal scan order, and a vertical scan order, but should not be limitedly interpreted with respect to the scan orders.

According to an embodiment, the decoder 120 may determine a size of at least one processing block included in an image by obtaining information about a size of a processing block. The decoder 120 may obtain, from a bitstream, the information about a size of a processing block to determine the size of the at least one processing block included in the image. The size of the processing block may be a certain size of a data unit indicated by the information about a size of a processing block.

According to an embodiment, the bitstream obtainer 110 of the image decoding apparatus 100 may obtain, from the bitstream, the information about a size of a processing block according to certain data units. For example, the information about a size of a processing block may be obtained from the bitstream in data units of images, sequences, pictures, slices, and slice segments. In other words, the bitstream obtainer 110 may obtain, from the bitstream, the information about a size of a processing block according to such several data units, and the decoder 120 may determine the size of at least one processing block splitting the picture by using the obtained information about a size of a processing block, wherein the size of the processing block may be an integer times a size of a reference coding unit.

According to an embodiment, the decoder 120 may determine sizes of processing blocks 2202 and 2212 included in the picture 2200. For example, the decoder 120 may determine a size of a processing block based on information about a size of a processing block, the information being obtained from a bitstream. Referring to FIG. 22, the decoder 120 may determine horizontal sizes of the processing blocks 2202 and 2212 to be four times a horizontal size of a reference coding unit, and a vertical size thereof to be four times a vertical size of the reference coding unit, according to an embodiment. The decoder 120 may determine a determining order of at least one reference coding unit in at least one processing block.

According to an embodiment, the decoder 120 may determine each of the processing blocks 2202 and 2212 included in the picture 2300 based on a size of a processing block, and a reference coding unit determiner may determine a determining order of at least one reference coding unit included in each of the processing blocks 2202 and 2212. According to an embodiment, determining of a reference coding unit may include determining a size of the reference coding unit.

According to an embodiment, the decoder 120 may obtain, from a bitstream, information about a determining order of at least one reference coding unit included in at least one processing block, and determine the determining order of the at least one reference coding unit based on the obtained information. The information about a determining order may be defined as an order or direction of determining reference coding units in a processing block. In other words, an order of determining reference coding units may be independently determined per processing block.

According to an embodiment, the image decoding apparatus 100 may obtain, from a bitstream, information about a determining order of a reference coding unit according to certain data units. For example, the bitstream obtainer 110 may obtain, from the bitstream, the information about a determining order of a reference coding unit according to data units, such as images, sequences, pictures, slices, slice segments, and processing blocks. Because the information about a determining order of a reference coding unit indicates a determining order of a reference coding unit in a processing block, the information about a determining order may be obtained per certain data unit including an integer number of processing blocks.

According to an embodiment, the image decoding apparatus 100 may determine at least one reference coding unit based on the determined order.

According to an embodiment, the bitstream obtainer 110 may obtain, from the bitstream, information about a determining order of a reference coding unit, as information related to the processing blocks 2202 and 2212, and the decoder 120 may determine an order of determining at least one reference coding unit included in the processing blocks 2202 and 2212 and determine at least one reference coding unit included in the picture 2200 according to a determining order of a coding unit. Referring to FIG. 22, the decoder 120 may determine determining orders 2204 and 2214 of at least one reference coding unit respectively related to the processing blocks 2202 and 2212. For example, when information about a determining order of a reference coding unit is obtained per processing block, determining orders of a reference coding unit related to the processing blocks 2202 and 2212 may be different from each other. When the determining order 2204 related to the processing block 2202 is a raster scan order, reference coding units included in the processing block 2202 may be determined according to the raster scan order. On the other hand, when the determining order 2214 related to the processing block 2212 is a reverse order of a raster scan order, reference coding units included in the processing block 2212 may be determined in the reverse order of the raster scan order.

The decoder 120 may decode determined at least one reference coding unit, according to an embodiment. The decoder 120 may decode an image based on reference coding units determined through above embodiments. Examples of a method of decoding a reference coding unit may include various methods of decoding an image.

According to an embodiment, the image decoding apparatus 100 may obtain, from a bitstream, and use block shape information indicating a shape of a current coding unit or split shape information indicating a method of splitting the current coding unit. The block shape information or the split shape information may be included in a bitstream related to various data units. For example, the image decoding apparatus 100 may use the block shape information or split shape information, which is included in a sequence parameter set, a picture parameter set, a video parameter set, a slice header, and a slice segment header. In addition, the image decoding apparatus 100 may obtain, from a bitstream, and use syntax corresponding to the block shape information or the split shape information, according to largest coding units, reference coding units, and processing blocks.

According to an embodiment, the decoder 120 may determine types of split shapes into which a coding unit is splittable differently for each certain data unit. The decoder 120 of the image decoding apparatus 100 may determine a combination of shapes into which a coding unit is splittable differently for each certain data unit (for example, sequence, picture, slice, or the like), according to an embodiment.

Figure 23:
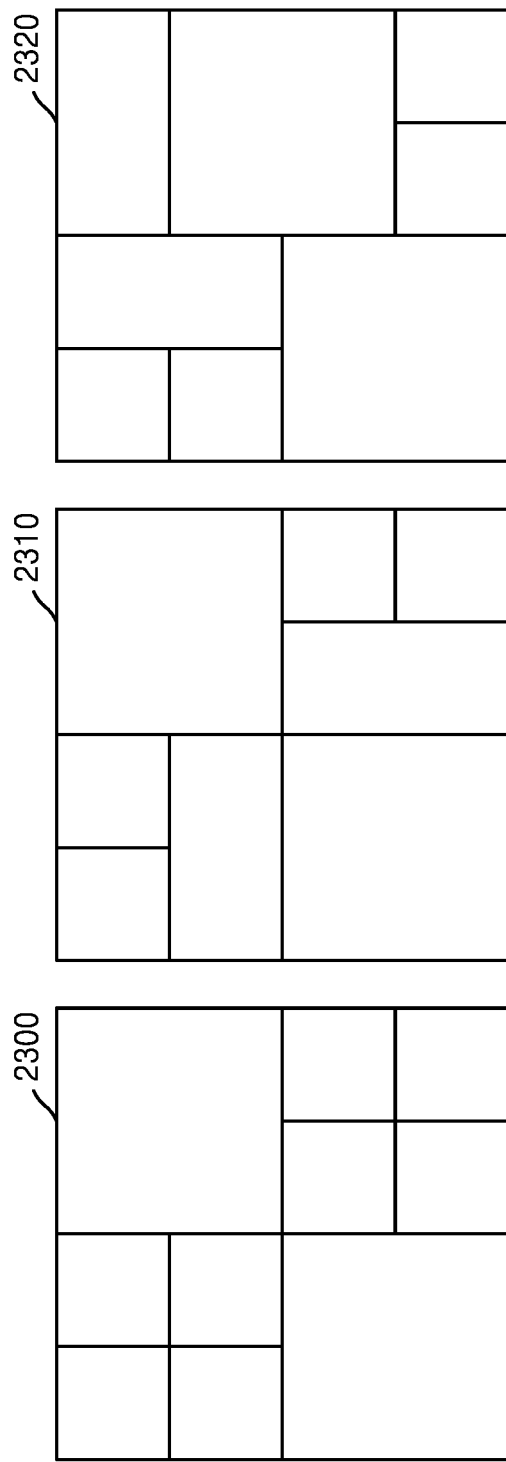
FIG. 23 illustrates coding units that may be determined for each picture, when a combination of shapes into which a coding unit is splittable is different for each picture, according to an embodiment.

FIG. 23 illustrates coding units that may be determined for each picture, when a combination of shapes into which a coding unit is splittable is different for each picture, according to an embodiment.

Referring to FIG. 23, the decoder 120 may differently determine a combination of split shapes into which a coding unit is splittable, for each picture. For example, the decoder 120 may decode an image by using a picture 2300 splittable into four coding units, a picture 2310 splittable into two or four coding units, and a picture 2320 splittable into two, three, or four coding units, among at least one picture included in the image. The decoder 120 may only use split shape information indicating split into four square coding units so as to split the picture 2300 into a plurality of coding units. The decoder 120 may only use split shape information indicating split into two or four coding units so as to split the picture 2310. The decoder 120 may only use split shape information indicating split into two, three, or four coding units so as to split the picture 2320. The combination of split shapes described above is merely an embodiment for describing operations of the image decoding apparatus 100, and thus the combination of split shapes should not be limited to the above embodiment and a combination of various shapes of split shapes may be used for each certain data unit.

According to an embodiment, the bitstream obtainer 110 of the image decoding apparatus 100 may obtain, from a bitstream, an index indicating a combination of split shape information, for each certain data unit (for example, sequence, picture, slice, or the like). For example, the bitstream obtainer 110 may obtain, from the bitstream, the index indicating the combination of split shape information for each sequence parameter set, picture parameter set, or slice header. The decoder 120 of the image decoding apparatus 100 may determine the combination of split shapes into which a coding unit is splittable, for each certain data unit by using the obtained index, and accordingly use different combinations of split shapes for each certain data unit.

FIG. 24 illustrates various shapes of coding units that may be determined based on split shape information represented in a binary code, according to an embodiment.

According to an embodiment, the image decoding apparatus 100 may split a coding unit into various shapes, by using block shape information and split shape information obtained through the bitstream obtainer 110. A shape into which a coding unit is splittable may correspond to various shapes including the shapes described through various embodiments above.

Referring to FIG. 24, the decoder 120 may split a coding unit of a square shape in at least one of a horizontal direction or a vertical direction, based on the split shape information, and split a coding unit of a non-square shape in the horizontal direction or the vertical direction.

According to an embodiment, when the decoder 120 is able to split the coding unit of the square shape in the horizontal direction and the vertical direction into four square coding units, split shapes indicated by the split shape information regarding the coding unit of the square shape may be four. According to an embodiment, the split shape information may be represented as a binary code of two digits and the binary code may be assigned for each split shape. For example, when the coding unit is not split, the split shape information may be represented as (00)b, when the coding unit is split in the horizontal direction and the vertical direction, the split shape information may be represented as (01)b, when the coding unit is split in the horizontal direction, the split shape information may be represented as (10)b, and when the coding unit is split in the vertical direction, the split shape information may be represented as (11)b.

According to an embodiment, when a coding unit of a non-square shape is split in the horizontal direction or the vertical direction, the decoder 120 may determine a type of a split shape indicated by the split shape information based on the number of coding units into which the coding unit of the non-square shape is split. Referring to FIG. 24, the decoder 120 may split the coding unit of the non-square shape into three, according to an embodiment. The decoder 120 may split the coding unit into two coding units, and in this case, the split shape information may be represented as (10)b. The decoder 120 may split the coding unit into three coding units, and in this case, the split shape information may be represented as (11)b. The decoder 120 may determine not to split the coding unit, and in this case, the split shape information may be represented as (0)b. In other words, the decoder 120 may use variable length coding (VLC) instead of fixed length coding (FLC) so as to use the binary code indicating the split shape information.

According to an embodiment, referring to FIG. 24, the binary code of the split shape information indicating that the coding unit is not to be split may be represented as (0)b. When the binary code of the split shape information indicating that the coding unit is not to be split is set to (00)b, even though there is no split shape information set to (01)b, binary codes of split shape information of 2 bits need to be all used. However, as shown in FIG. 24, when three split shapes are used for the coding unit of the non-square shape, the decoder 120 may determine that the coding unit is not split even by using the binary code (0)b of one bit as the split shape information, and thus a bitstream may be efficiently used. However, the split shapes of the coding unit of the non-square shape indicated by the split shape information are not limited to three shown in FIG. 24, and may be various shapes including the above embodiments.

FIG. 25 illustrates other shapes of coding units that may be determined based on split shape information represented in a binary code, according to an embodiment.

Referring to FIG. 25, the decoder 120 may split a coding unit of a square shape in a horizontal direction or a vertical direction and split a coding unit of a non-square shape in the horizontal direction or the vertical direction, based on the split shape information. In other words, the split shape information may indicate that the coding unit of the square shape is split in one direction. In this case, a binary code of the split shape information indicating that the coding unit of the square shape is not to be split may be represented as (0)b. When the binary code of the split shape information indicating that the coding unit is not to be split is set to (00)b, even though there is no split shape information set to (01)b, binary codes of split shape information of 2 bits need to be all used. However, as shown in FIG. 25, when three split shapes are used for the coding unit of the square shape, the decoder 120 may determine that the coding unit is not split even by using the binary code (0)b of one bit as the split shape information, and thus a bitstream may be efficiently used. However, the split shapes of the coding unit of the square shape indicated by the split shape information are not limited to three shown in FIG. 25, and may be various shapes including the above embodiments.

According to an embodiment, block shape information or split shape information may be represented by using a binary code, and such information may be directly generated as a bitstream. Also, the block shape information or the split shape information represented as a binary code may not be directly generated as a bitstream, but may be used as a binary code input in CABAC.

According to an embodiment, processes of the image decoding apparatus 100 obtaining a syntax regarding the block shape information or the split shape information via CABAC will be described. The bitstream obtainer 110 may obtain a bitstream including a binary code regarding the syntax. The decoder 120 may detect a syntax element indicating the block shape information or the split shape information by performing inverse binarization on a bin string included in the obtained bitstream. According to an embodiment, the decoder 120 may obtain a set of binary bin strings corresponding to a syntax element to be decoded and decode each bin by using probability information, and the decoder 120 may repeat such processes until a bin string consisting of such decoded bins becomes the same as one of bin strings previously obtained. The decoder 120 may determine the syntax element by performing inverse binarization on the bin string.

According to an embodiment, the decoder 120 may determine the syntax regarding the bin string by performing decoding processes of adaptive binary arithmetic coding, and the decoder 120 may update a probability model regarding the bins obtained through the bitstream obtainer 110. Referring to FIG. 24, the bitstream obtainer 110 of the image decoding apparatus 100 may obtain a bitstream indicating the binary code indicating the split shape information, according to an embodiment. The decoder 120 may determine the syntax regarding the split shape information by using the obtained binary code having the size of 1 bit or 2 bits. The decoder 120 may update a probability regarding each bit among the binary codes of 2 bits so as to determine the syntax regarding the split shape information. In other words, the decoder 120 may update the probability of having a value of 0 or 1 when decoding a next bin, based on which one of 0 and 1 is a value of a first bin among the binary code of 2 bits.

According to an embodiment, during processes of determining the syntax, the decoder 120 may update the probability regarding the bins used during processes of decoding bins of the bin string regarding the syntax, and the decoder 120 may not update the probability, but determine the same probability at a certain bit among the bin string.

Referring to FIG. 24, during the processes of determining the syntax by using the bin string indicating the split shape information regarding the coding unit of the non-square shape, the decoder 120 may determine the syntax regarding the split shape information by using one bin having a value of 0, when the coding unit of the non-square shape is not split. In other words, when the block shape information indicates that a current coding unit is a non-square shape, a first bin of a bin string regarding the split shape information may be 0 when the coding unit of the non-square shape is not split, and may be 1 when the coding unit is split into two or three coding units. Accordingly, the probability of the first bin of the bin string of the split shape information regarding the coding unit of the non-square shape being 0 is ⅓ and being 1 is ⅔. As described above, because the split shape information indicating that the coding unit of the non-square shape is not to be split may be represented only as a bin string of one bit having a value of 0, the decoder 120 may determine the syntax regarding the split shape information by determining whether a second bin is 0 or 1 only when the first bin of the split shape information is 1. According to an embodiment, when the first bin regarding the split shape information is 1, the decoder 120 may decode a bin by determining that the probability of the second bin being 0 or 1 is the same.

According to an embodiment, the image decoding apparatus 100 may use various probabilities regarding each bin during the processes of determining the bin of the bin string regarding the split shape information. According to an embodiment, the decoder 120 may differently determine the probability of the bin regarding the split shape information based on a direction of a non-square shape. According to an embodiment, the decoder 120 may differently determine the probability of bin regarding the split shape information based on the area or the length of long side of the current coding unit. According to an embodiment, the decoder 120 may differently determine the probability of bin regarding the split shape information based on at least one of the shape or length of long side of the current coding unit.

According to an embodiment, the decoder 120 may determine the probability of the bin regarding the split shape information to be the same with respect to coding units having a certain size or greater. For example, it may be determined that the probability of the bin regarding the split shape information is the same with respect to coding units having the size of 64 samples or greater based on the length of long side of the coding unit.

According to an embodiment, the decoder 120 may determine an initial probability of the bins constituting the bin string of the split shape information, based on a slice type (for example, I-slice, P-slice, or B-slice).

Figure 26:
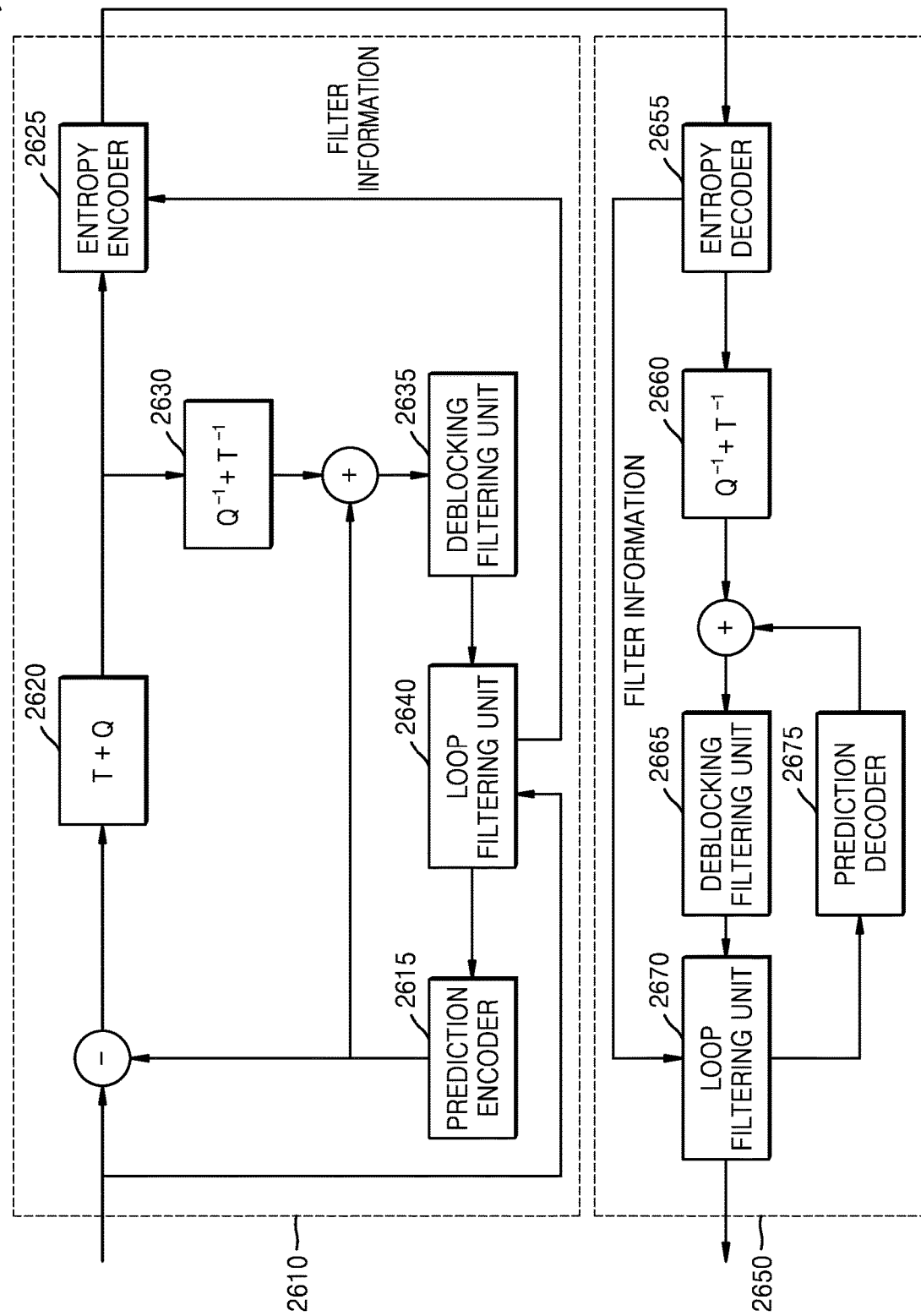
FIG. 26 is a block diagram of an image encoding and decoding system performing loop filtering.

FIG. 26 is a block diagram of an image encoding and decoding system performing loop filtering.

An encoder 2610 of an image encoding and decoding system 2600 transmits an encoded bitstream of an image and a decoder 2650 outputs a reconstructed image by receiving and decoding the bitstream. Here, the encoder 2610 may have a configuration similar to an image encoding apparatus 260 described later and the decoder 2650 may have a configuration similar to the image decoding apparatus 100.

In the encoder 2610, a prediction encoder 2615 outputs a reference image via inter prediction and intra prediction, and a transformer and quantizer 2620 quantizes residual data between the reference image and a current input image to a quantized transformation coefficient and outputs the quantized transformation coefficient. An entropy encoder 2625 encodes and converts the quantized transformation coefficient and outputs a bitstream. The quantized transformation coefficient is reconstructed to data of a spatial domain via an inverse quantizer and inverse transformer 2630, and the data of the spatial domain is output as the reconstructed image via a deblocking filtering unit 2635 and a loop filtering unit 2640. The reconstructed image may be used as a reference image of a next input image via the prediction encoder 2615.

The encoded image data among the bitstream received by the decoder 2650 is reconstructed to the residual image of the spatial domain via an entropy decoder 2655 and an inverse quantizer and inverse transformer 2660. The reference image and the residual data output from a prediction decoder 2675 are combined to form image data of the spatial domain, and a deblocking filtering unit 2665 and a loop filtering unit 2670 may perform filtering on the image data of the spatial domain to output a reconstructed image of a current original image. The reconstructed image may be used as a reference image of a next original image by the prediction decoder 2675.

The loop filtering unit 2640 of the encoder 2610 performs loop filtering by using filter information input according to a user input or system setting. The filter information used by the loop filtering unit 2640 is output to the entropy encoder 2610 and transmitted to the decoder 2650 together with the encoded image data. The loop filtering unit 2670 of the decoder 2650 may perform loop filtering based on the filter information input from the decoder 2650.

Figure 27:
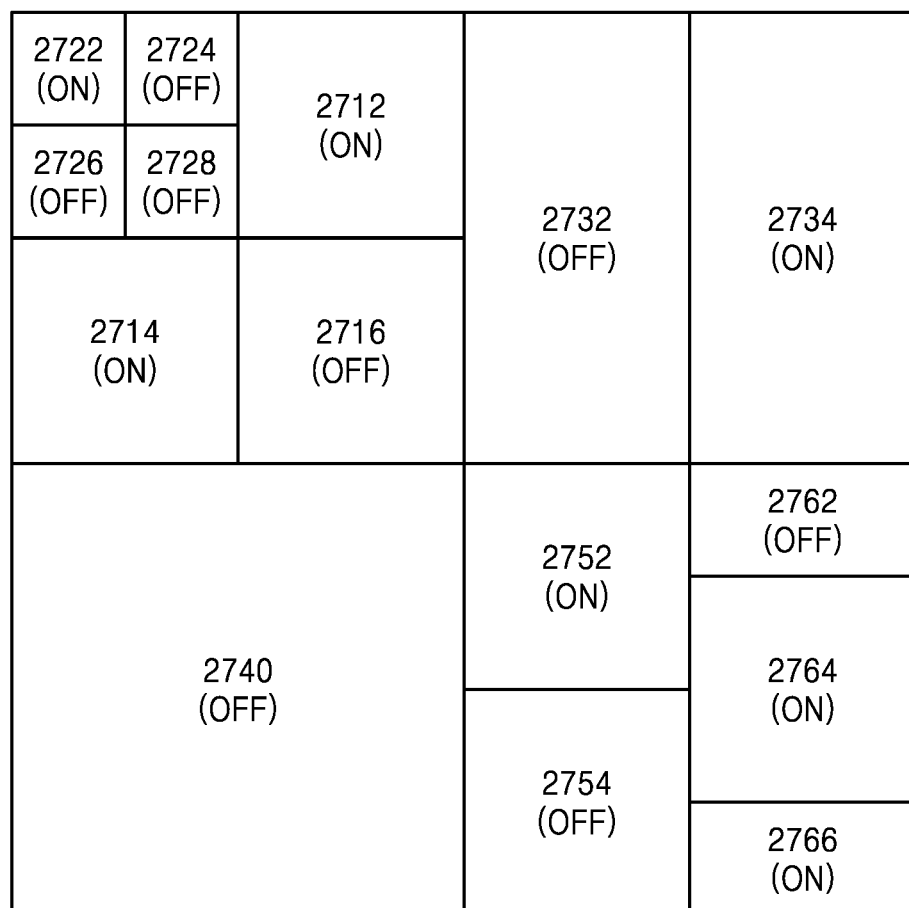
FIG. 27 is a diagram showing an example of filtering units included in a largest coding unit and filtering performance information of a filtering unit, according to an embodiment.

FIG. 27 is a diagram showing an example of filtering units included in a largest coding unit and filtering performance information of a filtering unit, according to an embodiment.

When filtering units of the loop filtering unit 2640 of the encoder 2610 and the loop filtering unit 2670 of the decoder 2650 are configured as data units similar to coding units according to an embodiment described above with reference to FIGS. 9 through 11, filter information may include block shape information and split shape information of a data unit for indicating a filtering unit, and loop filtering performance information indicating whether loop filtering is to be performed on a filtering unit.

Filtering units included in a largest coding unit 2700 according to an embodiment may have the same block shapes and split shapes as coding units included in the largest coding unit 2700. Also, the filtering units included in the largest coding unit 2700 according to an embodiment may be split based on sizes of the coding units included in the largest coding unit 2700. Referring to FIG. 27, for example, the filtering units may include a filtering unit 2740 having a square shape and a depth of D, filtering units 2732 and 2734 having a non-square shape and a depth of D, filtering units 2712, 2714, 2716, 2752, 2754, and 2764 having a square shape and a depth of D+1, filtering units 2762 and 2766 having a non-square shape and a depth of D+1, and filtering units 2722, 2724, 2726, and 2728 having a square shape and a depth of D+2.

The block shape information, the split shape information (depth), and the loop filtering performance information of the filtering units included in the largest coding unit 2700 may be encoded as shown in Table 1.

TABLE 1

| Depth | Block Shape Information | Loop Filtering Performance Information |
|---|---|---|
| D | 0: SQUARE | 0(2740) |
|  | 1: NS_VER | 0(2732), 1(2734) |
|  | 2: NS_HOR |  |
| D + 1 | 0: SQUARE | 1(2712), 1(2714), 0(2716), 1(2752), 0(2754), 1(2764) |
|  | 1: NS_VER |  |
|  | 2: NS_HOR | 0(2762), 1(2766) |
| D + 2 | 0: SQUARE | 1(2712), 0(2724), 0(2726), 0(2728) |
|  | 1: NS_VER |  |
|  | 2: NS_HOR |  |

Processes of determining a plurality of coding units when a coding unit is recursively split according to block shape information and block split information according to an embodiment have been described above through FIG. 19. Loop filtering performance information of filtering units according to an embodiment indicates that loop filtering is performed on the filtering units when a flag value is 1 and that loop filtering is not performed on the filtering units when a flag value is 0. Referring to Table 1, information of data units for determining filtering units to be filtered by the loop filtering units 2640 and 2670 may all be encoded and transmitted as filter information.

Because coding units configured according to an embodiment are coding units configured such as to minimize an error with an original image, it is expected to have a high spatial correlation in coding units. Accordingly, by determining a filtering unit based on a coding unit according to an embodiment, an operation of determining a filtering unit separately from determining of a coding unit may be omitted. Also, accordingly, by determining a filtering unit based on a coding unit according to an embodiment, information for determining a split shape of the filtering unit may be omitted, and thus a transmission bitrate of filter information may be saved.

In the above embodiments, it is described that a filtering unit is determined based on a coding unit according to an embodiment, but a filtering unit may be split based on a coding unit until an arbitrary depth, and thus a shape of a filtering unit may be determined up to only the arbitrary depth.

The determining of a filtering unit described in the above embodiments may be applied not only to loop filtering, but also to various embodiments, such as deblocking filtering and adaptive loop filtering.

According to an embodiment, the image decoding apparatus 100 may split a current coding unit by using at least one of block shape information or split shape information, wherein the block shape information may be pre-determined to indicate using only a square shape, and the split shape information may be pre-determined to indicate that the current coding unit is not split or split into four square coding units. In other words, coding units of the current coding unit may always have a square shape according to the block shape information, and the current coding unit may not be split or split into four square coding units based on the split shape information. The image decoding apparatus 100 may obtain, through the bitstream obtainer 110, a bitstream generated by using a certain coding unit that is pre-determined to only use such block shapes and split shapes, and the decoder 120 may use only the pre-determined block shapes and split shapes. In this case, the image decoding apparatus 100 may solve a compatibility problem with a certain encoding method by using a certain decoding method similar to the certain encoding method. According to an embodiment, when the image decoding apparatus 100 uses the certain decoding method using only the pre-determined block shapes and split shapes from among various shapes indicatable by the block shape information and the split shape information, the block shape information only indicates a square shape, and thus the image decoding apparatus 100 may not perform a process of obtaining the block shape information from the bitstream. Syntax indicating whether to use the certain decoding method may be used, and such syntax may be obtained from the bitstream according to data units having various shapes including a plurality of coding units, such as sequences, pictures, slice units, and largest coding units. In other words, the bitstream obtainer 110 may determine whether syntax indicating the block shape information is to be obtained from the bitstream based on syntax indicating whether the certain decoding method is used.

Figure 29:
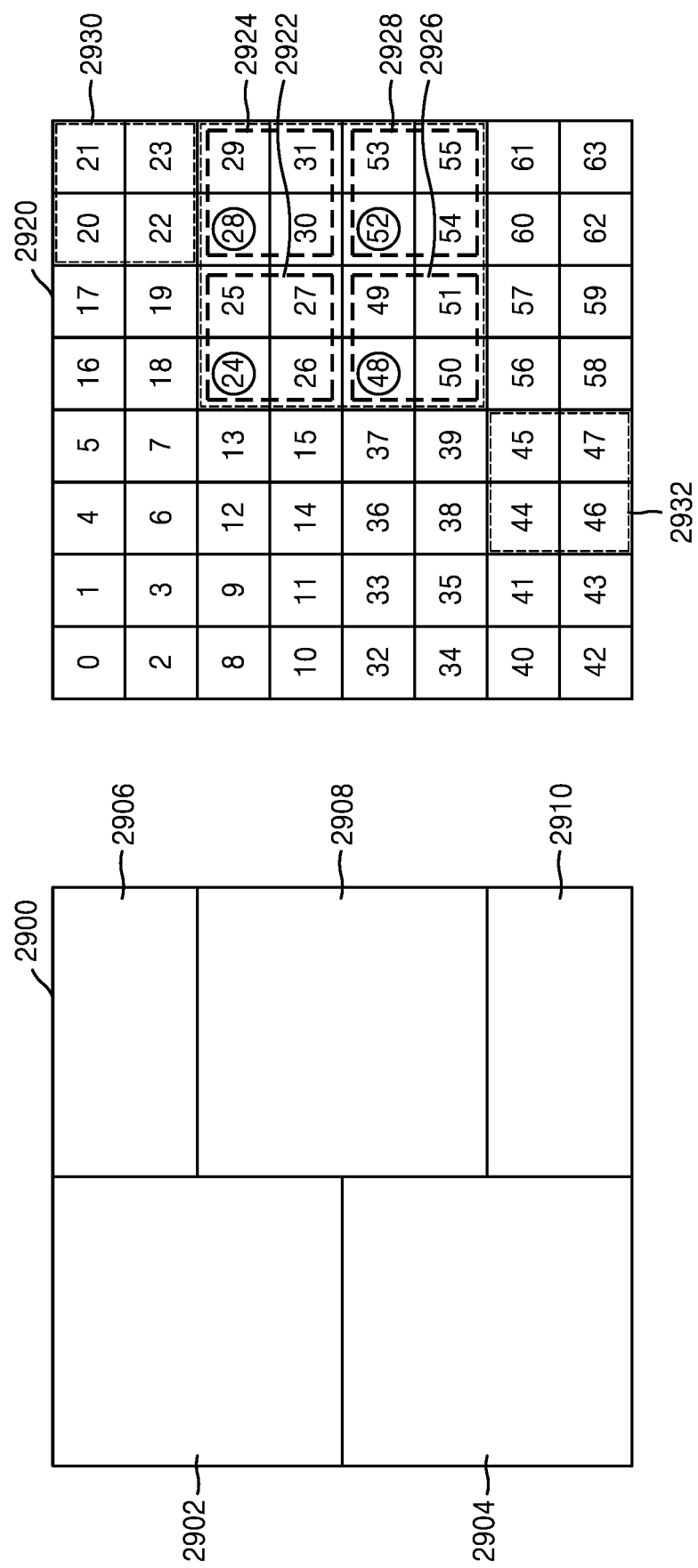
FIG. 29 illustrates an index according to a Z-scan order of coding units, according to an embodiment.

FIG. 29 illustrates an index according to a Z-scan order of coding units, according to an embodiment.

The image decoding apparatus 100 according to an embodiment may scan lower data units included in an upper data unit according to a Z-scan order. Also, the image decoding apparatus 100 according to an embodiment may sequentially access data according to an Z-scan index in a coding unit included in a largest coding unit or a processing block.

As described above with reference to FIGS. 9 and 10, the image decoding apparatus 100 according to an embodiment may split a reference coding unit into at least one coding unit. Here, the reference coding unit may include coding units having a square shape and coding units having a non-square shape. The image decoding apparatus 100 according to an embodiment may perform a data access according to a Z-scan index included in each coding unit in a reference coding unit. Here, a method of applying a Z-scan index may vary based on whether a coding unit having a non-square shape exists in the reference coding unit.

According to an embodiment, when a coding unit having a non-square shape does not exist in a reference coding unit, coding units of a lower depth in the reference coding unit may have continuous Z-scan indexes. For example, a coding unit of an upper depth may include four coding units of a lower depth, according to an embodiment. Here, boundaries of the four coding units of a lower depth, which are adjacent to each other, may be continuous, and the coding units of a lower depth may be scanned in a Z-scan order according to indexes indicating a Z-scan order. Indexes indicating a Z-scan order according to an embodiment may be set in numbers increasing according to the Z-scan order with respect to coding units. In this case, deeper coding units of the same depth may be scanned according to the Z-scan order.

According to an embodiment, when at least one coding unit having a non-square shape exists in a reference coding unit, the image decoding apparatus 100 may split each of the coding units in the reference coding unit into sub-blocks, and scan the sub-blocks according to a Z-scan order. For example, when a coding unit having a non-square shape in a vertical or horizontal direction exists in a reference coding unit, Z-scan may be performed by using sub-blocks that are split from the coding unit. Also, for example, when a reference coding unit is split into an odd number of coding units, Z-scan may be performed by using sub-blocks. A sub-block is a coding unit that is no longer split or a coding unit obtained by splitting an arbitrary coding unit, and may have a square shape. For example, four sub-blocks having a square shape may be split from a coding unit having a square shape. Also, for example, two sub-blocks having a square shape may be split from a coding unit having a non-square shape.

Referring to FIG. 29, for example, the image decoding apparatus 100 according to an embodiment may scan coding units 2902, 2904, 2906, 2908, and 2910 of a lower depth in a coding unit 2900, according to a Z-scan order. The coding unit 2900 and the coding units 2902 through 2910 are relatively an upper coding unit and lower coding units. The coding unit 2900 includes the coding units 2906 and 2910 having a non-square shape in a horizontal direction. The coding units 2906 and 2910 having a non-square shape have discontinuous boundaries with the coding units 2902 and 2904 having a square shape. Also, the coding unit 2908 has a square shape and is a coding unit located at the center when a coding unit having a non-square shape is split into an odd number of coding units. Like the coding units 2906 and 2910 having a non-square shape, the coding unit 2908 has discontinuous boundaries with the adjacent coding units 2902 and 2904 having a square shape. When the coding unit 2900 includes the coding units 2906 and 2910 having a non-square shape or includes the coding unit 2908 located at the center when a coding unit having a non-square shape is split into an odd number of coding units, adjacent boundaries between coding units are discontinuous and thus continuous Z-scan indexes are unable to be set. Accordingly, the image decoding apparatus 100 may continuously set Z-scan indexes by splitting coding units into sub-blocks. Also, the image decoding apparatus 100 may perform continuous Z-scan on the coding units 2906 and 2910 having a non-square shape or the coding unit 2908 located at the center of an odd number of coding units having a non-square shape.

A coding unit 2920 shown in FIG. 29 is obtained by splitting the coding units 2902 through 2910 in the coding unit 2900 into sub-blocks. A Z-scan index may be set for each of the sub-blocks, and because adjacent boundaries between the sub-blocks are continuous, the sub-blocks may be scanned according to a Z-scan order. For example, in a decoding apparatus according to an embodiment, the coding unit 2908 may be split into sub-blocks 2922, 2924, 2926, and 2928. Here, the sub-blocks 2922 and 2924 may be scanned after a data process is performed on a sub-block 2930, and the sub-blocks 2926 and 2928 may be scanned after a data process is performed on a sub-block 2932. Also, sub-blocks may be scanned according to a Z-scan order.

In the above embodiments, data units may be scanned according to a Z-scan order for data storage, data loading, data accessing, etc.

Also, in the above embodiments, data units are scanned according to a Z-scan order, but a scan order of data units may vary, for example, a rater scan order, an N-scan order, an up-right diagonal scan order, a horizontal scan order, and a vertical scan order, and thus is not limited to the Z-scan order.

Also, in the above embodiments, coding units in a reference coding unit are scanned, but an embodiment is not limited thereto, and a target to be scanned may be an arbitrary block in a largest coding unit or a processing block.

Also, in the above embodiments, scanning is performed according to a Z-scan order by splitting a block into sub-blocks only when at least one block having a non-square shape exists, but for a simplified embodiment, scanning may be performed according to a Z-scan order by splitting a block into sub-blocks even when a block having a non-square shape does not exist.

The image decoding apparatus 100 according to an embodiment may generate prediction data by performing inter prediction or intra prediction on a coding unit, generate residual data by performing inverse transformation on a transformation unit included in a current coding unit, and reconstruct the current coding unit by using the generated prediction data and residual data.

A prediction mode of a coding unit according to an embodiment may be at least one of an intra mode, an inter mode, and a skip mode. According to an embodiment, a prediction mode may be independently selected according to coding units.

When a coding unit having a 2N×2N shape according to an embodiment is split into two coding units having a 2N×N shape or N×2N shape, inter mode prediction and intra mode prediction may be individually performed for each coding unit. Also, a skip mode may be applied to the coding units having a 2N×N shape or N×2N shape according to an embodiment.

Meanwhile, the image decoding apparatus 100 according to an embodiment may allow performing of bi-prediction in a skip mode of a coding unit having a 8×4 shape or 4×8 shape. In a skip mode, using of residual data with respect to a coding unit is omitted because only skip mode information is received with respect to the coding unit. Accordingly, in this case, an overhead of inverse quantization and inverse transformation may be saved. Instead, the image decoding apparatus 100 according to an embodiment may allow bi-prediction with respect to a coding unit to which a skip mode is applied, so as to increase decoding efficiency. Also, the image decoding apparatus 100 according to an embodiment may allow bi-prediction with respect to a coding unit having a 8×4 or 4×8 shape while setting an interpolation tap number to be relatively low during motion compensation, thereby efficiently using a memory bandwidth. For example, an interpolation filter having a tap number lower than 8 (for example, a 2-tap Interpolation filter) may be used instead of an 8-tap interpolation filter.

Also, the image decoding apparatus 100 according to an embodiment may signal intra or inter prediction information for each region included in a current coding unit by splitting the region in a pre-set shape (for example, diagonal-based split).

The image decoding apparatus 100 according to an embodiment may obtain a prediction sample of a current coding unit using an intra mode, by using adjacent samples of the current coding unit. Here, intra prediction is performed by using adjacent samples that are pre-reconstructed, and such adjacent samples are referred to as reference samples.

Figure 30:
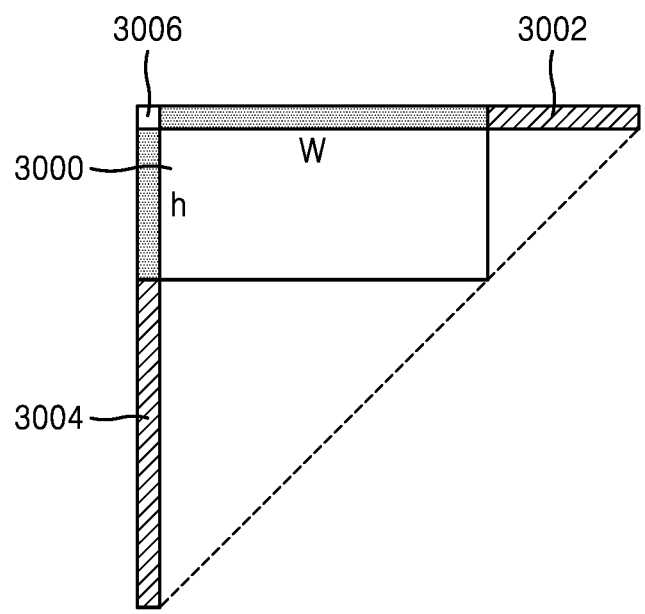
FIG. 30 is a diagram showing a reference sample for intra prediction of a coding unit, according to an embodiment.

FIG. 30 is a diagram showing a reference sample for intra prediction of a coding unit, according to an embodiment. Referring to FIG. 30, with respect to a current coding unit 3000 which has a block shape of a non-square shape, a length of w in a horizontal direction, and a length of h in a vertical direction, w+h upper reference samples 3002, w+h left reference samples 3004, and one upper left reference sample 3006 are required, i.e., the total number of 2(w+h)+1 reference samples are required. In order to prepare a reference sample, padding is performed on a region where a reference sample does not exist, and a reference sample filtering process may be performed according to prediction mode so as to reduce a quantization error included in a reconstructed reference sample.

In the above embodiments, the number of reference samples when a current coding unit has a non-square shape has been described, and the number of reference samples is equally applied when a current coding unit has a square shape.

Operations related to an image decoding method performed by the image decoding apparatus 100 have been described above in the various embodiments hereinabove. Hereinafter, operations of the image encoding apparatus 200 performing an image encoding method, which are reverse processes of the image decoding method, will be described through various embodiments.

According to an embodiment, the encoder 220 may determine at least one coding unit for splitting an image and the bitstream generator 210 may generate a bitstream including certain information such as split shape information and block shape information during processes of determining at least one coding unit. The encoder 220 for encoding the image by using the certain information may be included. According to an embodiment, the encoder 220 of the image encoding apparatus 200 may determine at least one coding unit for splitting an image based on at least one of block shape information or split shape information, and the bitstream generator 210 of the image encoding apparatus 200 may generate a bitstream including at least one of the block shape information or the split shape information. Here, the block shape information may indicate information or syntax indicating a shape of a coding unit, and the split shape information may indicate information or syntax indicating shapes into which a coding unit is split.

According to an embodiment, the encoder 220 of the image encoding apparatus 200 may determine a shape of a coding unit. For example, the coding unit may have a square shape or a non-square shape, and information indicating such a shape may be included in the block shape information.

According to an embodiment, the encoder 220 may determine shapes for splitting a coding unit. The encoder 220 may determine a shape of at least one coding unit included in a coding unit, and the bitstream generator 210 may generate a bitstream including the split shape information including information about such a shape of the coding unit.

According to an embodiment, the encoder 220 may determine whether a coding unit is split or not. When the encoder 220 determines that a coding unit includes only one coding unit or that a coding unit is not split, the bitstream generator 210 may generate a bitstream including split shape information indicating that the coding unit is not to be split. Also, the encoder 220 may split a coding unit into a plurality of coding units, and the bitstream generator 210 may generate a bitstream including split shape information indicating that the coding unit is to be split into the plurality of coding units.

According to an embodiment, information indicating the number of coding units obtained by splitting a coding unit or indicating a direction of splitting the coding unit may be included in split shape information. For example, the split shape information may indicate at least one of a horizontal direction or a vertical direction for splitting a coding unit or indicate that a coding unit is not split.

FIG. 9 illustrates processes of the image encoding apparatus 200 determining at least one coding unit by splitting a current coding unit, according to an embodiment.

According to an embodiment, the encoder 220 may determine a shape of a coding unit. For example, the encoder 220 may determine a shape of a coding unit having an optimum rate distortion (RD)-cost in consideration of RS costs.

According to an embodiment, the encoder 220 may determine that a current coding unit has a square shape, and may determine shapes into which a coding unit having a square shape is split accordingly. For example, the encoder 220 may determine whether to split a coding unit having a square shape or not, whether to split the coding unit in a vertical direction, whether to split the coding unit in a horizontal direction, or whether to split the coding unit into four coding units. Referring to FIG. 9, the encoder 220 may determine not to split the coding unit 910*a* having the same size as the current coding unit 900, or to split the current coding unit 900 into the coding units 910*b* through 910*d* based on split shape information indicating a certain split method.

Referring to FIG. 9, the encoder 220 may determine the two coding units 910*b* by splitting the current coding unit 900 in the vertical direction, according to an embodiment. The encoder 220 may determine the two coding units 910*c* by splitting the current coding unit 900 in the horizontal direction. The encoder 220 may determine the four coding units 910*d* by splitting the current coding unit 900 in the vertical and horizontal directions. However, split shapes into which a coding unit having a square shape is splittable are not limitedly interpreted to above shapes, and may include various shapes indicatable by split shape information. Certain split shapes into which a square coding unit is splittable will be described below in detail through various embodiments.

According to an embodiment, the bitstream generator 210 of the image encoding apparatus 200 may generate a bitstream including split shape information indicating shapes of the current coding unit 900 split by the encoder 220.

FIG. 10 illustrates processes of the image encoding apparatus 200 determining at least one coding unit by splitting a coding unit of a non-square shape, according to an embodiment.

According to an embodiment, the encoder 220 may determine whether not to split a current coding unit having a non-square shape, or whether to split the current coding unit by using a certain method. Referring to FIG. 10, the encoder 220 may determine not split the coding unit 1010 or 1060 having the same size as the current coding unit 1000 or 1050, or may determine the coding units 1020*a*, 1020*b*, 1030*a*, 1030*b*, 1030*c*, 1070*a*, 1070*b*, 1080*a*, 1080*b*, and 1080*c* according to a certain split method. The bitstream generator 210 of the image encoding apparatus 200 may generate a bitstream including split shape information indicating such split shapes. A certain split method of splitting a coding unit having a non-square shape will now be described in detail through various embodiments.

According to an embodiment, the encoder 220 may determine shapes into which a coding unit is split. Referring to FIG. 10, the encoder 220 may split the current coding unit 1000 or 1050 to determine the two coding units 1020*a* and 1020*b*, or 1070*a* and 1070*b*, and the bitstream generator 210 may generate a bitstream including split shape information indicating such split shapes.

According to an embodiment, when the encoder 220 splits the current coding unit 1000 or 1050 having a non-square shape, the current coding unit may be split in consideration of a location of a longer side of the current coding unit 1000 or 1050 having a non-square shape. For example, the encoder 220 may determine a plurality of coding units by splitting the longer side of the current coding unit 1000 or 1050 in consideration of a shape of the current coding unit 1000 or 1050, and the bitstream generator 210 may generate a bitstream including split shape information indicating such split shapes.

According to an embodiment, the encoder 220 may determine an odd number of coding units included in the current coding unit 1000 or 1050. For example, the encoder 220 may split the current coding unit 1000 or 1050 into the three coding units 1030*a* through 1030*c* or 1080*a* through 1080*c*. According to an embodiment, the encoder 220 may determine the odd number of coding units included in the current coding unit 1000 or 1050, wherein sizes of the coding units may not be the same. For example, the size of the certain coding unit 1030b or 1080b of the odd number of coding units 1030a through 1030c or 1080a through 1080c may be different from the sizes of the coding units 1030a and 1030c, or 1080a and 1080c. In other words, coding units determined by splitting the current coding unit 1000 or 1050 may have a plurality of types of sizes, and in some cases, the odd number of coding units 1030a through 1030c or 1080a through 1080c may have different sizes.

According to an embodiment, the encoder 220 may determine an odd number of coding units included in the current coding unit 1000 or 1050, and further, may set a certain limitation on at least one coding unit from among the odd number of coding units. Referring to FIG. 10, the encoder 220 may set a decoding process of the coding unit 1030b or 1080b located at the center of the three coding units 1030a through 1030c or 1080a through 1080c generated by splitting the current coding unit 1000 or 1050 to be different from those of the coding units 1030a and 1030c, or 1080a and 1080c. For example, the encoder 220 may limit the coding unit 1030b or 1080b located at the center to be no longer split unlike the coding units 1030a and 1030c, or 1080a and 1080c, or to be split only a certain number of times.

FIG. 11 illustrates processes of the image encoding apparatus 200 splitting a coding unit, according to an embodiment.

According to an embodiment, the encoder 220 may determine whether to split the first coding unit 1100 having a square shape into coding units or not. According to an embodiment, the encoder 220 may determine the second coding unit 1110 by splitting the first coding unit 1100 in a horizontal direction, and a first coding unit, a second coding unit, and a third coding unit used according to an embodiment are terms used to understand split relationships between coding units. For example, a second coding unit may be determined when a first coding unit is split, and a third coding unit may be determined when a second coding unit is split. Relationships of first through third coding units used hereinafter may be understood to follow above characteristics.

According to an embodiment, the image encoding apparatus 200 may determine whether to split the second coding unit 1110 into coding units based on at least one of block shape information or split shape information. Referring to FIG. 11, the encoder 220 may split the second coding unit 1110 having a non-square shape and determined by splitting the first coding unit 1100 into the at least one third coding unit 1120a, 1120b through 1120d, or the like, or may not split the second coding unit 1110 based on at least one of block shape information or split shape information. The bitstream generator 210 of the image encoding apparatus 200 may generate a bitstream including at least one of block shape information or split shape information, and the encoder 220 may determine a plurality of second coding units (for example, the second coding unit 1110) having various shapes by splitting the first coding unit 1100 based on at least one of block shape information or split shape information, wherein the second coding unit 1110 may be split according to a method of splitting the first coding unit 1100 based on at least one of block shape information or split shape information. According to an embodiment, when the first coding unit 1100 is split into the second coding unit 1110 based on at least one of block shape information or split shape information about the first coding unit 1100, the second coding unit 1110 may also be split into at least one third coding unit (for example, the third coding unit 1120a, 1120b, 1120c, or 1120d) based on at least one of block shape information or split shape information about the second coding unit 1110. Accordingly, a square coding unit may be determined from a coding unit having a non-square shape, and a coding unit having a non-square shape may be determined when such a coding unit having a square shape is recursively split. Referring to FIG. 11, a certain coding unit (for example, a coding unit located at the center or a coding unit having a square shape) from among the odd number of third coding units 1120b through 1120d determined when the second coding unit 1110 having a non-square shape is split may be recursively split. According to an embodiment, the third coding unit 1120c having a square shape, which is one of the odd number of third coding units 1120b through 1120d, may be split in the horizontal direction into a plurality of fourth coding units. The fourth coding unit 1140 having a non-square shape, which is one of the plurality of fourth coding units, may be split into a plurality of coding units again. For example, the fourth coding unit 1140 having a non-square shape may be split into an odd number of coding units 1150a through 1150c again.

A coding unit may be recursively split based on at least one of split shape information or block shape information related to each coding unit. A method used to recursively split a coding unit may be described below through various embodiments.

According to an embodiment, the encoder 220 may determine to split each of the third coding units 1120a through 1120d, or the like into coding units or not to split the second coding unit 1110 based on at least one of block shape information or split shape information. The encoder 220 may split the second coding unit 1110 having a non-square shape into the odd number of third coding units 1120b through 1120d, according to an embodiment. The image encoding apparatus 200 may set a certain limitation on a certain third coding unit from among the odd number of third coding units 1120b through 1120d. For example, the image encoding apparatus 200 may limit the coding unit 1120c located at the center of the odd number of third coding units 1120b through 1120d to be no longer split or to be split a settable number of times. Referring to FIG. 11, the image encoding apparatus 200 may limit the coding unit 1120c located at the center of the odd number of third coding units 1120b through 1120d included in the second coding unit 1110 having a non-square shape to be no longer split, to be split in a certain split shape (for example, split into only four coding units or into a shape corresponding to a shape of splitting the second coding unit 1110), or to be split only a certain number of times (for example, split only n times, wherein n>0). However, the limitation on the coding unit 1120c located at the center is only a simple embodiment, and thus should not be limitedly interpreted to the above embodiments, and may include various limitations for decoding the coding unit 1120c located at the center differently from the coding units 1120b and 1120d.

According to an embodiment, the bitstream generator 210 of the image encoding apparatus 200 may generate a bitstream including at least one of block shape information and split shape information used to split a current coding unit, together with a bitstream related to a sample at a certain location in the current coding unit.

FIG. 12 illustrates a method of determining, by the encoder 220, a certain coding unit from among an odd number of coding units, according to an embodiment. The encoder 220 of the image encoding apparatus 200 may determine to split a current coding unit into coding units having various shapes and sizes, or not to split the current coding unit. Referring to FIG. 12, the bitstream generator 210 may generate a bitstream including at least one of block shape information or split shape information of the current coding unit 1200, together with a bitstream related to a sample located at a certain location from among a plurality of samples included in the current coding unit 1200 (for example, the sample 1240 located at the center). However, the certain location in the current coding unit 1200 related to at least one of the block shape information or the split shape information should not be limitedly interpreted to the center shown in FIG. 12, and the certain location may be interpreted to include various locations included in the current coding unit 1200 (for example, uppermost, lowermost, left, right, upper left, lower left, upper right, and lower right locations).

According to an embodiment, the image encoding apparatus 200 may select one coding unit when a current coding unit is split into a certain number of coding units. A method of selecting one of a plurality of coding units may vary, and such a method will be described below through various embodiments.

According to an embodiment, the encoder 220 of the image encoding apparatus 200 may split a current coding unit into a plurality of coding units, and determine a coding unit at a certain location.

FIG. 12 illustrates a method of determining, by the image encoding apparatus 200, a coding unit at a certain location from an odd number of coding units, according to an embodiment.

According to an embodiment, the encoder 220 may use information indicating a location of each of the odd number of coding units so as to determine a coding unit located at the center from among the odd number of coding units. Referring to FIG. 12, the encoder 220 may determine the odd number of coding units 1220a through 1220c by splitting the current coding unit 1200. The encoder 220 may determine the coding unit 1220b at the center by using information about locations of the odd number of coding units 1220a through 1220c. For example, the encoder 220 may determine the coding unit 1220b located at the center by determining locations of the coding units 1220a through 1220c based on information indicating a location of a certain sample included in the coding units 1220a through 1220c. In detail, the encoder 220 may determine the coding unit 1220b located at the center by determining the locations of the coding units 1220a through 1220c based on information indicating locations of the upper left samples 1230a through 1240c of the coding units 1220a through 1220c.

According to an embodiment, the information indicating the locations of the upper left samples 1230a through 1240c respectively included in the coding units 1220a through 1220c may include information about locations or coordinates in a picture of the coding units 1220a through 1220c. According to an embodiment, the information indicating the locations of the upper left samples 1230a through 1230c respectively included in the coding units 1220a through 1220c may include information indicating widths or heights of the coding units 1220a through 1220c included in the current coding unit 1200, and the widths or heights may correspond to information indicating differences between coordinates in the picture of the coding units 1220a through 1220c. In other words, the image encoding apparatus 200 may directly use the information about locations or coordinates in the picture of the coding units 1220a through 1220c, or may use the information about widths or heights of the coding units, which indicates the difference values between the coordinates, so as to determine the coding unit 1220b located at the center.

According to an embodiment, the information indicating the location of the upper left sample 1230a of the top coding unit 1220a may indicate (xa, ya) coordinates, the information indicating the location of the upper left sample 1230b of the center coding unit 1220b may indicate (xb, yb) coordinates, and the information indicating the location of the upper left sample 1230c of the bottom coding unit 1220c may indicate (xc, yc) coordinates. The image encoding apparatus 200 may determine the center coding unit 1220b by using the coordinates of the upper left samples 1230a through 1230c respectively included in the coding units 1220a through 1220c. For example, when the coordinates of the upper left samples 1230a through 1230c are aligned in an ascending order or descending order, the coding unit 1220b including (xb, yb) that is coordinates of the upper left sample 1230b may be determined as a coding unit located at the center from among the coding units 1220a through 1220c determined when the current coding unit 1200 is split. Here, the coordinates indicating the locations of the upper left samples 1230a through 1230c may indicate coordinates indicating absolute locations in the picture, and further, may use (dxb, dyb) coordinates that are information indicating a relative location of the upper left sample 1230b of the center coding unit 1220b and (dxc, dyc) coordinates that are information indicating a relative location of the upper left sample 630c of the bottom coding unit 1220c, based on the location of the upper left sample 1230c of the top coding unit 1220a. Also, a method of determining a coding unit at a certain location by using coordinates of a sample included in a coding unit as information indicating a location of the sample should not be limitedly interpreted to the above method, and may be interpreted to various arithmetic methods capable of using coordinates of a sample.

According to an embodiment, the image encoding apparatus 200 may split the current coding unit 1200 into the plurality of coding units 1220a through 1220c, and select a coding unit from among the coding units 1220a through 1220c according to a certain criterion. For example, the encoder 220 may select the coding unit 1220b that has a different size from among the coding units 1220a through 1220c.

According to an embodiment, the image encoding apparatus 200 may determine the width or height of each of the coding units 1220a through 1220c by using the (xa, ya) coordinates that are the information indicating the location of the upper left sample 1230a of the top coding unit 1220a, the (xb, yb) coordinates that are the information indicating the location of the upper left sample 1230b of the center coding unit 1220b, and the (xc, yc) coordinates that are the information indicating the location of the upper left sample 1230c of the bottom coding unit 1220c. The image encoding apparatus 200 may determine a size of each of the coding units 1220a through 1220c by using the coordinates (xa, ya), (xb, yb), and (xc, yc) indicating the locations of the coding units 1220a through 1220c.

According to an embodiment, the image encoding apparatus 200 may determine the width of the top coding unit 1220a to xb-xa and the height to yb-ya. According to an embodiment, the encoder 220 may determine the width of the center coding unit 1220b to xc-xb and the height to yc-yb. According to an embodiment, the encoder 220 may determine the width or height of the bottom coding unit by using the width or height of the current coding unit, and the width and height of the top coding unit 1220a and the center coding unit 1220*b*. The encoder 220 may determine one coding unit having a size different from other coding units based on the determined widths and heights of the coding units 1220*a* through 1220*c*. Referring to FIG. 12, the image encoding apparatus 200 may determine, as the coding unit at the certain location, the center coding unit 1220*b* having a size different from sizes of the top coding unit 1220*a* and the bottom coding unit 1220*c*. However, because a process of determining, by the image encoding apparatus 200, a coding unit having a size different from other coding units is only an embodiment of determining a coding unit at a certain location by using sizes of coding units determined based on sample coordinates, various processes of determining a coding unit at a certain location by comparing sizes of coding units determined according to certain sample coordinates may be used.

However, a location of a sample considered to determine a location of a coding unit should not be limitedly interpreted to the upper left, but may be interpreted that information about a location of an arbitrary sample included in a coding unit is usable.

According to an embodiment, the image encoding apparatus 200 may select a coding unit at a certain location from among an odd number of coding units that are determined when a current coding unit is split, in consideration of a shape of the current coding unit. For example, when the current coding unit has a non-square shape in which a width is longer than a height, the encoder 220 may determine the coding unit at the certain location along a horizontal direction. In other words, the encoder 220 may determine a coding unit from among coding units having different locations in the horizontal direction, and set a limitation on the coding unit. When the current coding unit has the non-square shape in which the height is longer than the width, the encoder 220 may determine the coding unit at the certain location along a vertical direction. In other words, the encoder 220 may determine a coding unit from among coding units having different locations in the vertical direction, and set a limitation on the coding unit.

According to an embodiment, the image encoding apparatus 200 may use information indicating a location of each of an even number of coding units in order to determine a coding unit at a certain location from among the even number of coding units. The encoder 220 may determine the even number of coding units by splitting a current coding unit, and determine the coding unit at the certain location by using the information about the locations of the even number of coding units. Detailed processes thereof may be similar to processes of determining a coding unit at a certain location (for example, a center location) from among an odd number of coding units, which have been described above with reference to FIG. 12, and thus descriptions thereof are not provided again.

According to an embodiment, when a current coding unit having a non-square shape is split into a plurality of coding units, certain information used while splitting the current coding unit may be used in order to determine a coding unit at a certain location from among the plurality of coding units. For example, the encoder 220 of the image encoding apparatus 200 may use, as the certain information used while splitting the current coding unit, at least one of block shape information or split shape information in order to determine the coding unit located at the center from among the plurality of coding units obtained by splitting a current coding unit.

Referring to FIG. 12, the encoder 220 of the image encoding apparatus 200 may split the current coding unit 1200 into the plurality of coding units 1220*a* through 1220*c* and determine the coding unit 1220*b* located at the center from among the plurality of coding units 1220*a* through 1220*c*, and the bitstream generator 210 may generate a bitstream including at least one of block shape information or split shape information used while splitting the current coding unit 1200. The encoder 220 may determine the coding unit 1220*b* located at the center in consideration of a location of a sample related to the bitstream including at least one of the block shape information or the split shape information used while splitting the current coding unit 1200. In other words, the bitstream including at least one of the block shape information or the split shape information of the current coding unit 1200 may be generated together with a bitstream related to the sample 1240 located at the center of the current coding unit 1200, and at this time, the encoder 220 may determine the coding unit 1220*b* including the sample 1240 as a coding unit located at the center from among the plurality of coding units 1220*a* through 1220*c*. However, information used to determine a coding unit located at the center from among a plurality of coding units obtained by splitting a current coding unit should not be limitedly interpreted to at least one of block shape information or split shape information used while splitting the current coding unit, and various types of information may be used. In this regard, processes of determining, by the image encoding apparatus 200, a coding unit at a certain location may be reverse processes of those of determining, by the image decoding apparatus 100, a coding unit at a certain location from among a plurality of coding units determined from a current coding unit, and thus detailed descriptions thereof are not provided again.

According to an embodiment, the image encoding apparatus 200 may determine at least one coding unit by splitting a current coding unit, and determine an order of decoding the at least one coding unit according to a certain block 9 for example, the current coding unit).

FIG. 13 illustrates an order of processing a plurality of coding units when the image encoding apparatus 200 determines the plurality of coding units by splitting a current coding unit, according to an embodiment. Because processes of processing, by the image encoding apparatus 200, the plurality of coding units in FIG. 13 may be similar to operations of the image decoding apparatus 100 described above with reference to FIG. 13, detailed descriptions thereof are not provided again.

FIG. 14 illustrates processes of determining, by the image encoding apparatus 200, that a current coding unit is split into an odd number of coding units when coding units are unable to be processed in a certain order, according to an embodiment.

According to an embodiment, the encoder 220 of the image encoding apparatus 200 may determine to split a current coding unit into an odd number, and the bitstream generator 210 may generate a bitstream including block shape information indicating a shape of the current coding unit and split shape information indicating a split shape (split into an odd number) of the current coding unit. Referring to FIG. 14, the first coding unit 1400 having a square shape may be split into the second coding units 1410*a* and 1410*b* having a non-square shape, and the second coding units 1410*a* and 1410*b* may be independently split into the third coding units 1420*a* through 1420*e*. According to an embodiment, the encoder 220 may determine the plurality of coding units 1420*a* and 1420*b* by splitting, in a horizontal direction, the left coding unit 1410*a* from among second coding units, and split the right coding unit 1410*b* into the odd number of third coding units 1420c through 1420e. Processes of determining, by the image encoding apparatus 200, that a current coding unit is split into an odd number of coding units in FIG. 14 maybe opposite processes of operations of the image decoding apparatus 100 described above with reference to FIG. 14, detailed descriptions thereof are not provided.

FIG. 15 illustrates processes of determining at least one coding unit when the image encoding apparatus 200 splits the first coding unit 1500, according to an embodiment. According to an embodiment, the encoder 220 may split the first coding unit 1500, and the bitstream generator 210 may generate a bitstream including at least one of block shape information indicating a shape of the first coding unit or split shape information indicating a shape into which the first coding unit 1500 is split. The first coding unit 1500 having a square shape may be split into four coding units having a square shape or a plurality of coding units having a non-square shape. For example, referring to FIG. 15, the encoder 220 may split the first coding unit 1500 into a plurality of coding units having a non-square shape, and in this case, the bitstream generator 210 may generate a bitstream including block shape information indicating that the first coding unit 1500 is a square and split shape information indicating that the first coding unit 1500 is to be split into coding units having a non-square shape. In detail, the encoder 220 may split the first coding unit 1500 having a square shape into an odd number of coding units, i.e., the second coding units 1510a through 1510c determined in a vertical direction or the second coding units 1520a through 1520c determined in a horizontal direction, and in this case, the bitstream generator 210 may generate a bitstream including split shape information indicating that the first coding unit 1500 is to be split in the horizontal or vertical direction to determine the odd number of coding units. Processes of determining, by the image encoding apparatus 200, at least one coding unit by splitting the first coding unit 1500 in FIG. 15 are opposite processes of operations of the image decoding apparatus 100 described above with reference to FIG. 15, and thus detailed descriptions thereof are not provided again.

FIG. 16 illustrates that a shape of a second coding unit that is splittable is limited by the image encoding apparatus 200 when the second coding unit having a non-square shape, which is determined when the first coding unit 1600 is split, satisfies a certain condition, according to an embodiment.

According to an embodiment, the encoder 220 may determine to split the first coding unit 1600 having a square shape into the second coding units 1610a and 1610b, or 1620a and 1620b having a non-square shape. The second coding units 1610a and 1610b, or 1620a and 1620b may be independently split. Accordingly, the encoder 220 may determine to split the second coding units 1610a and 1610b, or 1620a and 1620b into a plurality of coding units or not to split the second coding units 1610a and 1610b, or 1620a and 1620b. Operations of limiting, by the image encoding apparatus 200, a shape of a second coding unit having a non-square shape that is splittable when the second coding unit satisfies a certain condition are opposite to operations of the image decoding apparatus 100 described above with reference to FIG. 16, detailed descriptions thereof are not provided again.

FIG. 17 illustrates processes of splitting, by the image encoding apparatus 200, a coding unit having a square shape when split shape information does not indicate splitting of the coding unit into four coding units having square shapes, according to an embodiment. In this regard, operations of the image encoding apparatus 200 may be opposite to operations of the image decoding apparatus 100 described above with reference to FIG. 17, and thus detailed descriptions thereof are not provided again.

FIG. 18 illustrates that a processing order between a plurality of coding units may be changed according to a split process of a coding unit, according to an embodiment.

According to an embodiment, the encoder 220 may split the first coding unit 1800 having a square shape in at least one of a horizontal direction or a vertical direction. According to an embodiment, the bitstream generator 210 may generate a bitstream including block shape information indicating that the first coding unit 1800 has a square shape and split shape information indicating that the first coding unit 1800 is to be split in at least one of the horizontal or vertical directions.

According to an embodiment, the encoder 220 may determine second coding units (for example, the second coding units 1810a, 1810b, 1820a, 1820b, 1830a, 1830b, 1830c, 1830d, or the like) by splitting the first coding unit 1800. Referring to FIG. 18, the second coding units 1810a and 1810b, or 1820a and 1820b having a non-square shape and determined when the first coding unit 1800 is split only in a horizontal or vertical direction may be independently split. For example, the encoder 220 may determine the third coding units 1816a through 1816d by splitting, in a horizontal direction, each of the second coding units 1810a and 1810b that are generated by splitting the first coding unit 1800 in a vertical direction, or may determine the third coding units 1826a through 1826d by splitting, in a horizontal direction, each of the second coding units 1820a and 1820b that are generated by splitting the first coding unit 1800 in a horizontal direction. Operations of the image encoding apparatus 200 related to FIG. 16 are opposite to operations of the image decoding apparatus 100 described above with reference to FIG. 16, detailed descriptions thereof are not provided again.

FIG. 19 illustrates processes of determining a depth of a coding unit as a shape and size of the coding unit are changed, when a plurality of coding units are determined when the coding unit is recursively split, according to an embodiment. Because operations of the encoder 220 of the image encoding apparatus 200 determining a depth of a coding unit may be opposite to processes of the decoder 120 of the image decoding apparatus 100 determining a depth of a coding unit described above with reference to FIG. 19, details thereof are not provided again.

According to an embodiment, the image encoding apparatus 200 may determine whether a plurality of coding units determined when a current coding unit is split have certain split shapes based on values of PIDs for distinguishing the coding units. Referring to FIG. 20, the image encoding apparatus 200 may determine the even number of coding units 2012a and 2012b or the odd number of coding units 2014a through 2014c by splitting the first coding unit 2010 having a rectangular shape in which a height is longer than a width. The image encoding apparatus 200 may use a PID indicating each coding unit so as to distinguish each of a plurality of coding units. According to an embodiment, a PID may be obtained from a sample at a certain location of each coding unit (for example, an upper left sample). Because operations of the image encoding apparatus 200 related to FIG. 20 may be opposite to operations of the image decoding apparatus 100 described above with reference to FIG. 20, detailed descriptions thereof may not be provided again.

FIG. 21 illustrates that a plurality of coding units are determined according to a plurality of certain data units included in a picture, according to an embodiment. According to an embodiment, the encoder 220 may use the reference coding unit described above as a certain data unit from which a coding unit starts to be recursively split. Because operations of the image encoding apparatus 200 using a reference coding unit in FIG. 21 may be opposite to operations of the image decoding apparatus 100 using a reference coding unit described above with reference to FIG. 21, details thereof may not be provided again.

According to an embodiment, the bitstream generator 210 of the image encoding apparatus 200 may generate, according to the various data units, a bitstream including at least one of information about a shape of a reference coding unit or information about a size of a reference coding unit. Processes of determining at least one coding unit included in the reference coding unit 2100 having a square shape have been described above through processes of splitting the current coding unit 300 of FIG. 9, and processes of determining at least one coding unit included in the reference coding unit 2100 having a non-square shape have been described above through processes of splitting the current coding unit 400 or 450 of FIG. 10, and thus details thereof are not provided again.

According to an embodiment, the encoder 220 may use an index for identifying a size and shape of a reference coding unit so as to determine the size and shape of the reference coding unit according to some data units pre-determined based on a certain condition. In other words, the bitstream generator 210 may generate a bitstream including the index for identifying the size and shape of the reference coding unit, according to data units satisfying a certain condition (for example, a data unit having a size equal to or smaller than a slice) from among the various data units (for example, sequences, pictures, slices, slice segments, and largest coding units). The encoder 220 may use the index to determine the size and shape of the reference coding unit according to data units satisfying the certain condition. According to an embodiment, at least one of the size or shape of the reference coding unit, which is related to the index indicating the size and shape of the reference coding unit, may be pre-determined. In other words, the encoder 220 may select at least one of the pre-determined size or shape of the reference coding unit according to the index so as to determine at least one of the size or shape of the reference coding unit included in a data unit that is a criterion for obtaining the index. Because operations of the encoder 220 using an index for identifying a size and shape of a reference coding unit may be similar to operations of the decoder 120 described above, details thereof are not provided again.

FIG. 22 illustrates a processing block serving as a criterion of determining a determination order of reference coding units included in the picture 2200, according to an embodiment.

According to an embodiment, the encoder 220 may determine a size of at least one processing block included in an image by obtaining information about a size of a processing block. The encoder 220 may determine the size of at least one processing block included in the image, and the bitstream generator 210 may generate a bitstream including the information about a size of a processing block. The size of such a processing block may be a certain size of a data unit indicated by the information about a size of a processing block.

According to an embodiment, the bitstream generator 210 of the image encoding apparatus 200 may generate the bitstream including the information about a size of a processing block, according to certain data units. For example, the bitstream including the information about a size of a processing block may be generated according to data units, such as images, sequences, pictures, slices, and slice segments. In other words, the bitstream generator 210 may generate the bitstream including the information about a size of a processing block according to the several data units, and the encoder 220 may determine the size of at least one processing block for splitting a picture, by using the information about a size of a processing block, wherein the size of the processing block may be an integer times a size of a reference coding unit.

According to an embodiment, the encoder 220 may determine sizes of the processing blocks 2202 and 2212 included in the picture 2200. For example, the encoder 220 may determine a size of a processing block based on information about a size of a processing block. Referring to FIG. 22, the encoder 220 may determine horizontal sizes of the processing blocks 2202 and 2212 to be four times a horizontal size of a reference coding unit, and vertical sizes thereof to be four times a vertical size of the reference coding unit, according to an embodiment. The encoder 220 may determine an order of determining at least one reference coding unit in at least one processing block. Because operations of the encoder 220 related to a processing block may be similar to those of the decoder 120 described above with reference to FIG. 22, details thereof are not provided again.

According to an embodiment, the bitstream generator 210 of the image encoding apparatus 200 may generate a bitstream including block shape information indicating a shape of a current coding unit or split shape information indicating a method of splitting the current coding unit. The block shape information or the split shape information may be included in a bitstream related to various data units. For example, the bitstream generator 210 of the image encoding apparatus 200 may use block shape information or split shape information included in a sequence parameter set, a picture parameter set, a video parameter set, a slice header, or a slice segment header. In addition, the bitstream generator of the image encoding apparatus 200 may generate a bitstream including syntax indicating block shape information or split shape information according to largest coding units, reference coding units, or processing blocks.

According to an embodiment, the encoder 220 may differently determine types of split shapes into which a coding unit is splittable according to predetermined data units. The encoder 220 of the image encoding apparatus 200 may differently determine a combination of shapes into which a coding unit is splittable according to predetermined data units (for example, sequences, pictures, and slices), according to an embodiment.

FIG. 23 illustrates coding units that may be determined for each picture, when a combination of shapes into which a coding unit is splittable is different for each picture, according to an embodiment.

Referring to FIG. 23, the encoder 220 may determine a combination of split shapes into which a coding unit is splittable to be different per picture. For example, the encoder 220 may decode an image by using, from among at least one picture included in the image, the picture 2300 splittable into four coding units, the picture 2310 splittable into two or four coding units, and the picture 2320 splittable into 2, 3, or 4 coding units. The encoder 220 may split the picture 2300 into four square coding units. The encoder 220 may split the picture 2310 into 2 or 4 coding units. The encoder 220 may split the picture 2320 into 2, 3, or 4 coding units. Because the combination of split shapes described above is only an embodiment for describing operations of the image encoding apparatus 200, the combination of split shapes should not be limitedly interpreted by the embodiment, and various combinations of split shapes may be used per certain data unit.

According to an embodiment, the encoder 220 of the image encoding apparatus 200 may determine a combination of split shapes into which a coding unit is splittable, according to certain data units by using an index indicating a combination of split shape information, and accordingly, may use a combination of different split shapes according to certain data units. In addition, the bitstream generator 210 of the image encoding apparatus 200 may generate a bitstream including the index indicating a combination of split shape information, according to certain data units (for example, sequences, pictures, and slices). For example, the bitstream generator 210 may generate a bitstream including the index indicating a combination split shape information according to sequence parameter sets, picture parameter sets, slice headers, or slice header.

FIGS. 24 and 25 illustrate various shapes of coding units that may be determined based on split shape information represented in a binary code, according to an embodiment.

According to an embodiment, the encoder 220 of the image encoding apparatus 200 may split a coding unit into various shapes, and the bitstream generator 210 may generate a bitstream including block shape information and split shape information. Shapes of a coding unit that is splittable may correspond to various shapes including the shapes described above through above embodiments. Referring to FIG. 24, the encoder 220 may split a coding unit having a square shape in at least one of a horizontal direction or a vertical direction, and a coding unit having a non-square shape in a horizontal or vertical direction, based on split shape information. Because characteristics about a binary code of split shape information usable by the image encoding apparatus 200 may correspond to characteristics of the image decoding apparatus 100 described above through FIGS. 24 and 25, details thereof may not be provided again.

The image encoding apparatus 200 according to an embodiment may generate prediction data by performing inter prediction or intra prediction on a coding unit, generate residual data by performing inverse transformation on a transformation unit included in a current coding unit, and encode the current coding unit by using the generated prediction data and residual data.

A prediction mode of a coding unit according to an embodiment may be at least one of an intra mode, an inter mode, or a skip mode. According to an embodiment, a prediction mode having a smallest error may be selected by independently performing prediction according to coding units.

When a coding unit having a 2N×2N shape according to an embodiment is split into two coding units having a 2N×N shape or N×2N shape, inter mode prediction and intra mode prediction may be separately performed on each of the coding units. Also, according to an embodiment, the encoder 220 of the image encoding apparatus 200 may encode a coding unit by using a CU skip mode not only when the coding unit has a square shape, but also when the coding unit has a non-square shape. Because an image may be decoded by using a CU skip mode even when a coding unit determined based on at least one of block shape information or split shape information has not only a square shape, but also a non-square shape, a relatively more adaptive skip mode may be used, and thus image encoding/decoding efficiency may be increased. Characteristics of the image encoding apparatus 200 using a skip mode in such a coding unit having a non-square shape may be similar to those described above in relation to using of a skip mode of the image encoding apparatus 200, details thereof may not be provided again.

Figure 28:
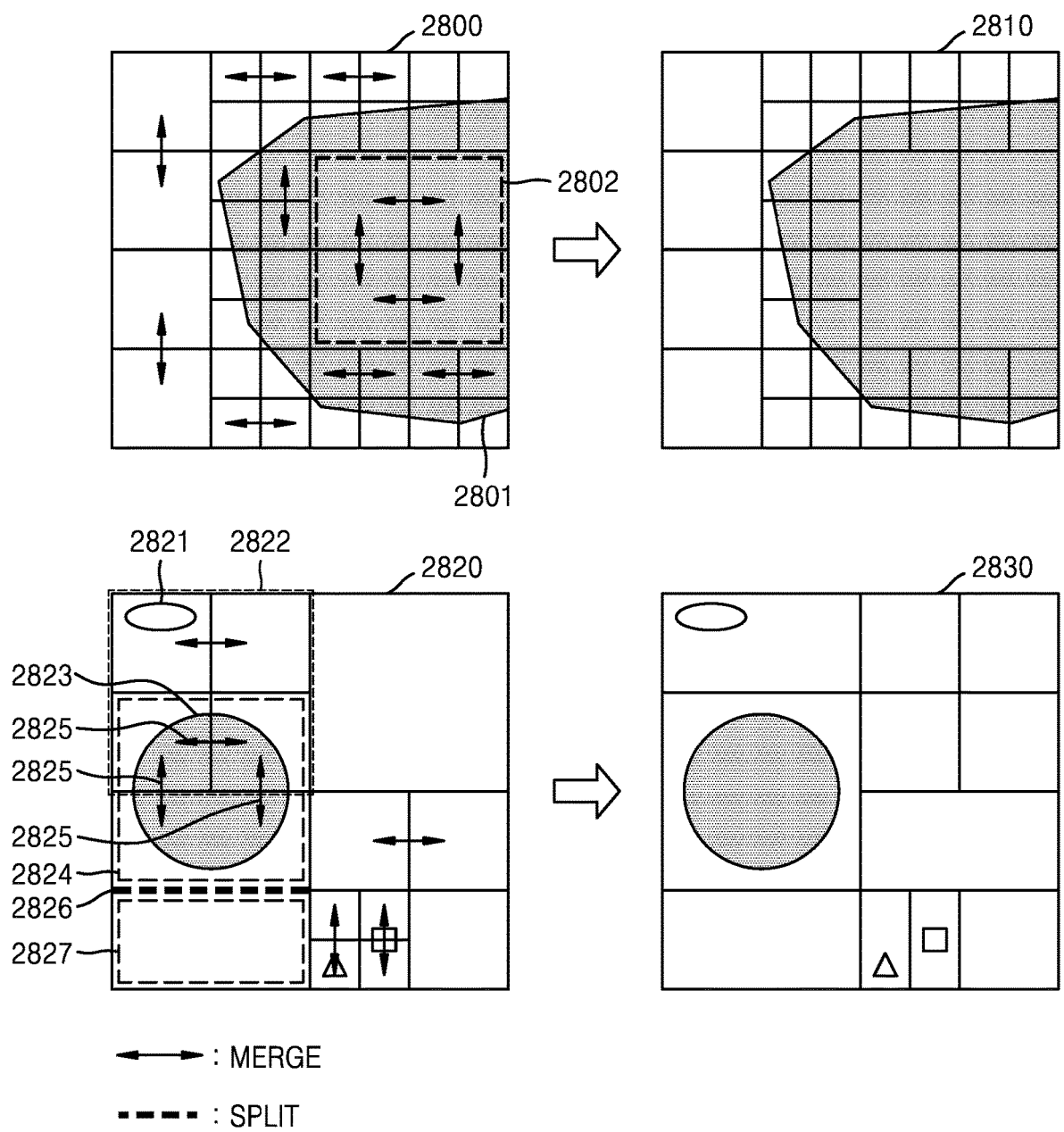
FIG. 28 illustrates processes of merging or splitting coding units determined according to a certain encoding method, according to an embodiment.

FIG. 28 illustrates processes of performing merging or splitting on coding units determined according to a certain encoding method, according to an embodiment.

According to an embodiment, the image encoding apparatus 200 may determine coding units for splitting a picture by using the certain coding unit. For example, the image encoding apparatus 200 may split a coding unit of a current depth or four coding units of a lower depth based on split information of a coding unit. As described above, the image encoding apparatus 200 may determine a coding unit may using block shape information indicating that a current coding unit always has a square shape, and split shape information indicating that the current coding unit is not to be split or is to be split into four square coding units, according to an embodiment. Referring to FIG. 28, pictures 2800 or 2820 may be split into square coding units determined according to the certain coding unit.

However, when the above certain coding unit is used, whether a current coding unit is to be split is determined based on whether a relatively small object included in the current coding unit is suitable to be represented, and thus it may be impossible to encode a large object and a small object in a picture through one coding unit. Here, an object is a group of samples included in a picture and may denote a region of samples distinguished from other regions as the samples have similar sample values. Referring to FIG. 28, the image encoding apparatus 200 may determine a coding unit for decoding a small object 2821 by splitting a first coding unit 2822 into four coding units of a lower depth, so as to reconstruct the small object 2821. However, because a large object 2823 is not included in the current coding unit 2822, it is not suitable to decode the large object 2823 by using the current coding unit 2822, and in addition, because the current coding unit 2822 is split to decode the small object 2821, an unnecessary splitting process of a coding unit is performed to decode the large object 2823 as a result, and thus is inefficient. In other words, when the image encoding apparatus 200 is able to use one coding unit so as to encode a part of the large object 2823, image encoding may be efficiently performed.

According to an embodiment, the encoder 220 of the image encoding apparatus 200 may split a current coding unit by using at least one of block shape information or split shape information, wherein the block shape information may be pre-determined such that only a square shape is used and the split shape information may be pre-determined such that the current coding unit is not split or is split into four square coding units. Such processes may correspond to coding unit determining processes used in the above certain encoding method. In this case, the decoder may use a sample value included in a picture in order to merge coding units determined by using the certain encoding method or split the determined coding unit. For example, the encoder 220 may detect various objects included in a picture by examining regions having similar sample values, and perform merging/splitting processes of coding units based on regions of the detected objects.

Referring to FIG. 28, according to an embodiment, the encoder 220 may determine a plurality of coding units for splitting the picture 2800 by using the certain encoding method. However, processes of splitting a similar region into a plurality of coding units instead of one coding unit may be performed despite that a region 2801 having similar sample values exist in a picture. In this case, even when a coding unit is determined through a certain encoding method, the encoder 220 may merge the coding units into one coding unit 2802 and encode the coding unit 2802. Referring to FIG. 28, according to another embodiment, the encoder 220 may split the coding unit 2822 for encoding the small object 2821 into four coding units by using the certain encoding method. Because the coding units obtained as such are not all included in the large object 2823, the encoder 220 may perform a merging process 2825 on coding units having similar sample values to obtain one coding unit.

According to an embodiment, the encoder 220 may not split a coding unit or may determine coding units by splitting the coding unit into four coding units by using a certain encoding method, by using split information of the coding unit, and then split the coding units again in consideration of sample values of samples included in a picture. In other words, in order to determine coding units according to objects, the encoder 220 may not only merge coding units, but also split a pre-determined coding unit. Referring to FIG. 28, the encoder 220 may merge coding units for the object 2823, and perform a splitting process 2826 on the merged coding units for the object 2823 so as to determine an optimized coding unit for the object 2823. In other words, the encoder 220 may determine, as a coding unit 2827 separately from the object 2823, a region not including the object 2823 through the splitting process 2826.

When a bitstream about an image is generated after merging or splitting coding units determined according to a certain encoding method through operations of the image encoding apparatus 200, the image decoding apparatus 100 may decode the image by performing an image decoding method corresponding to inverse operations of the image encoding method, after obtaining the bitstream.

FIG. 29 illustrates an index according to a Z-scan order of coding units, according to an embodiment.

The encoder 220 of the image encoding apparatus 200 according to an embodiment may scan lower data units included in an upper data unit according to a Z-scan order. Also, the image encoding apparatus 200 according to an embodiment may sequentially access data according to a Z-scan index in a coding unit included in a largest coding unit or a processing block. As described above with reference to FIGS. 9 and 10, the encoder 220 of the image encoding apparatus 200 according to an embodiment may split a reference coding unit into at least one coding unit. Here, coding units having a square shape and coding units having a non-square shape may be mixed in a reference coding unit. Since characteristics of an index according to a Z-scan order of a coding unit with respect to the image encoding apparatus 200 may be similar to those of the image decoding apparatus 100 described above through FIG. 29, details thereof are not provided again.

While this disclosure has been particularly shown and described with reference to embodiments thereof, it will be understood by those of ordinary skill in the art that various changes in form and details may be made therein without departing from the spirit and scope of the present disclosure as defined by the appended claims. The embodiments should be considered in a descriptive sense only and not for purposes of limitation. Therefore, the scope of the present disclosure is defined not by the detailed description of the present disclosure but by the appended claims, and all differences within the scope will be construed as being included in the present disclosure.

The embodiments of the present disclosure can be written as computer programs and can be implemented in general-use digital computers that execute the programs using a computer-readable recording medium. Examples of the computer-readable recording medium include magnetic storage media (e.g., ROM, floppy disks, hard disks, etc.), optical recording media (e.g., CD-ROMs, or DVDs), etc.

The invention claimed is:

1. An apparatus for decoding an image, the apparatus comprising a decoder configured to:
   obtain a plurality of coding units comprising a current coding unit by splitting the image;
   when a size of the current coding unit is larger than a maximum size of a transformation unit, determine at least one transformation unit by splitting the current coding unit, and
   decode the image by performing inverse transformation based on the at least one transformation unit,
   wherein the decoder is further configured to:
   when the current coding unit is a square shape and the size of the current coding unit is larger than the maximum size of the transformation unit, determine a plurality of transformation units of a square shape by splitting the current coding unit in half both vertically and horizontally, and
   when the current coding unit is a non-square shape and the size of the current coding unit is larger than the maximum size of the transformation unit, determine a plurality of transformation units by splitting the current coding unit vertically or horizontally.

2. An apparatus for encoding an image, the image encoding apparatus comprising:
   an encoder configured to:
   obtain a plurality of coding units comprising a current coding unit by splitting the image;
   when a size of the current coding unit is larger than a maximum size of a transformation unit, determine at least one transformation unit by splitting the current coding unit, and
   encode the image by performing transformation, based on the at least one transformation unit; and
   a bitstream generator configured to generate a bitstream including the encoded image,
   wherein the encoder is further configured to:
   when the current coding unit is a square shape and the size of the current coding unit is larger than the maximum size of the transformation unit, determine a plurality of transformation units of a square shape by splitting the current coding unit in half both vertically and horizontally, and
   when the current coding unit is a non-square shape and the size of the current coding unit is larger than the maximum size of the transformation unit, determine a plurality of transformation units by splitting the current coding unit vertically or horizontally.

\* \* \* \* \*